US 11,029,445 B2

(12) United States Patent
Hou et al.

(10) Patent No.: US 11,029,445 B2
(45) Date of Patent: Jun. 8, 2021

(54) METHOD AND APPARATUS FOR DETERMINING OIL OUTPUT QUANTITY AND GAS OUTPUT QUANTITY OF SHALE OIL IN-SITU CONVERSION

(71) Applicant: PetroChina Company Limited, Beijing (CN)

(72) Inventors: Lianhua Hou, Beijing (CN); Xia Luo, Beijing (CN); Jinghong Wang, Beijing (CN)

(73) Assignee: PetroChina Company Limited, Beijing (CN)

( * ) Notice: Subject to any disclaimer, the term of this patent is extended or adjusted under 35 U.S.C. 154(b) by 268 days.

(21) Appl. No.: 16/288,827

(22) Filed: Feb. 28, 2019

(65) Prior Publication Data

US 2019/0271797 A1    Sep. 5, 2019

(30) Foreign Application Priority Data

Mar. 2, 2018 (CN) .......................... 201810174445.X

(51) Int. Cl.
*G01V 99/00* (2009.01)
(52) U.S. Cl.
CPC .................. *G01V 99/005* (2013.01)
(58) Field of Classification Search
CPC .................................................. G01V 99/005
See application file for complete search history.

(56) References Cited

U.S. PATENT DOCUMENTS

| 5,871,047 A | 2/1999 | Spath et al. | |
| 2009/0145598 A1* | 6/2009 | Symington | ............. E21B 43/24 166/250.01 |

(Continued)

FOREIGN PATENT DOCUMENTS

| CN | 102536200 A | 7/2012 |
| CN | 104237965 A | 12/2014 |

(Continued)

OTHER PUBLICATIONS

Peters et al., "Geochemistry Applied to Evaluation of Unconventional Resources," Unconventional Oil and Gas Resources Handbook, 1st Edition, pp. 71-116, Oct. 22, 2015 (Oct. 22, 2015).

(Continued)

*Primary Examiner* — Raymond L Nimox
(74) *Attorney, Agent, or Firm* — Hamilton, Brook, Smith & Reynolds, P.C.

(57) ABSTRACT

The embodiments of the present disclosure provide a method and an apparatus for determining an oil output quantity and a gas output quantity of a shale oil in-situ conversion, wherein the method comprises: obtaining a plurality of groups of shale samples of a target stratum of a target area; determining, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature; building an oil output quantity model and a gas output quantity model according to the above data to determine an oil output quantity and a gas output quantity of the target area. By introducing and using parameters such as the retained oil quantity, the retained gas quantity, the oil output quantity and the gas output quantity to build accurate oil output quantity model and gas output quantity model, the present disclosure solves the technical problem in the existing methods that the predicted development potential has a large error and a low accuracy, and achieve the technical effect of accurately predicting the development potential by determining the oil output quantity and the gas output quantity of the target area.

16 Claims, 8 Drawing Sheets

(56) References Cited

U.S. PATENT DOCUMENTS

| | | | |
|---|---|---|---|
| 2010/0095742 A1* | 4/2010 | Symington | E21B 41/0064 |
| | | | 73/23.35 |
| 2011/0282584 A1* | 11/2011 | Baez | E21B 49/00 |
| | | | 702/13 |
| 2013/0262069 A1* | 10/2013 | Leonard | E21B 43/00 |
| | | | 703/10 |
| 2015/0212235 A1* | 7/2015 | Barwise | G01V 99/005 |
| | | | 703/2 |
| 2018/0217112 A1* | 8/2018 | Mathur | G01N 30/68 |
| 2018/0321416 A1* | 11/2018 | Freedman | G01V 3/32 |
| 2019/0271797 A1 | 9/2019 | Hou et al. | |

FOREIGN PATENT DOCUMENTS

| | | |
|---|---|---|
| CN | 104389594 A | 3/2015 |
| CN | 104632201 A | 5/2015 |
| CN | 104700316 A | 6/2015 |
| CN | 104832166 A | 8/2015 |
| CN | 104948163 A | 9/2015 |
| CN | 1051801909 A | 12/2015 |
| CN | 105572320 A | 5/2016 |
| CN | 106351651 A | 1/2017 |
| CN | 106803021 A | 6/2017 |
| CN | 106988740 A | 7/2017 |
| CN | 107238692 A | 10/2017 |
| CN | 107506948 A | 12/2017 |
| CN | 107622165 A | 1/2018 |
| CN | 107622328 A | 1/2018 |
| CN | 107676085 A | 2/2018 |
| CN | 107727832 A | 2/2018 |
| CN | 108547612 A | 9/2018 |

OTHER PUBLICATIONS

Canadian Office Action and Search Report, Application No. 3035510, entitled "Method and Apparatus for Determining Oil Output Quantity and Gas Output Quantity of Shale Oil In-Situ Conversion," dated Mar. 17, 2020.

Journal of Northeast Petroleum University, "Percolation Law and Productivity Model of Volume Fracturing Shale Oil Reservoir," vol. 39, No. 1, Feb. 2015, pp. 80-85.

Petroleum Drilling Techniques,"The effect of Threshold Pressure Gradient and Stress Sensitivity on Shale Oil Reservoir Productivity," vol. 45, No. 5, Sep. 2017, pp. 84-90.

Chinese Search Report dated Feb. 22, 2018, for Chinese Patent Application No. 201810174445.X (English translation included).

Chinese Search Report with English translation, Application No. CN 201810174445X, dated Mar. 18, 2021.

Chinese Office Action with English translation, Application No. 201810174445X, dated Mar. 25, 2021.

* cited by examiner

METHOD AND APPARATUS FOR DETERMINING OIL OUTPUT QUANTITY AND GAS OUTPUT QUANTITY OF SHALE OIL IN-SITU CONVERSION

RELATED APPLICATION

This application claims priority under 35 U.S.C. § 119 or 365 to Chinese, Application No. 201810174445.X, filed Mar. 2, 2018. The entire teachings of the above application are incorporated herein by reference.

TECHNICAL FIELD

The present disclosure relates to the technical field of oil and gas exploration and development, and in particular to a method and apparatus for determining an oil output quantity and a gas output quantity of a shale oil in-situ conversion.

BACKGROUND ART

During exploration and development of shale oil in a target area, it is usually necessary to predict a development potential and a development effect (e.g., an oil output quantity and a gas output quantity) of the target area, and then take the prediction results as a guidance to select a preferred area from the target area, so as to perform specific shale oil exploration.

Currently, in order to predict the development potential of the target area, it is usual to obtain an oil generation quantity and a gas generation quantity of a shale in the target area through simulation experiments, and take the oil generation quantity and the gas generation quantity as the main evaluation parameters of the development potential to the area to be developed, so as to predict and determine the development potential of the target area, i.e., the existing methods mainly focus on the research of the shale hydrocarbon generation capacity (i.e., the oil generation quantity and the gas generation quantity). But the above methods only simply consider the influences of the oil generation quantity and the gas generation quantity, without taking into account the specific oil and gas development process (e.g., the specific in-situ conversion process) or the real stratum environment, and without comprehensively analyzing the mutual effects and influences between multiple parameters in the oil and gas development process (e.g., the oil and gas generated from the shale in the development process will be pyrolyzed under high temperatures), so during implementation, the existing methods often have the technical problem that the predicted development potential has a large error and a low accuracy.

With regard to the above problem, no effective solution has been proposed yet.

SUMMARY OF THE DISCLOSURE

The embodiments of the present disclosure provide a method and an apparatus for determining an oil output quantity and a gas output quantity of a shale oil in-situ conversion, so as to solve the technical problem of the existing methods that the predicted development potential has a large error and a low accuracy, and achieving the technical effect of comprehensively considering the mutual influences between multiple factors, and accurately predicting a development potential of a target area through multiple parameters such as an oil output quantity and a gas output quantity.

The embodiments of the present disclosure provide a method for determining an oil output quantity of a shale oil in-situ conversion, comprising:

obtaining a plurality of groups of shale samples of a target stratum of a target area, wherein the shale samples are immature shale samples;

measuring the plurality of groups of shale samples to obtain an initial TOC parameter, an initial Ro parameter, and an initial HC parameter of each group of shale samples in the plurality of groups of shale samples;

determining, according to the plurality of groups of shale samples, a first retained oil quantity, a Ro parameter, an oil output quantity and a second retained oil quantity of each group of shale samples in the plurality of groups of shale samples under each preset temperature;

building an oil output quantity model according to the first retained oil quantity, the Ro parameter, the oil output quantity and the second retained oil quantity of each group of shale samples in the plurality of groups of shale samples under each preset temperature;

determining an oil output quantity of the target stratum of the target area according to the oil output quantity model.

In one embodiment, determining, according to the plurality of groups of shale samples, a first retained oil quantity, a Ro parameter, an oil output quantity and a second retained oil quantity of each group of shale samples in the plurality of groups of shale samples under each preset temperature comprises:

performing a first thermal simulation experiment on each group of shale samples in the plurality of groups of shale samples to determine the first retained oil quantity and the Ro parameter of each group of shale samples in the plurality of groups of shale samples under each preset temperature, wherein a simulation pressure of the first thermal simulation experiment is a stratum pressure, and the first thermal simulation experiment includes semi-open thermal simulation experiments under a plurality of preset temperatures;

performing a second thermal simulation experiment on each group of shale samples in the plurality of groups of shale samples to determine the oil output quantity and the second retained oil quantity of each group of shale samples in the plurality of groups of shale samples under each preset temperature, wherein a simulation pressure of the second thermal simulation experiment is an in-situ conversion pressure, the second thermal simulation experiment includes semi-open thermal simulation experiments under a plurality of preset temperatures, and the plurality of preset temperatures included by the second thermal simulation experiment are the same as those included by the first thermal simulation experiment.

In one embodiment, building an oil output quantity model according to the first retained oil quantity, the Ro parameter, the oil output quantity and the second retained oil quantity of each group of shale samples in the plurality of groups of shale samples under each preset temperature comprises:

determining an oil generation quantity of each group of shale samples in the plurality of groups of shale samples under each preset temperature according to the oil output quantity and the second retained oil quantity of each group of shale samples in the plurality of groups of shale samples under each preset temperature;

building a Ro parameter model according to the Ro parameter of each group of shale samples in the plurality of groups of shale samples under each preset temperature and an initial Ro parameter of each group of shale samples in the plurality of groups of shale samples;

building an oil generation potential model according to the initial TOC parameter, the initial Ro parameter and the initial HC parameter of each group of shale samples in the plurality of groups of shale samples, the Ro parameter model, and the oil generation quantity of each group of shale samples in the plurality of groups of shale samples under each preset temperature;

building a retained oil proportion model according to the initial TOC parameter, the initial Ro parameter and the initial HC parameter of each group of shale samples in the plurality of groups of shale samples, the oil generation quantity of each group of shale samples in the plurality of groups of shale samples under each preset temperature, the first retained oil quantity of each group of shale samples in the plurality of groups of shale samples under each preset temperature, and the oil generation potential model;

building an oil output quantity proportion model according to the retained oil proportion model, and the initial TOC parameter, the initial Ro parameter and the initial HC parameter of each group of shale samples in the plurality of groups of shale samples;

building an oil output quantity model according to the oil output quantity proportion model.

In one embodiment, the oil generation potential model is built with the following formula:

$$Q_{op} = 0.01 \times (a_{11} \times e^{b_{11} \times Ro} \times Ro^2)$$

wherein $Q_{op}$ represents an oil generation potential, Ro represents a Ro parameter, $a_{11}$ represents a first-class constant with a reference number of 11, and $b_{11}$ represents a second-class constant with a reference number of 11.

In one embodiment, the retained oil quantity proportion model is built with the following formula:

$$Q_{osp} = f(TOC_0)_o \times B_{or} \times \frac{HC_t}{HC_s} \times \begin{cases} a_{31} \times Ro \times b_{31} \text{(when } Ro \leq 1.2\%) \\ a_{32} \times Ro^{b_{32}} \text{(when } Ro > 1.2\%) \end{cases}$$

wherein $Q_{osp}$ represents a retained oil quantity proportion, $f(TOC_0)_o$ represents a shale retained oil quantity correction coefficient, $TOC_0$ represents an initial TOC parameter of a shale sample, $B_{or}$ represents a ratio of a crude oil volume factor under a stratum pressure of the target area to a crude oil volume factor under a thermal simulation pressure, Ro represents a Ro parameter, $HC_t$ represents an initial HC parameter of a shale sample of a target stratum of a target area to be determined, $HC_s$ represents an initial HC parameter of a shale sample, $a_{31}$ represents a first-class constant with a reference number of 31, $a_{32}$ represents a first-class constant with a reference number of 32, $b_{31}$ represents a second-class constant with a reference number of 31, and $b_{32}$ represents a second-class constant with a reference number of 32.

In one embodiment, the oil output quantity proportion model is built with the following formula:

$$Q_{pop} = \begin{cases} a_{51} \times \ln(TOC_0 \times HC_0) + b_{51} \text{(when } TOC_0 \times HC_0 < 6\%) \\ a_{52} \times \ln(TOC_0 \times HC_0) + b_{52} \text{(when } 6\% \leq TOC_0 \times HC_0 < 14\%) \\ a_{53} \times \ln(TOC_0 \times HC_0) + b_{53} \text{(when } TOC_0 \times HC_0 \geq 14\%) \end{cases}$$

wherein $Q_{pop}$ represents an oil output quantity proportion, $TOC_0$ represents an initial TOC parameter of a shale sample, $HC_0$ represents an initial HC parameter of the shale sample, $a_{51}$ represents a first-class constant with a reference number of 51, $a_{52}$ represents a first-class constant with a reference number of 52, $a_{53}$ represents a first-class constant with a reference number of 53, $b_{51}$ represents a second-class constant with a reference number of 51, $b_{52}$ represents a second-class constant with a reference number of 52, and $b_{53}$ represents a second-class constant with a reference number of 53.

In one embodiment, when the target area lacks immature shale samples, the method further comprises: obtaining a plurality of groups of shale samples of the target area, and performing TOC recovery processing and HC recovery processing on the plurality of groups of shale samples, respectively, to obtain an initial TOC parameter and an initial HC parameter of the target area.

The embodiments of the present disclosure further provide a method for determining a gas output quantity of a shale oil in-situ conversion, comprising:

obtaining a plurality of groups of shale samples of a target stratum of a target area, wherein the shale samples are immature shale samples;

measuring the plurality of groups of shale samples to obtain an initial TOC parameter, an initial Ro parameter, and an initial HC parameter of each group of shale samples in the plurality of groups of shale samples;

determining, according to the plurality of groups of shale samples, a first retained gas quantity, a Ro parameter, a gas output quantity and a second retained gas quantity of each group of shale samples in the plurality of groups of shale samples under each preset temperature;

building a gas output quantity model according to the first retained gas quantity, the Ro parameter, the gas output quantity and the second retained gas quantity of each group of shale samples in the plurality of groups of shale samples under each preset temperature;

determining a gas output quantity of the target stratum of the target area according to the gas output quantity model.

In one embodiment, determining, according to the plurality of groups of shale samples, a first retained gas quantity, a Ro parameter, a gas output quantity and a second retained gas quantity of each group of shale samples in the plurality of groups of shale samples under each preset temperature comprises:

performing a first thermal simulation experiment on each group of shale samples in the plurality of groups of shale samples to determine the first retained gas quantity and the Ro parameter of each group of shale samples in the plurality of groups of shale samples under each preset temperature, wherein a simulation pressure of the first thermal simulation experiment is a stratum pressure, and the first thermal simulation experiment includes semi-open thermal simulation experiments under a plurality of preset temperatures;

performing a second thermal simulation experiment on each group of shale samples in the plurality of groups of shale samples to determine the gas output quantity and the second retained gas quantity of each group of shale samples in the plurality of groups of shale samples under each preset temperature, wherein a simulation pressure of the second thermal simulation experiment is an in-situ conversion pressure, the second thermal simulation experiment includes semi-open thermal simulation experiments under a plurality of preset temperatures, and the plurality of preset temperatures included by the second thermal simulation experiment are the same as those included by the first thermal simulation experiment.

In one embodiment, building a gas output quantity model according to the first retained gas quantity, the Ro parameter, the gas output quantity and the second retained gas quantity of each group of shale samples in the plurality of groups of shale samples under each preset temperature comprises:

determining a gas generation quantity of each group of shale samples in the plurality of groups of shale samples under each preset temperature according to the gas output quantity and the second retained gas quantity of each group of shale samples in the plurality of groups of shale samples under each preset temperature;

building a Ro parameter model according to the Ro parameter of each group of shale samples in the plurality of groups of shale samples under each preset temperature and an initial Ro parameter of each group of shale samples in the plurality of groups of shale samples;

building a gas generation potential model according to the initial TOC parameter, the initial Ro parameter and the initial HC parameter of each group of shale samples in the plurality of groups of shale samples, the Ro parameter model, and the gas generation quantity of each group of shale samples in the plurality of groups of shale samples under each preset temperature;

building a retained gas proportion model according to the initial TOC parameter, the initial Ro parameter and the initial HC parameter of each group of shale samples in the plurality of groups of shale samples, the gas generation quantity of each group of shale samples in the plurality of groups of shale samples under each preset temperature, the first retained gas quantity of each group of shale samples in the plurality of groups of shale samples under each preset temperature, and the gas generation potential model;

building a gas output quantity proportion model according to the retained gas proportion model, and the initial TOC parameter, the initial Ro parameter and the initial HC parameter of each group of shale samples in the plurality of groups of shale samples;

building a gas output quantity model according to the gas output quantity proportion model.

In one embodiment, the gas generation potential model is built with the following formula:

$$Q_{gp} = 0.01 \times \begin{cases} (a_{21} \times Ro + b_{21}) \times Ro^{0.5} \text{ (when } Ro \leq 1.6\%) \\ a_{22} \times Ro^{b_{22}} \times Ro^{0.5} \text{ (when } Ro > 1.6\%) \end{cases}$$

wherein $Q_{gp}$ represents a gas generation potential, Ro represents a Ro parameter, $a_{21}$ represents a first-class constant with a reference number of 21, $a_{22}$ represents a first-class constant with a reference number of 22, $b_{21}$ represents a second-class constant with a reference number of 21, and $b_{22}$ represents a second-class constant with a reference number of 22.

In one embodiment, the retained gas quantity proportion model is built with the following formula:

$$Q_{gsp} = f(TOC_0)_g \times f(B_{gi}) \times \frac{HC_t}{HC_s} \times \begin{cases} a_{41} \times Ro + b_{41} \text{ (when } Ro \leq 0.8\%) \\ a_{42} \times Ro^{b_{42}} \text{ (when } 0.8\% < Ro < 1.6\%) \\ a_{43} \times Ro^{b_{43}} \text{ (when } Ro > 1.6\%) \end{cases}$$

wherein $Q_gsp$ represents a retained gas quantity proportion, $f(TOC_0)_g$ represents a shale retained gas quantity correction coefficient, $TOC_0$ represents an initial TOC parameter of a shale sample, $f(B_{gi})$ represents an experimental simulation pressure-based natural gas volume factor correction parameter, $B_{gi}$ represents a ratio of a natural gas volume factor under a stratum pressure of the target area to a natural gas volume factor under an experimental thermal simulation pressure, Ro represents a Ro parameter, $HC_t$ represents an initial HC parameter of a shale sample of a target stratum of a target area to be determined, $HC_s$ represents an initial HC parameter of a shale sample, $a_{41}$ represents a first-class constant with a reference number of 41, $a_{42}$ represents a first-class constant with a reference number of 42, $a_{43}$ represents a first-class constant with a reference number of 43, $b_{41}$ represents a second-class constant with a reference number of 41, $b_{42}$ represents a second-class constant with a reference number of 42, and $b_{43}$ represents a second-class constant with a reference number of 43.

In one embodiment, the gas output quantity proportion model is built with the following formula:

$$Q_{pgp} = \begin{cases} a_{61} \times \ln(TOC_0 \times HC_0) + b_{61} \text{ (when } TOC_0 \times HC_0 < 14\%) \\ a_{62} \times \ln(TOC_0 \times HC_0) + b_{62} \text{ (when } TOC_0 \times HC_0 \geq 14\%) \end{cases}$$

wherein $Q_{pgp}$ represents a gas output quantity proportion, $TOC_0$ represents an initial TOC parameter of a shale sample, $HC_0$ represents an initial HC parameter of the shale sample, $a_{61}$ represents a first-class constant with a reference number of 61, $a_{62}$ represents a first-class constant with a reference number of 62, $b_{61}$ represents a second-class constant with a reference number of 61, and $b_{62}$ represents a second-class constant with a reference number of 62.

In one embodiment, when the target area lacks immature shale samples, the method further comprises: obtaining a plurality of groups of shale samples of the target area, and performing TOC recovery processing and HC recovery processing on the plurality of groups of shale samples, respectively, to obtain an initial TOC parameter and an initial HC parameter of the target area.

The embodiments of the present disclosure further provide an apparatus for determining an oil output quantity of a shale oil in-situ conversion, comprising:

an obtaining module configured to obtain a plurality of groups of shale samples of a target stratum of a target area, wherein the shale samples are immature shale samples.

a measuring module configured to measure the plurality of groups of shale samples to obtain an initial TOC parameter, an initial Ro parameter, and an initial HC parameter of each group of shale samples in the plurality of groups of shale samples.

a first determining module configured to determine, according to the plurality of groups of shale samples, a first retained oil quantity, a Ro parameter, an oil output quantity and a second retained oil quantity of each group of shale samples in the plurality of groups of shale samples under each preset temperature;

a building module configured to build an oil output quantity model according to the first retained oil quantity, the Ro parameter, the oil output quantity and the second retained oil quantity of each group of shale samples in the plurality of groups of shale samples under each preset temperature;

a second determining module configured to determine an oil output quantity of the target stratum of the target area according to the oil output quantity model.

The embodiments of the present disclosure further provide an apparatus for determining a gas output quantity of a shale oil in-situ conversion, comprising:

an obtaining module configured to obtain a plurality of groups of shale samples of a target stratum of a target area, wherein the shale samples are immature shale samples.

a measuring module configured to measure the plurality of groups of shale samples to obtain an initial TOC parameter, an initial Ro parameter, and an initial HC parameter of each group of shale samples in the plurality of groups of shale samples.

a first determining module configured to determine, according to the plurality of groups of shale samples, a first retained gas quantity, a Ro parameter, a gas output quantity and a second retained gas quantity of each group of shale samples in the plurality of groups of shale samples under each preset temperature;

a building module configured to build a gas output quantity model according to the first retained gas quantity, the Ro parameter, the gas output quantity and the second retained gas quantity of each group of shale samples in the plurality of groups of shale samples under each preset temperature;

a second determining module configured to determine a gas output quantity of the target stratum of the target area according to the gas output quantity model.

By introducing and using multiple parameters such as a retained oil quantity, a retained gas quantity, an oil output quantity and a gas output quantity to build accurate oil output quantity model and gas output quantity model, the embodiments of the present disclosure solve the technical problem in the existing methods that the predicted development potential has a large error and a low accuracy, and achieve the technical effect of comprehensively considering the mutual influences between multiple factors, and accurately predicting a development potential of a target area through multiple parameters such as an oil output quantity and a gas output quantity.

BRIEF DESCRIPTION OF THE DRAWINGS

In order to more clearly describe the technical solutions in the embodiments of the present disclosure or the prior art, the drawings to be used in the description of the embodiments or the prior art will be briefly introduced as follows. Obviously, the drawings in the following description just illustrate some embodiments of the present disclosure, and those skilled in the art can obtain other drawings from them without paying a creative effort.

DETAILED DESCRIPTION OF THE PREFERRED EMBODIMENTS

In order that those skilled in the art better understands the technical solutions in the present disclosure, the technical solutions in the embodiments of the present disclosure will be clearly and completely described as follows with reference to the drawings for the embodiments of the present disclosure. Obviously, those described are just a part rather than all of the embodiments of the present disclosure. Based on the embodiments of the present disclosure, any other embodiment obtained by those skilled in the art without paying any creative effort should fall within the protection scope of the present disclosure.

It is considered that although the real stratum environment is combined, the prior art does not specifically or comprehensively analyze the mutual effects and influences between various parameters in an oil and gas development process of a shale oil in-situ conversion, and only predicts the oil output quantity and the gas output quantity of the target area by obtaining the oil generation quantity and the gas generation quantity, thereby leading to the technical problem that the predicted development potential has a large error and a low accuracy. With respect to the root causes of the above technical problem, the present disclosure comprehensively analyzes the mutual influences between various parameters in a specific oil and gas development process, such as an in-situ conversion process; combines the real stratum environment, and after obtaining the parameters such as the oil generation quantity and the gas generation quantity, introduces and obtains multiple parameters such as a retained oil quantity, a retained gas quantity, an oil output quantity and an gas output quantity through simulation experiments; and builds an oil output quantity model and a gas output quantity model which are relatively accurate to predict the oil output quantity and the gas output quantity of the target area, by comprehensively analyzing the mutual effects and influences between the above parameters, so as to evaluate the shale development potential of the target area, thereby solving the technical problem of the existing methods that the predicted development potential has a large error and a low accuracy, and achieving the technical effect of comprehensively considering the mutual influences between multiple factors, and accurately predicting the development potential of the target area through multiple parameters such as the oil output quantity and the gas output quantity.

Figure 1:
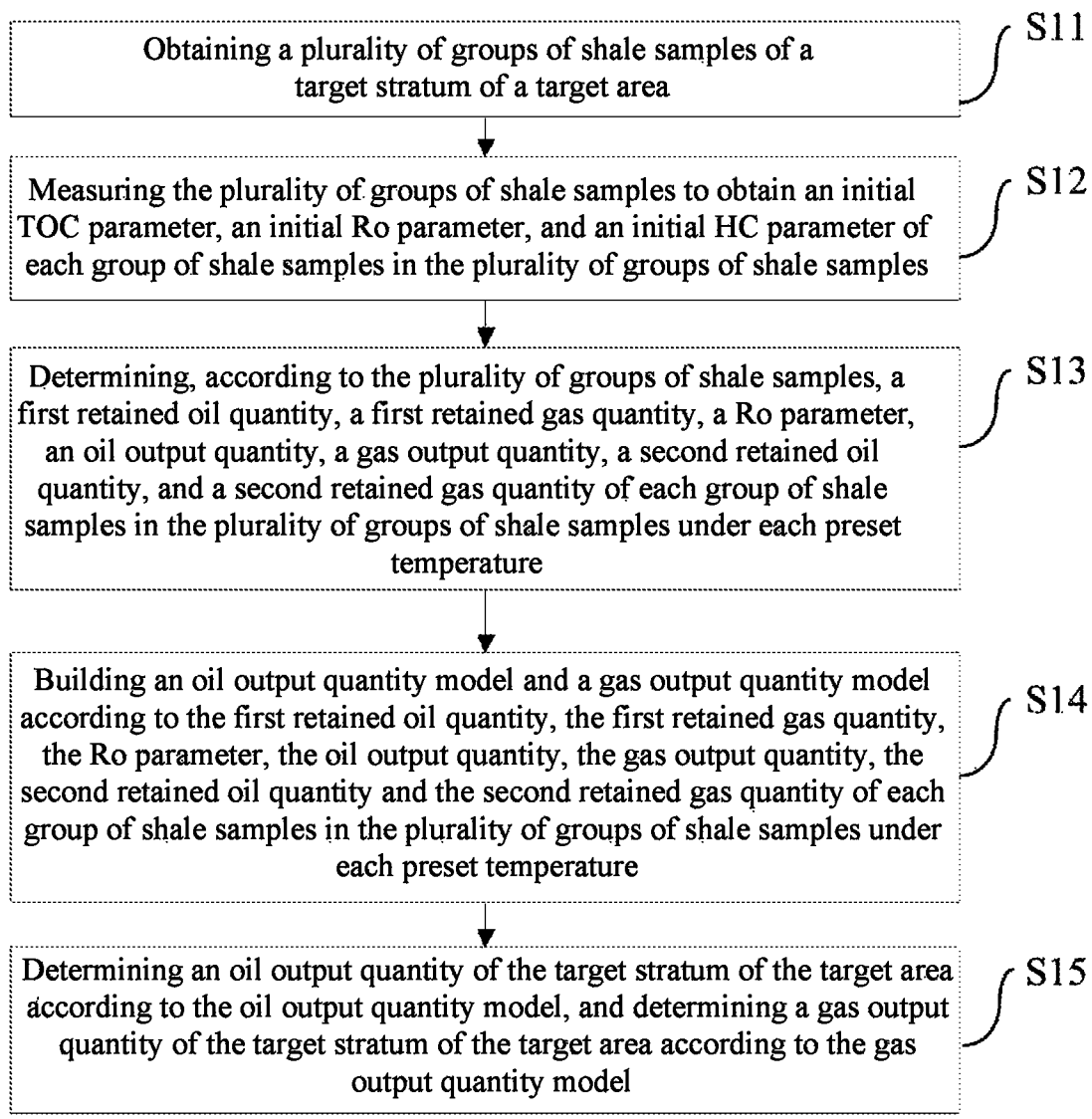
FIG. 1 is a processing flow diagram of a method for determining an oil output quantity and a gas output quantity of a shale oil in-situ conversion provided by an embodiment of the present disclosure.

Based on the above idea, an embodiment of the present disclosure provides a method for determining an oil output quantity and a gas output quantity of a shale oil in-situ conversion. For the detail, please refer to FIG. 1, which illustrates a processing flow diagram of a method for determining an oil output quantity and a gas output quantity of a shale oil in-situ conversion provided by an embodiment of the present disclosure. During implementation, a method for determining an oil output quantity and a gas output quantity of a shale oil in-situ conversion provided by an embodiment of the present disclosure may comprise the steps of:

S11: obtaining a plurality of groups of shale samples of a target stratum of a target area, wherein the shale samples are immature shale samples.

In this embodiment, before the oil and gas development of the shale oil in-situ conversion in the target area, it is usually necessary to predict the development potential of the target area to obtain a prediction result thereof, and then according to the prediction result, in combination with the development revenue and implementation cost, determine whether to perform an oil and gas development for the target area, and which development mode should be adopted therefor, so as to achieve a better oil and gas development result with a lower cost.

In this embodiment, the target area may be understood as an area containing the shale oil resources to be developed.

In one embodiment, the plurality of groups of shale samples specifically may be a plurality of groups of shale samples having different Total Organic Carbon (TOC) parameter values, wherein a TOC specifically refers to a total carbon content in organic matters that can be converted into hydrocarbons in the hydrocarbon source rocks.

In one embodiment, an immature shale sample may be understood as a shale that is not fully mature, and specifically, it may refer to a shale with a vitrinite reflectance (maturity) less than 0.5%, and the organic matters therein having not been converted into oil or gas. In contrast, a mature shale may refer to a shale with a high vitrinite reflectance (maturity), and a part of the organic matters therein having been partially converted into oil and gas which are partially discharged.

In one embodiment, the shale sample specifically may have a Ro parameter value less than 0.5%, wherein a Ro parameter specifically refers to a vitrinite reflectance, which is one of the most important organic matter maturity indexes, and is mostly used to calibrate a thermal evolution of an organic matter from an early diagenesis to a hypometamorphic stage. For example, the vitrinite reflectance is increasingly large as the thermal maturity of the organic matter rises.

In one embodiment, obtaining a plurality of groups of shale samples of a target stratum of a target area may be implemented to comprise: collecting shales of a plurality of outcrop sections having different TOC in the target area as the plurality of groups of shale samples.

S12: measuring the plurality of groups of shale samples to obtain an initial TOC parameter, an initial Ro parameter, and an initial HC parameter of each group of shale samples in the plurality of groups of shale samples.

In this embodiment, during implementation, each group of shale samples in the plurality of groups of shale samples may be divided into a plurality of subsamples, and during implementation, a subsample of each group of shale samples may be taken for measurement to obtain the initial TOC parameter, the initial Ro parameter, and the initial HC parameter of each group of shale samples.

In this embodiment, the initial TOC parameter may also be referred to as an original TOC parameter, and it specifically may be understood as a TOC parameter of an immature shale before an oil and gas development thereof, for example, before an in-situ conversion thereof. The initial THC parameter may also be referred to as an original HC parameter, and it specifically may be understood as an HC parameter of an immature shale before an oil and gas development thereof, for example, before an in-situ conversion thereof, wherein the HC parameter specifically may refer to a hydrocarbon ratio of atomic number (or a hydrogen to carbon ratio) in the shale.

S13: determining, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature.

In one embodiment, in order to more accurately predict the development potential of the target area, the method provided by the embodiment of the present disclosure is not limited to the study of the hydrocarbon generation capability (i.e., the oil generation quantity and the gas generation quantity), but considers the mutual influences between various parameters in the specific oil and gas development process. For example, the oil and gas generated during the high-temperature development will be cracked, and a large quantity of retained oil and gas will be present in the shale of low- and medium-maturity. Therefore, being different from the existing methods and combined with the specific oil and gas development process, it introduces a variety of other parameters, such as the retained oil quantity, the retained gas quantity, the oil output quantity, the gas output quantity, etc., so as to more comprehensively analyze the situation in the development process of the in-situ conversion, and accurately predict the development potential of the target area.

In one embodiment, determining, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature may comprise:

S13-1: performing a first thermal simulation experiment on each group of shale samples in the plurality of groups of shale samples to determine the first retained oil quantity, the first retained gas quantity, and the Ro parameter of each group of shale samples in the plurality of groups of shale samples under each preset temperature, wherein a simulation pressure of the first thermal simulation experiment is a stratum pressure, and the first thermal simulation experiment includes semi-open thermal simulation experiments under a plurality of preset temperatures.

In this embodiment, the first thermal simulation experiment mainly simulates the variation situation of the shale samples in the stratum under the normal stratum conditions, and specifically it is a semi-open thermal simulation experiment. During implementation, a plurality of subsamples may be taken from each group of shale samples to perform the first thermal simulation experiments under a plurality of preset temperatures, wherein the number of the subsamples taken from each group of shale samples is the same as the number of the plurality of preset temperatures. For example, in order to perform the first thermal simulation experiments under 11 different preset temperatures, 11 subsamples may be taken from each group of shale samples and then used to perform the first thermal simulation experiments under the 11 preset temperatures.

In one embodiment, the plurality of preset temperatures are reaction temperature corresponding to different stages in the oil and gas development process, respectively. Concretely, the plurality of preset temperatures specifically may be reaction temperatures corresponding to an oil generation starting stage, an oil generation quantity rapidly increasing stage I, an oil generation quantity rapidly increasing stage II, an oil generation peak stage I, an oil generation peak stage II, an oil generation peak stage III, an oil generation quantity decreasing stage I, an oil generation quantity decreasing stage II, an oil generation quantity basically ending stage, a gas generation quantity basically ending stage and a gas generation quantity ending stage. In this way, the temperature variation situation in the oil and gas development process can be simulated more accurately and completely.

In one embodiment, the plurality of preset temperatures may be set to 250° C., 300° C., 320° C., 335° C., 350° C., 360° C., 390° C., 440° C., 500° C., 540° C. and 580° C., respectively, in correspondence with the oil generation starting stage, the oil generation quantity rapidly increasing stage I, the oil generation quantity rapidly increasing stage II, the oil generation peak stage I, the oil generation peak stag II, the oil generation peak stage III, the oil generation quantity decreasing stage I, the oil generation quantity decreasing stage II, the oil generation quantity basically ending stage, the gas generation quantity basically ending stage and the gas generation quantity ending stage in the oil and gas development process. Specifically, when the first thermal simulation experiments are performed, the above preset temperatures may be used as the ending temperatures of the first thermal simulation experiments under the respective preset temperatures. Of course, it should be noted that the plurality of preset temperatures are listed only for the purpose of better describing the embodiments of the present disclosure. During implementation, any other suitable temperatures may also be selected as the preset temperature based on the specific conditions and the construction requirements, which are not limited herein.

In one embodiment, performing a first thermal simulation experiment on each group of shale samples in the plurality of groups of shale samples to determine the first retained oil quantity, the first retained gas quantity, and the Ro parameter of each group of shale samples in the plurality of groups of shale samples under each preset temperature specifically may be performing the first thermal simulation experiments on the plurality of groups of shale samples, respectively, in the following way of performing a first thermal simulation experiment on a current group of shale samples:

S1: performing a plurality of groups of first thermal simulation experiments under the plurality of preset temperatures using a plurality of subsamples of a current group of shale samples, wherein the number of the plurality of subsamples is the same as the number of the plurality of preset temperatures, each group of thermal simulation experiments are corresponding to one preset temperature, and the first thermal simulation experiment is a thermal simulation experiment under a semi-open system.

S2: obtaining, according to each group of first thermal simulation experiments, the first retained oil quantity, the first retained gas quantity and the Ro parameter under corresponding preset temperature.

In one embodiment, performing the first thermal simulation experiment specifically may be raising a temperature of the first thermal simulation experiment in a preset temperature increasing rate until the temperature reaches a preset temperature, and in the temperature increasing process, when a pressure in the simulation experiment exceeds 1.1 times a preset pressure, opening a pressure relief valve and decreasing the pressure to a simulation pressure; and maintaining the preset temperature and the simulation pressure for 50 days to complete the thermal simulation experiment.

In one embodiment, the simulation pressure specifically may be 1.2 to 1.5 times a hydrostatic pressure at a depth position of the target stratum of the target area. In this embodiment, during implementation the simulation pressure may be set to 1.5 times the hydrostatic pressure at the depth position of the target area. Of course, it should be noted that the above simulation pressures are listed only for the purpose of better describing the embodiment of the present disclosure. During implementation, any other suitable pressure may also be selected as the simulation pressure based on the specific conditions and the construction requirements, which are not limited herein.

In one embodiment, the preset temperature increasing rate specifically may be 2° C. per day. Of course, it should be noted that the above temperature increasing rates are listed only for the purpose of better describing the embodiment of the present disclosure. During implementation, any other suitable temperature increasing rate may also be selected as the preset temperature increasing rate based on the specific conditions and the construction requirements, which are not limited herein.

In one embodiment, before performing a first thermal simulation experiment using the shale samples, the method specifically may further comprise: firstly, pulverizing and uniformly mixing each group of shale samples and dividing them into a required number of parts, and then performing compaction processing under twice the simulation pressure. Subsequently, the first thermal simulation experiment may be performed using the processed samples. In this way, the variation of the shale in the stratum environment can be more accurately simulated, so as to obtain more accurate result data.

In one embodiment, during implementation, obtaining, according to each group of first thermal simulation experiments, the first retained oil quantity, the first retained gas quantity and the Ro parameter under corresponding preset temperature may comprise: measuring a retained oil quantity and a retained gas quantity of the shale in a reaction kettle of each group of first thermal simulation experiments at the preset temperature point, respectively, as the first retained oil quantity and the first retained gas quantity under the corresponding preset temperature. Specifically, the retained oil quantity may be obtained by an organic solvent extraction method, and the retained gas quantity may be measured according to a standard "Shale Gas Content Determination Method" SY/T 6940-2103. In the case of the first thermal simulation experiment, the shale vitrinite reflectance Ro after the first thermal simulation experiment may be measured according to an industrial standard "Determination Method for Vitrinite Reflectance in Sedimentary Rocks" SY/T 5124-2012, so as to obtain the Ro parameter under the corresponding preset temperature. In addition, the HC parameter of the shale sample after the first thermal simulation experiment may be measured according to an industrial standard "Geochemical Evaluation Method for Terrestrial Hydrocarbon Source Rocks" SYT 5735-1995; and the TOC parameter of the shale sample after the first thermal simulation experiment may be measured according to a national standard "Determination of Total Organic Carbon In Sedimentary Rock" GB/T 19145-2003, for subsequent use as reference data to more accurately predict the development potential of the target area.

S13-2: performing a second thermal simulation experiment on each group of shale samples in the plurality of groups of shale samples to determine the oil output quantity, the gas output quantity, the second retained oil quantity and the second retained gas quantity of each group of shale samples in the plurality of groups of shale samples under each preset temperature, wherein a simulation pressure of the second thermal simulation experiment is an in-situ conversion pressure, the second thermal simulation experiment includes semi-open thermal simulation experiments under a plurality of preset temperatures, and the plurality of preset temperatures included by the second thermal simulation experiment are the same as those included by the first thermal simulation experiment.

In this embodiment, the second thermal simulation experiment mainly simulates the variation situation of the shale samples in the stratum when the oil and gas development process is specifically performed, i.e., under the in-situ conversion conditions, wherein the second thermal simulation experiment has its specific experimental process similar to that of the first thermal simulation experiment, and it is also a semi-open thermal simulation experiment. During implementation, a plurality of subsamples may be taken from the remained subsamples of each group of shale samples to perform the second thermal simulation experiments under a plurality of preset temperatures, wherein the plurality of preset temperatures included by the second thermal simulation experiment are the same as those included by the first thermal simulation experiment, and specifically, the plurality of preset temperatures included by the second thermal simulation experiment are one-to-one the same as those included by the first thermal simulation experiment. For example, when the first thermal simulation experiment includes 5 preset temperatures, i.e., 300° C., 320° C., 335° C., 350° C. and 360° C., the second thermal simulation experiment will also include the 5 preset temperatures, i.e., 300° C., 320° C., 335° C., 350° C. and 360° C.

In one embodiment, the plurality of preset temperatures included by the second thermal simulation experiment are also reaction temperature corresponding to different stages in the oil and gas development process of the in-situ conversion, respectively. That is to say, the plurality of preset temperatures specifically may be reaction temperatures corresponding to an oil generation starting stage, an oil generation quantity rapidly increasing stage I, an oil generation quantity rapidly increasing stage II, an oil generation peak stage I, an oil generation peak stage II, an oil generation peak stage III, an oil generation quantity decreasing stage I, an oil generation quantity decreasing stage II, an oil generation quantity basically ending stage, a gas generation quantity basically ending stage and a gas generation quantity ending stage. In this way, the temperature variation situation in the oil and gas development process of the shale oil in-situ conversion can be simulated more accurately and completely. Accordingly, the plurality of preset temperatures may be set to 250° C., 300° C., 320° C., 335° C., 350° C., 360° C., 390° C., 440° C., 500° C., 540° C. and 580° C., respectively, in correspondence with the above different stages. Specifically, when the second thermal simulation experiments are performed, the above preset temperatures may be used as the ending temperatures of the second thermal simulation experiments under the respective preset temperatures.

In one embodiment, performing a second thermal simulation experiment on each group of shale samples in the plurality of groups of shale samples to determine the oil output quantity, the gas output quantity, the second retained oil quantity and the second retained gas quantity of each group of shale samples in the plurality of groups of shale samples under each preset temperature specifically may be performing the second thermal simulation experiments on the plurality of groups of shale samples, respectively, in the following way of performing a second thermal simulation experiment on a current group of shale samples:

S1: performing a plurality of groups of second thermal simulation experiments under the plurality of preset temperatures using a plurality of subsamples in the remained samples of a current group of shale samples, wherein the number of the plurality of subsamples is the same as the number of the plurality of preset temperatures, each group of thermal simulation experiments are corresponding to one preset temperature, and the second thermal simulation experiment is a thermal simulation experiment under a semi-open system.

S2: obtaining, according to each group of second thermal simulation experiments, the oil output quantity, the gas output quantity, the second retained oil quantity and the second retained gas quantity under corresponding preset temperature.

In one embodiment, performing the second thermal simulation experiment specifically may be raising a temperature of the second thermal simulation experiment in a preset temperature increasing rate until the temperature reaches a preset temperature, and in the temperature increasing process, when a pressure in the simulation experiment exceeds 1.1 times a preset pressure, opening a pressure relief valve and decreasing the pressure to a simulation pressure; and maintaining the preset temperature and the simulation pressure for 50 days to complete the thermal simulation experiment.

In one embodiment, in order to more accurately simulate the pressure environment of the in-situ conversion in the oil and gas development process of the actual shale oil in-situ conversion, the simulation pressure specifically may be 3 MPa to 5 MPa. In this embodiment, during implementation, the simulation pressure of the second thermal simulation experiment may be set to 5 MPa. Of course, it should be noted that the above simulation pressures are listed only for the purpose of better describing the embodiment of the present disclosure. During implementation, any other suitable pressure may also be selected as the simulation pressure based on the specific conditions and the construction requirements, which are not limited herein.

In one embodiment, the preset temperature increasing rate specifically may be 2° C. per day. Of course, it should be noted that the above temperature increasing rates are listed only for the purpose of better describing the embodiment of the present disclosure. During implementation, any other suitable temperature increasing rate may also be selected as the preset temperature increasing rate based on the specific conditions and the construction requirements, which are not limited herein.

In one embodiment, before performing a second thermal simulation experiment using the shale samples, the method specifically may further comprise: firstly, pulverizing and uniformly mixing each group of shale samples and dividing them into a required number of parts, and then performing compaction processing under twice the simulation pressure. Subsequently, the second thermal simulation experiment may be performed using the processed samples. In this way, the variation of the shale in the stratum environment can be more accurately simulated, so as to obtain more accurate result data.

In one embodiment, during implementation, obtaining, according to each group of second thermal simulation experiments, the oil output quantity, the gas output quantity, the second retained oil quantity and the second retained gas quantity under corresponding preset temperature may comprise: according to a method similar to that for the first thermal simulation experiment, measuring an oil output quantity, a gas output quantity, a retained oil quantity and a retained gas quantity of the shale in a reaction kettle of each group of second thermal simulation experiments at the preset temperature point, respectively, as the oil output quantity, the gas output quantity, the second retained oil quantity and the second retained gas quantity under the corresponding preset temperature.

S14: building an oil output quantity model and a gas output quantity model according to the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature.

In one embodiment, during implementation, building an oil output quantity model and a gas output quantity model according to the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature may comprise:

S14-1: determining an oil generation quantity of each group of shale samples in the plurality of groups of shale samples under each preset temperature according to the oil output quantity and the second retained oil quantity of each group of shale samples in the plurality of groups of shale samples under each preset temperature; and determining a gas generation quantity of each group of shale samples in the plurality of groups of shale samples under each preset temperature according to the gas output quantity and the second retained gas quantity of each group of shale samples in the plurality of groups of shale samples under each preset temperature.

In one embodiment, during implementation, an example of determining an oil generation quantity of a current group under a current preset temperature is taken to describe how to specifically determine an oil generation quantity of each group of shale samples in the plurality of groups of shale samples under each preset temperature according to the oil output quantity and the second retained oil quantity of each group of shale samples in the plurality of groups of shale samples under each preset temperature. Specifically, an oil output quantity and a second retained oil quantity of the current group of shale samples under the current preset temperature may be added together, and a sum thus obtained is taken as the oil generation quantity of the current group of shale samples under the current preset temperature. A way of determining the gas generation quantity is similar to the above way of determining the oil generation quantity. Specifically, a gas output quantity and a second retained gas quantity of the current group of shale samples under the current preset temperature may be added together, and a sum thus obtained is taken as the gas generation quantity of the current group of shale samples under the current preset temperature.

S14-2: building a Ro parameter model according to the Ro parameter of each group of shale samples in the plurality of groups of shale samples under each preset temperature and an initial Ro parameter of each group of shale samples in the plurality of groups of shale samples.

In one embodiment, during implementation, a data analysis may be performed for the Ro parameter of each group of shale samples in the plurality of groups of shale samples under each preset temperature, for example, a law of variation of the Ro parameter of the shale sample along with the temperature is analyzed by table-creation or plotting; and then in conjunction with the initial Ro parameter of the shale sample, a Ro parameter model that can accurately represent the variation situation of the Ro parameter of the shale sample along with the temperature is built, wherein the Ro parameter model employs the temperature as an independent variable and the Ro parameter as a dependent variable to describe the specific variation of the Ro parameter along with the temperature. During the specific use, the Ro parameter model may be utilized to determine the Ro parameter corresponding to each temperature.

In one embodiment, during implementation, the Ro parameter model may be built with the following formula:

$$Ro=0.13787e^{0.005665T}$$

wherein Ro specifically may represent a Ro parameter, and T specifically may represent a temperature.

S14-3: building an oil generation potential model and a gas generation potential model according to the initial TOC parameter, the initial Ro parameter and the initial HC parameter of each group of shale samples in the plurality of groups of shale samples, the Ro parameter model, and the oil generation quantity and the gas generation quantity of each group of shale samples in the plurality of groups of shale samples under each preset temperature.

In one embodiment, during implementation, a data analysis may be performed for the oil generation quantity and the gas generation quantity of each group of shale samples in the plurality of groups of shale samples, and the Ro parameter model, in conjunction with the initial TOC parameter, the initial Ro parameter and the initial HC parameter of each group of shale samples in the plurality of groups of shale samples, so as to analyze an influence-variation relationship between the oil generation potential and the Ro parameter, and an influence-variation relationship between the gas generation potential and the Ro parameter; thereby building an oil generation potential model that can accurately represent the variation situation of the oil generation potential of the shale sample along with the Ro parameter, according to the influence-variation relationship between the oil generation potential and the Ro parameter, and building a gas generation potential model that can accurately represent the variation situation of the gas generation potential of the shale sample along with the Ro parameter according to the influence-variation relationship between the gas generation potential and the Ro parameter; wherein the oil generation potential specifically may represented as a ratio of an oil generation quantity of a shale, which is corresponding to a certain vitrinite reflectance Ro, to a total oil generation quantity of the shale, and the gas generation potential specifically may represented as a ratio of a gas generation quantity of a shale, which is corresponding to a certain vitrinite reflectance Ro, to a total gas generation quantity of the shale; wherein the total oil generation quantity specifically may refer to a total quantity of oil generated by the immature shale from the start to the end of an oil generation, and similarly, the total gas generation quantity specifically may refer to a total quantity of gas generated by the immature shale from the start to the end of a gas generation.

In one embodiment, during implementation, the oil generation potential model may be built with the following formula:

$$Q_{op}=0.01 \times (a_{11} \times e^{b_{11} \times Ro} \times Ro^2)$$

wherein $Q_{op}$ specifically may represent an oil generation potential, Ro specifically may represent a Ro parameter, $a_{11}$ specifically may represent a first-class constant with a reference number of 11, and $b_{11}$ specifically may represent a second-class constant with a reference number of 11.

In one embodiment, $a_{11}$ and $b_{11}$ may be understood as pending coefficients, and may be determined based on the geological background data of the target area and the field observation data during implementation. In this embodiment, the specific value of $a_{11}$ may be set to 8602.3, and the specific value of $b_{11}$ may be set to −5.232. Of course, it should be noted that the above specific values are listed only for the purpose of better describing the embodiment of the present disclosure. During implementation, other values may also be selected based on the specific conditions as the first-class constant $a_{11}$ with a reference number of 11 and the second-class constant $b_{11}$ with a reference number of 11, which are not limited herein.

In one embodiment, during implementation, the gas generation potential model may be built with the following formula:

$$Q_{gp} = 0.01 \times \begin{cases} (a_{21} \times Ro + b_{21}) \times Ro^{0.5} \text{(when } Ro \leq 1.6\%) \\ a_{22} \times Ro^{b_{22}} \times Ro^{0.5} \text{(when } Ro > 1.6\%) \end{cases}$$

wherein $Q_{gp}$ specifically may represent a gas generation potential, Ro specifically may represent a Ro parameter, $a_{21}$ specifically may represent a first-class constant with a reference number of 21, $a_{22}$ specifically may represent a first-class constant with a reference number of 22, $b_{21}$ specifically may represent a second-class constant with a reference number of 21, and $b_{22}$ specifically may represent a second-class constant with a reference number of 22.

In one embodiment, $a_{21}$, $a_{22}$, $b_{21}$ and $b_{22}$ may be understood as pending coefficients, and may be determined based on the geological background data of the target area and the field observation data during implementation. In this embodiment, the specific value of $a_{21}$ may be set to −121.57, the specific value of $a_{22}$ may be set to 236.23, the specific value of $b_{21}$ may be set to 203.33, and the specific value of $b_{22}$ may be set to −6.582. Of course, it should be noted that the above specific values are listed only for the purpose of better describing the embodiment of the present disclosure. During implementation, other values may also be selected based on the specific conditions as the first-class constant $a_{21}$ with a reference number of 21, the first-class constant $a_{22}$ with a reference number of 22, the second-class constant $b_{21}$ with a reference number of 21, and the second-class constant $b_{22}$ with a reference number of 22, which are not limited herein.

S14-4: building a retained oil proportion model and a retained gas proportion model, according to the initial TOC parameter, the initial Ro parameter and the initial HC parameter of each group of shale samples in the plurality of groups of shale samples, the oil generation quantity and the gas generation quantity of each group of shale samples in the plurality of groups of shale samples under each preset temperature, the first retained oil quantity and the first retained gas quantity of each group of shale samples in the plurality of groups of shale samples under each preset temperature, the oil generation potential model, and the gas generation potential model.

In one embodiment, during implementation, building a retained oil proportion model and a retained gas proportion model, according to the initial TOC parameter, the initial Ro parameter and the initial HC parameter of each group of shale samples in the plurality of groups of shale samples, the oil generation quantity and the gas generation quantity of each group of shale samples in the plurality of groups of shale samples under each preset temperature, the first retained oil quantity and the first retained gas quantity of each group of shale samples in the plurality of groups of shale samples under each preset temperature, the oil generation potential model, and the gas generation potential model may comprise:

S1: building an oil generation quantity model according to the oil generation potential model, and building a gas generation quantity model according to the gas generation potential model;

S2: building the retained oil proportion model and the retained gas proportion model, according to the initial TOC parameter, the initial Ro parameter and the initial HC parameter of each group of shale samples in the plurality of groups of shale samples, the oil generation quantity and the gas generation quantity of each group of shale samples in the plurality of groups of shale samples under each preset temperature, the first retained oil quantity and the first retained gas quantity of each group of shale samples in the plurality of groups of shale samples under each preset temperature, the oil generation quantity model, and the gas generation quantity model.

In this embodiment, the oil generation quantity model specifically may be understood as a mathematical model that represents an influence-variation relationship between the oil generation quantity of the shale and the Ro parameter, the HC parameter and the TOC parameter of the shale. The gas generation quantity model specifically may be understood as a mathematical model that represents an influence-variation relationship between the gas generation quantity of the shale and the Ro parameter, the HC parameter and the TOC parameter of the shale.

In one embodiment, during implementation, the oil generation quantity model may be built with the following formula:

$$Q_{og} = Q_{ogs} \times Q_{op} \times \frac{TOC_t}{TOC_s} \times \frac{HC_t}{HC_s}$$

wherein $Q_{og}$ specifically may represent an oil generation quantity, $Q_{ogs}$ specifically may represent a total quantity of oil that can be generated by the immature shale sample, $Q_{op}$ represents an oil generation potential, $TOC_t$ specifically may represent an initial total organic carbon content of a shale sample of a target stratum of a target area to be determined, $TOC_s$ specifically may represent an initial TOC total organic carbon content of the shale sample, $HC_t$ specifically may represent an initial hydrocarbon ratio of atomic number of the shale sample of the target stratum of the target area to be determined, and $HC_s$ specifically may represent an initial HC HC hydrocarbon ratio of atomic number of the shale sample.

In one embodiment, during implementation, the gas generation quantity model may be built with the following formula:

$$Q_{gg} = Q_{ggs} \times Q_{gp} \times \frac{TOC_t}{TOC_s} \times \frac{HC_t}{HC_s}$$

wherein $Q_{gg}$ specifically may represent a gas generation quantity, $Q_{ggs}$ specifically may represent a total quantity of gas that can be generated, $Q_{gp}$ specifically may represent a gas generation potential, $TOC_t$ specifically may represent an initial total organic carbon content of a shale sample of a target stratum of a target area to be determined, $TOC_s$ specifically may represent an initial $TOC_t$ total organic carbon content of the shale sample, $HC_t$ specifically may represent an initial hydrocarbon ratio of atomic number of the shale sample of the target stratum of the target area to be determined, and $HC_s$ specifically may represent an initial HC hydrocarbon ratio of atomic number of the shale sample.

In one embodiment, during implementation, the variation relationship between the retained oil quantity and each parameter may be analyzed in conjunction with the oil generation quantity model, and a retained oil quantity proportion model may be built with the following formula:

$$Q_{osp} = f(TOC_0)_o \times B_{or} \times \frac{HC_t}{HC_s} \times \begin{cases} a_{31} \times Ro + b_{31} & \text{(when } Ro \leq 1.2\%) \\ a_{32} \times Ro^{b_{32}} & \text{(when } Ro > 1.2\%) \end{cases}$$

wherein $Q_{osp}$ specifically may represent a retained oil quantity proportion, $f(TOC_0)_o$ specifically may represent a shale retained oil quantity correction coefficient, $TOC_0$ specifically may represent an initial TOC parameter of a shale sample, $B_{or}$ specifically may represent a ratio of a crude oil volume factor under a stratum pressure of the target area to a crude oil volume factor under a thermal simulation pressure, $Ro$ specifically may represent a Ro parameter, $HC_r$ specifically may represent an initial HC parameter of a shale sample of a target stratum of a target area to be determined, $HC_s$ specifically may represent an initial HC parameter of a shale sample, $a_{31}$ specifically may represent a first-class constant with a reference number of 31, $a_{32}$ specifically may represent a first-class constant with a reference number of 32, $b_{31}$ specifically may represent a second-class constant with a reference number of 31, and $b_{32}$ specifically may represent a second-class constant with a reference number of 32.

In this embodiment, the retained oil quantity proportion $Q_{osp}$ specifically may be used to represent a retained oil quantity proportion and an oil generation quantity proportion in the shale, in correspondence with a certain vitrinite reflectance Ro and the initial TOC parameter.

In one embodiment, $a_{31}$, $a_{32}$, $b_{31}$ and $b_{32}$ may be understood as pending coefficients, and may be determined based on the geological background data of the target area and the field observation data during implementation. In this embodiment, the specific value of $a_{31}$ may be set to 0.67014, the specific value of $a_{32}$ may be set to 0.6464, the specific value of $b_3$, may be set to −0.3530, and the specific value of $b_{32}$ may be set to −2.0292. Of course, it should be noted that the above specific values are listed only for the purpose of better describing the embodiment of the present disclosure. During implementation, other values may also be selected based on the specific conditions as the first-class constant $a_{31}$, with a reference number of 31, the first-class constant $a_{32}$ with a reference number of 32, the second-class constant $b_{31}$ with a reference number of 31, and the second-class constant $b_{32}$ with a reference number of 32, which are not limited herein.

In one embodiment, the shale retained oil quantity correction coefficient specifically may be understood as a dimensionless parameter related to the initial TOC parameter, and during implementation, it may be calculated with the following formula:

$$f(TOC_0)_o = \begin{cases} c_{11} \times \ln(TOC_0) + c_{12} & \text{(when } TOC_0 \leq 9\%) \\ c_{13} \times TOC + c_{14} & \text{(when } TOC_0 > 9\%) \end{cases}$$

wherein $f(TOC_0)_o$ specifically may represent a shale retained oil quantity correction coefficient, TOC specifically may represent an initial TOC parameter of a shale sample, $c_{11}$ specifically may represent a third-class constant with a reference number of 11, $c_{12}$ specifically may represent a third-class constant with a reference number of 12, $c_{13}$ specifically may represent a third-class constant with a reference number of 13, and $c_{14}$ specifically may represent a third-class constant with a reference number of 14.

In one embodiment, $c_{11}$, $c_{12}$, $c_{13}$ and $c_{14}$ may be understood as pending coefficients, and may be determined based on the geological background data of the target area and the field observation data during implementation. In this embodiment, the specific value of $c_{11}$ may be set to −0.8541, the specific value of $c_{12}$ may be set to 2.8581, the specific value of $c_{13}$ may be set to −0.02057, and the specific value of $c_{14}$ may be set to 1.2837. Of course, it should be noted that the above specific values are listed only for the purpose of better describing the embodiment of the present disclosure. During implementation, other values may also be selected based on the specific conditions as the third-class constant $c_{11}$ with a reference number of 11, the third-class constant $c_{12}$ with a reference number of 12, the third-class constant $c_{13}$ with a reference number of 13, and the third-class constant $c_{14}$ with a reference number of 14, which are not limited herein.

In one embodiment, $B_{or}$ specifically may refer to a ratio of a crude oil volume factor under a stratum pressure of the target area to a crude oil volume factor under a thermal simulation pressure, and it is also a dimensionless parameter. During implementation, this parameter may be obtained through experiments according to "Analysis Method for Oil and Gas Reservoir Fluid Property" SY/T 5542-2009.

In one embodiment, during implementation, the variation relationship between the retained gas quantity and each parameter may be analyzed in conjunction with the gas generation quantity model, and a retained gas quantity proportion model may be built with the following formula:

$$Q_{gsp} = f(TOC_0)_g \times f(B_{gi}) \times \frac{HC_t}{HC_s} \times \begin{cases} a_{41} \times Ro + b_{41} & \text{(when } Ro \leq 0.8\%) \\ a_{42} \times Ro^{b_{42}} & \text{(when } 0.8\% < Ro \leq 1.6\%) \\ a_{43} \times Ro^{b_{43}} & \text{(when } Ro > 1.6\%) \end{cases}$$

wherein $Q_{gsp}$ specifically may represent a retained gas quantity proportion, $f(TOC_0)_g$ specifically may represent a shale retained gas quantity correction coefficient, $TOC_0$ specifically may represent an initial TOC parameter of a shale sample, $f(B_{gi})$ specifically may represent a simulation pressure-based natural gas volume factor correction parameter, $B_{gi}$ represents a ratio of a natural gas volume factor under a stratum pressure of the target area to a natural gas volume factor under an experimental thermal simulation pressure, Ro specifically may represent a Ro parameter, $HC_t$ specifically may represent an initial HC parameter of a shale sample of a target stratum of a target area to be determined, $HC_s$ specifically may represent an initial HC parameter of a shale sample, $a_{41}$ specifically may represent a first-class constant with a reference number of 41, $a_{42}$ specifically may represent a first-class constant with a reference number of 42, $a_{43}$ specifically may represent a first-class constant with a reference number of 43, $b_{41}$ specifically may represent a second-class constant with a reference number of 41, $b_{42}$ specifically may represent a second-class constant with a reference number of 42, and $b_{43}$ specifically may represent a second-class constant with a reference number of 43.

In this embodiment, the retained gas quantity proportion $Q_{gsp}$ specifically may be used to represent a retained gas quantity proportion and a gas generation quantity proportion in the shale, in correspondence with a certain vitrinite reflectance Ro and the initial TOC parameter.

In one embodiment, $a_{41}$, $a_{42}$, $a_{43}$, $b_{41}$, $b_{42}$ and $b_{43}$ may be understood as pending coefficients, and may be determined based on the geological background data of the target area and the field observation data during implementation. In this embodiment, the specific value of $a_{41}$ may be set to 0.8700, the specific value of $a_{42}$ may be set to 0.1493, the specific value of $a_{43}$ may be set to 0.3615, the specific value of $b_{41}$ may be set to −0.6858, the specific value of $b_{42}$ may be set to 6.8525, and the specific value of $b_{43}$ may be set to 5.6626. Of course, it should be noted that the above specific values are listed only for the purpose of better describing the embodiment of the present disclosure. During implementation, other values may also be selected based on the specific conditions as the first-class constant $a_{41}$ with a reference number of 41, the first-class constant $a_{42}$ with a reference number of 42, the first-class constant $a_{43}$ with a reference number of 43, the second-class constant $b_{41}$ with a reference number of 41, the second-class constant $b_{42}$ with a reference number of 42, and the second-class constant $b_{43}$ with a reference number of 43, which are not limited herein.

In one embodiment, the shale retained gas quantity correction coefficient specifically may be understood as a dimensionless parameter related to the initial TOC parameter, and during implementation, it may be calculated with the following formula:

$$f(TOC_0)_g = \begin{cases} c_{21} \times \ln(TOC_0) + c_{22} & \text{(when } TOC_0 \leq 8\%) \\ c_{23} \times TOC + c_{24} & \text{(when } TOC_0 > 8\%) \end{cases}$$

wherein $f(TOC_0)_g$ specifically may represent a shale retained gas quantity correction coefficient, $TOC_0$ specifically may represent an initial TOC parameter of a shale sample, $c_{21}$ specifically may represent a third-class constant with a reference number of 21, $c_{22}$ specifically may represent a third-class constant with a reference number of 22, $c_{23}$ specifically may represent a third-class constant with a reference number of 23, and $c_{24}$ specifically may represent a third-class constant with a reference number of 24.

In one embodiment, $c_{21}$, $c_{22}$, $c_{23}$ and $c_{24}$ may be understood as pending coefficients, and may be determined based on the geological background data of the target area and the field observation data during implementation. In this embodiment, the specific value of $c_{21}$ may be set to −0.8259, the specific value of $c_{22}$ may be set to 2.6041, the specific value of $c_{23}$ may be set to −0.01297, and the specific value of $c_{24}$ may be set to 1.0250. Of course, it should be noted that the above specific values are listed only for the purpose of better describing the embodiment of the present disclosure. During implementation, other values may also be selected based on the specific conditions as the third-class constant $c_{21}$ with a reference number of 21, the third-class constant $c_{22}$ with a reference number of 22, the third-class constant $c_{23}$ with a reference number of 23, and the third-class constant $c_{24}$ with a reference number of 24, which are not limited herein.

In one embodiment, during implementation, a simulation pressure-based volume factor correction parameter may be calculated with the following formula:

$$f(B_{gi}) = \frac{P_f \times T_f \times Z_s}{P_s \times T_s \times Z_f}$$

wherein $f(B_{gi})$ specifically may represent a simulation pressure-based natural gas volume factor correction parameter, $P_f$ specifically may represent a stratum pressure of a target area, P specifically may represent a thermal simulation pressure, $T_f$ specifically may represent a stratum temperature of the target area, T specifically may represent a simulation temperature, $Z_f$ specifically may represent a natural gas deviation factor of a stratum of the target area, and $Z_s$ specifically may represent a retained natural gas deviation factor in the thermal simulation experiment, wherein $f(B_{gi})$ may be understood as a parameter variable, in which $B_{gi}$ represents that $f(B_{gi})$ is volume factor-related.

In one embodiment, during implementation, the retained natural gas deviation factor in the thermal simulation experiment may be calculated with the following formula:

$$Z_s = c_{31} \times RO^{c_{32}}$$

wherein $Z_s$ specifically may represent a retained natural gas deviation factor in a thermal simulation experiment, Ro specifically may represent a Ro parameter, $c_{31}$ specifically may represent a third-class constant with a reference number of 31, and $c_{32}$ specifically may represent a third-class constant with a reference number of 32.

In one embodiment, $c_{31}$ and $c_{32}$ may be understood as pending coefficients, and may be determined based on the geological background data of the target area and the field observation data during implementation. In this embodiment, the specific value of $c_{31}$ may be set to 1.7255, and the specific value of $c_{32}$ may be set to −0.4846. Of course, it should be noted that the above specific values are listed only for the purpose of better describing the embodiment of the present disclosure. During implementation, other values may also be selected based on the specific conditions as the third-class constant $c_{31}$ with a reference number of 31 and the third-class constant $c_{32}$ with a reference number of 31, which are not limited herein.

In one embodiment, during implementation, the natural gas deviation factor $Z_f$ of the stratum of the target area may be obtained by calculating according to at least one of "Natural Gas-Calculation of Compression Factor, Part 1: Introduction and Guidelines" GB/T 17747.1-1999, "Natural Gas-Calculation of Compression Factor, Part 2: Calculation Using Molar Composition Analysis" GB/T 17747.2-1999, and "Natural Gas-Calculation of Compression Factor, Part 3: Calculation Using Physical Properties" GB/T 17747.3-1999.

S14-5: building an oil output quantity proportion model and a gas output quantity proportion model, according to the retained oil proportion model, the retained gas proportion model, and the initial TOC parameter, the initial Ro parameter and the initial HC parameter of each group of shale samples in the plurality of groups of shale samples.

In one embodiment, during implementation, building an oil output quantity proportion model and a gas output quantity proportion model according to the retained oil proportion model, the retained gas proportion model, and the initial TOC parameter, the initial Ro parameter and the initial HC parameter of each group of shale samples in the plurality of groups of shale samples may comprise:

S1: building a retained oil quantity model according to the retained oil proportion model, and building a retained gas quantity model according to the retained gas proportion model;

S2: building a total oil quantity model according to the retained oil quantity model and the oil generation quantity model, and building a total gas quantity model according to the retained gas quantity model and the gas generation quantity model;

S3: building an oil output quantity proportion model and a gas output quantity proportion model according to the retained oil quantity model, the retained gas quantity model, the total oil quantity model, the total gas quantity model, as well as the initial TOC parameter, the initial Ro parameter and the initial HC parameter of each group of shale samples in the plurality of groups of shale samples.

In one embodiment, during implementation, the retained oil quantity model may be built with the following formula in conjunction with the retained oil quantity proportion model and the oil generation quantity model:

$$Q_{os}=Q_{osp} \times Q_{og}$$

wherein $Q_{os}$ specifically may represent a retained oil quantity, $Q_{osp}$ specifically may represent a retained oil quantity proportion, and $Q_{og}$ specifically may represent an oil generation quantity.

In one embodiment, during implementation, the retained gas quantity model may be built with the following formula in conjunction with the retained gas quantity proportion model and the gas generation quantity model:

$$Q_{gs}=Q_{gsp} \times Q_{gg}$$

wherein $Q_{gs}$ specifically may represent a retained gas quantity, $Q_{gsp}$ specifically may represent a retained gas quantity proportion, and $Q_{gg}$ specifically may represent a gas generation quantity.

In one embodiment, during implementation, the total oil quantity model may be built with the following formula in conjunction with the retained oil quantity model and the oil generation quantity model:

$$Q_o=Q_{og}+Q_{os}$$

wherein $Q_o$ specifically may represent a total oil quantity, $Q_{og}$ specifically may represent an oil generation quantity, and $Q_{os}$ specifically may represent a retained oil quantity.

In one embodiment, during implementation, the total gas quantity model may be built with the following formula in conjunction with the retained gas quantity model and the gas generation quantity model:

$$Q_g=Q_{gg}+Q_{gs}$$

wherein $Q_g$ specifically may represent a total gas quantity, $Q_{gg}$ specifically may represent a gas generation quantity, and $Q_{gs}$ specifically may represent a retained gas quantity.

In one embodiment, during implementation, the oil output quantity proportion model may be built with the following formula according to the retained oil quantity model and the total oil quantity model, in conjunction with the initial TOC parameter, the initial Ro parameter and the initial HC parameter of each group of shale samples in the plurality of groups of shale samples:

$$Q_{pop}=\begin{cases} a_{51} \times \ln(TOC_0 \times HC_0)+b_{51} & (\text{when } TOC_0 \times HC_0 < 6\%) \\ a_{52} \times \ln(TOC_0 \times HC_0)+b_{52} & (\text{when } 6\% \leq TOC_0 \times HC_0 < 14\%) \\ a_{53} \times \ln(TOC_0 \times HC_0)+b_{53} & (\text{when } TOC_0 \times HC_0 \geq 14\%) \end{cases}$$

wherein $Q_{pop}$ specifically may represent an oil output quantity proportion, $TOC_0$ specifically may represent an initial TOC parameter of a shale sample, $HC_0$ specifically may represent an initial HC parameter of the shale sample, $a_{51}$ specifically may represent a first-class constant with a reference number of 51, $a_{52}$ specifically may represent a first-class constant with a reference number of 52, $a_{53}$ specifically may represent a first-class constant with a reference number of 53, $b_{51}$ specifically may represent a second-class constant with a reference number of 51, $b_{52}$ specifically may represent a second-class constant with a reference number of 52, and $b_{53}$ specifically may represent a second-class constant with a reference number of 53.

In this embodiment, the oil output quantity proportion specifically may represent an oil output quantity proportion and an oil generation quantity proportion in the shale, in correspondence with a certain vitrinite reflectance Ro.

In one embodiment, $a_{51}$, $a_{52}$, $a_{53}$, $b_{51}$, $b_{52}$ and $b_{53}$ may be understood as pending coefficients, and may be determined based on the geological background data of the target area and the field observation data during implementation. In this embodiment, the specific value of $a_{51}$ may be set to 0.2376, the specific value of $a_{52}$ may be set to 0.1530, the specific value of $a_{53}$ may be set to 0.00322, the specific value of $b_{51}$ may be set to 0.0538, the specific value of $b_{52}$ may be set to 0.2156, and the specific value of $b_{53}$ may be set to 0.5719. Of course, it should be noted that the above specific values are listed only for the purpose of better describing the embodiment of the present disclosure. During implementation, other values may also be selected based on the specific conditions as the first-class constant $a_{51}$ with a reference number of 51, the first-class constant $a_{52}$ with a reference number of 52, the first-class constant $a_{53}$ with a reference number of 53, the second-class constant $b_{51}$ with a reference number of 51, the second-class constant $b_{52}$ with a reference number of 52, and the second-class constant $b_{53}$ with a reference number of 53, which are not limited herein.

In one embodiment, during implementation, the gas output quantity proportion model may be built with the following formula according to the retained gas quantity model and the total gas quantity model, in conjunction with the initial TOC parameter, the initial Ro parameter and the initial HC parameter of each group of shale samples in the plurality of groups of shale samples:

$$Q_{pgp} = \begin{cases} a_{61} \times \ln(TOC_0 \times HC_0) + b_{61} & \text{(when } TOC_0 \times HC_0 < 14\%) \\ a_{62} \times \ln(TOC_0 \times HC_0) + b_{62} & \text{(when } TOC_0 \times HC_0 \geq 14\%) \end{cases}$$

wherein $Q_{pgp}$ specifically may represent a gas output quantity proportion, $TOC_0$ specifically may represent an initial TOC parameter of a shale sample, $HC_0$ specifically may represent an initial HC parameter of the shale sample, $a_{61}$ specifically may represent a first-class constant with a reference number of 61, $a_{62}$ specifically may represent a first-class constant with a reference number of 62, $b_{61}$ specifically may represent a second-class constant with a reference number of 61, and $b_{62}$ specifically may represent a second-class constant with a reference number of 62.

In this embodiment, the gas output quantity proportion specifically may represent a gas output quantity proportion and a gas generation quantity proportion in the shale in correspondence with a certain vitrinite reflectance Ro.

In one embodiment, $a_{61}$, $a_{62}$, $b_{61}$ and $b_{62}$ may be understood as pending coefficients, and may be determined based on the geological background data of the target area and the field observation data during implementation. In this embodiment, the specific value of $a_{61}$ may be set to 0.2117, the specific value of $a_{62}$ may be set to 0.00388, the specific value of $b_{61}$ may be set to 0.3169, and the specific value of $b_{62}$ may be set to 0.6310. Of course, it should be noted that the above specific values are listed only for the purpose of better describing the embodiment of the present disclosure. During implementation, other values may also be selected based on the specific conditions as the first-class constant $a_{61}$ with a reference number of 61, the first-class constant $a_{62}$ with a reference number of 62, the second-class constant $b_{61}$ with a reference number of 61, and the second-class constant $b_{62}$ with a reference number of 62, which are not limited herein.

S14-6: building an oil output quantity model according to the oil output quantity proportion model, and building a gas output quantity model according to the gas output quantity proportion model.

In one embodiment, during implementation, the oil output quantity model may be built with the following formula according to the oil output quantity proportion model and the total oil quantity model:

$$Q_{po} = Q_{pop} \times Q_o$$

wherein $Q_{po}$ specifically may represent an oil output quantity, $Q_{pop}$ specifically may represent an oil output quantity proportion, and $Q_o$ specifically may represent a total oil quantity.

In one embodiment, during implementation, the gas output quantity model may be built with the following formula according to the gas output quantity proportion model and the total gas quantity model:

$$Q_{pg} = Q_{pgp} \times Q_g$$

wherein $Q_{pg}$ specifically may represent a gas output quantity, $Q_{pgp}$ specifically may represent a gas output quantity proportion, and $Q_g$ specifically may represent a total gas quantity.

S15: determining an oil output quantity of the target stratum of the target area according to the oil output quantity model, and determining a gas output quantity of the target stratum of the target area according to the gas output quantity model, wherein the oil output quantity and the gas output quantity are used for the evaluation of the development potential of the target area.

In one embodiment, during implementation, the oil output quantity of the target area may be determined with the oil output quantity model, and the gas output quantity of the target area may be determined with the gas output quantity model; then, the oil output quantity and the gas output quantity may be used as the main reference indexes to predict the oil and gas development effect, i.e., the in-situ conversion effect, of the target area, in conjunction with the oil generation quantity determined with the oil generation quantity model, the gas generation quantity determined with the gas generation quantity model, the retained oil quantity determined with the retained oil quantity model, and the retained gas quantity determined with the retained gas quantity model; the development potential of the target area is evaluated according to the predicted oil and gas development effect, so as to guide the specific oil and gas development of the target area. For example, if the in-situ conversion effect is found to be poor according to the predicted oil and gas development effect, the target area can be avoided from being subjected to the oil and gas development using the in-situ conversion technology.

In one embodiment, during implementation, an initial TOC parameter, an initial Ro parameter and an initial HC parameter of a target area to be evaluated may be collected firstly as input data. An oil output quantity of the target area may be determined by inputting the input data into the built oil output quantity model; and a gas output quantity of the target area may be determined by inputting the input data into the built gas output quantity model. Similarly, the above input data may be inputted to the previously built oil generation quantity model, gas generation quantity model, retained oil quantity model and retained gas quantity model, respectively, to obtain corresponding oil generation quantity, gas generation quantity, retained oil quantity and retained gas quantity of the target area, respectively; then, the oil and gas development potentials of the target area can be evaluated more comprehensively and accurately according to various parameters obtained based on the above models, such as the oil output quantity, the gas output quantity, the oil generation quantity, the gas generation quantity, the retained oil quantity and the retained gas quantity, so as to more accurately guide the specific oil and gas development and construction based on the characteristics of the target area, and improve oil and gas development efficiency.

As compared with the existing methods, the embodiment of the present disclosure introduces and uses multiple parameters such as the retained oil quantity, the retained gas quantity, the oil output quantity and the gas output quantity to build accurate oil output quantity model and gas output quantity model, thereby solving the technical problem in the existing methods that the predicted development potential has a large error and a low accuracy, and achieving the technical effect of comprehensively considering the mutual influences between multiple factors, and accurately predicting the development potential of the target area through multiple parameters such as the oil output quantity and the gas output quantity.

It should be noted that during implementation, based on the specific conditions and the construction requirements, the method for determining the oil output quantity of the shale oil in-situ conversion and the method for determining the gas output quantity of the shale oil in-situ conversion may be combined in the above way, and the oil output quantity model and the gas output quantity model may be built at the same time, thereby determining the oil output quantity and the gas output quantity of the shale oil in-situ conversion in the target area. Of course, based on the specific conditions and the construction requirements, the method for determining the oil output quantity of the shale oil in-situ conversion may also be adopted separately to build the oil output quantity model separately, thereby determining the oil output quantity of the shale oil in-situ conversion in the target area separately; and the method for determining the gas output quantity of the shale oil in-situ conversion may also be adopted separately to build the gas output quantity model separately, thereby determining the gas output quantity of the shale oil in-situ conversion in the target area separately, which are not limited herein.

In one embodiment, the plurality of preset temperatures specifically may comprise 11 different temperatures in total, i.e., 250° C., 300° C., 320° C., 335° C., 350° C., 360° C., 390° C., 440° C., 500° C., 540° C. and 580° C., wherein the 11 different temperatures are sequentially corresponding to 11 important different stages in the oil and gas development process, respectively, i.e., the oil generation starting stage, the oil generation quantity rapidly increasing stage I, the oil generation quantity rapidly increasing stage II, the oil generation peak stage I, the oil generation peak stage II, the oil generation peak stage III, the oil generation quantity decreasing stage I, the oil generation quantity decreasing stage II, the oil generation quantity basically ending stage, the gas generation quantity basically ending stage and the gas generation quantity ending stage. In this way, the entire oil and gas development process can be simulated more accurately and completely to obtain more real data. Of course, it should be noted that the plurality of preset temperatures are listed only for the purpose of better describing the embodiments of the present disclosure, and during implementation, the plurality of preset temperatures may also be designed based on the specific conditions and the construction requirements. Specifically, for example 9 different temperatures may be designed as the plurality of preset temperatures to perform the corresponding first thermal simulation experiments and second thermal simulation experiments.

In addition, other different temperatures may also be selected as the preset temperatures to perform the corresponding first thermal simulation experiments and second thermal simulation experiments, which are not limited herein.

In one embodiment, after determining the oil output quantity and the gas output quantity of the target stratum of the target area, during implementation the method may further comprise:

S1: predicting a development potential of the in-situ conversion in the target area according to the oil output quantity and/or the gas output quantity;

S2: guiding an oil and gas development of the target area according to the development potential.

In this embodiment, during implementation, in order to more accurately predict the development potential of the in-situ conversion in the target area, a complete and comprehensive analysis may be performed according to the oil output quantity and the gas output quantity, in conjunction with the previously determined parameters which influence each other, such as the oil generation quantity, the gas generation quantity, the retained oil quantity and the retained gas quantity, so as to more accurately predict the development potential of the in-situ conversion in the target area.

In one embodiment, with regard to the target area lacking the immature shale sample, it is impossible to obtain the initial TOC parameter and the initial HC parameter of the shale sample just by directly applying the method provided by the embodiment of the present disclosure. In order to promote and apply the method provided by the embodiment of the present disclosure to the above target area lacking the immature shale sample, during implementation the method may further comprise:

S1: obtaining a plurality of groups of shale samples of the target area, wherein not all the shale samples are immature shale samples;

S2: performing TOC recovery processing and HC recovery processing on the plurality of groups of shale samples, respectively, to obtain an initial TOC parameter and an initial HC parameter of the target area.

In one embodiment, the immature (i.e., not mature) shale sample specifically may be understood as a shale sample in which a Ro parameter is less than 0.5%. In contrast, the non-immature (i.e., mature) shale sample specifically may be understood as a shale sample in which a Ro parameter is greater than or equal to 0.5%.

It is often impossible to directly obtain the initial TOC parameter and the initial HC parameter of the non-immature shale sample, which leads to the inability to accurately determine the oil output quantity and the gas output quantity of the target area by directly applying the method for determining the oil output quantity and the gas output quantity of the shale oil in-situ conversion provided by the disclosure of the present disclosure. In order to accurately determine the oil output quantity and the gas output quantity of such type of target area to evaluate the development potential of the target area, during implementation, a TOC recovery model and an HC recovery model may be built by TOC recovery processing and HC recovery processing, respectively; next, an initial TOC parameter (i.e., an original TOC parameter) of the shale sample is calculated according to the Ro parameter and the TOC recovery model of the shale sample; and an initial HC parameter (i.e., an original HC parameter) of the shale sample is calculated according to the Ro parameter and the HC recovery model of the shale sample.

In one embodiment, during implementation, performing TOC recovery processing and HC recovery processing on the plurality of groups of shale samples, respectively, to obtain an initial TOC parameter and an initial HC parameter of the target area may comprise:

S1: dividing each group of shale samples in the plurality of groups of shale samples into a plurality of subsamples.

S2: measuring one of the subsamples in each group of shale samples, to obtain a TOC parameter before recovery, an HC parameter before recovery, and a Ro parameter before recovery.

S3: making remaining subsamples in each group of shale samples into a plurality of kerogens, and performing third thermal simulation experiments on the plurality of kerogens under a plurality of preset temperatures, to obtain a Ro parameter, an HC parameter and a TOC parameter of each group of shale samples under each preset temperature; wherein the plurality of preset temperatures included by the third thermal simulation experiment are the same as those included by the first thermal simulation experiment, and a simulation pressure of the third thermal simulation experiment is the same as that of the first thermal simulation experiment.

S4: building a TOC recovery model and an HC recovery model according to the Ro parameter, the HC parameter and the TOC parameter of each group of shale samples under each preset temperature.

S5: calculating an initial TOC parameter with the TOC recovery model according to the Ro parameter of the shale sample, and calculating the initial HC parameter with the HC recovery model according to the Ro parameter of the shale sample.

In one embodiment, during implementation, a TOC parameter corresponding to the Ro parameter recovered to 0.45% through the TOC recovery processing may be used as the initial TOC parameter; and an HC parameter corresponding to the Ro parameter recovered to 0.45% through the HC recovery processing may be used as the initial HC parameter.

In one embodiment, during implementation, building a TOC recovery model and an HC recovery model according to the Ro parameter, the HC parameter and the TOC parameter of each group of shale samples under each preset temperature may comprise: analyzing influenced variation situations of the TOC parameter and the HC parameter along with the Ro parameter according to the Ro parameter model and the obtained Ro parameter, HC parameter and TOC parameter of each group of shale samples under each preset temperature; building an HC recovery model (also called as HC evaluation model) representing a mutual influence relationship between the Ro parameter and the HC parameter according to the influenced variation situations; and building a TOC recovery model (also called as TOC evaluation model) representing a mutual influence relationship between the Ro parameter and the TOC parameter according to the influenced variation situations.

In one embodiment, during implementation, the HC parameter model may be firstly built with the following formula:

$$HC = a_{81} \times Ro^{b_{81}}$$

wherein HC specifically may represent an HC parameter of the shale sample, Ro specifically may represent a Ro parameter of the shale sample, $a_{81}$ specifically may represent a first-class constant with a reference number of 81, and $b_{18}$ specifically may represent a second-class constant with a reference number of 81, wherein the specific values of the first-class constant $a_{81}$ with a reference number of 81 and the second-class constant $b_{81}$ with a reference number of 81 may be determined based on the geological background data of the target area and the field observation data. Specifically, the specific values of the first-class constant with a reference number of 81 and the second-class constant with a reference number of 81 may be determined by referring to the Value Table of Constants with Reference Number of 81 as shown in Table 1.

TABLE 1

Value Table of Constants with Reference Number of 81

| $HC_{OR}$ | Ro ≤ 1.2% | | Ro > 1.2% | |
|---|---|---|---|---|
| | $a_{81}$ | $b_{81}$ | $a_{81}$ | $b_{81}$ |
| 1.736 | 1.06711 | −0.63738 | 1.09145 | −0.80117 |
| 1.643 | 1.02604 | −0.61490 | 1.05445 | −0.81246 |
| 1.525 | 0.98009 | −0.59529 | 1.01271 | −0.82665 |
| 1.349 | 0.95348 | −0.46050 | 0.99481 | −0.85078 |
| 1.150 | 0.88623 | −0.34472 | 0.93228 | −0.85146 |

In one embodiment, during implementation, two parameters, i.e., $HC_1$ and $HC_2$, which are anteroposterior-adjacent to the HC parameter before recovery and corresponding to the Ro parameter, may be calculated with the HC parameter model according to the HC parameter before recovery and the Ro parameter before recovery; next, an initial HC parameter $HC_0$ corresponding to the shale sample is determined with the following formula, i.e., the HC recovery model, in conjunction with the HC parameter model, according to positional relationships between the HC parameter before recovery and $HC_1$ and $HC_2$, as well as initial HC parameters $HC_{OR1}$ and $HC_{OR2}$ corresponding to $HC_1$ and $HC_2$, respectively:

$$HC_0 = HC_{OR2} + \frac{HC_{OR1} \times (HC - HC_2) + HC_{OR2} \times (HC_1 - HC)}{HC_1 + HC_2}$$

wherein $HC_0$ specifically may represent an initial HC parameter of the shale sample, $HC_1$ and $HC_2$ specifically may represent two parameters anteroposterior-adjacent to the HC parameter before recovery, respectively, HC specifically may represent the HC parameter before recovery, and $HC_{OR1}$ and $HC_{OR2}$ specifically may represent initial HC parameters corresponding to $HC_1$ and $HC_2$, respectively.

In one embodiment, when the obtained HC parameter corresponding to the Ro parameter of the shale sample of the target area is greater than $HC_1$ calculated from a top line, during implementation, an initial HC parameter $HC_0$ corresponding to HC may be calculated with the following improved formula (i.e., a first improved HC recovery model) using $HC_1$ and $HC_2$ calculated from two lower lines corresponding to the Ro parameter:

$$HC_O = HC_{OR1} + \frac{(HC - HC_1) \times (HC_{OR1} - HC_{OR2})}{HC_1 - HC_2}$$

wherein $HC_0$ specifically may represent an initial HC parameter of the shale sample, $HC_1$ and $HC_2$ specifically may represent two parameters anteroposterior-adjacent to the HC parameter before recovery, respectively, HC specifically may represent the HC parameter before recovery, and $HC_{OR1}$ and $HC_{OR2}$ specifically may represent initial HC parameters corresponding to $HC_1$ and $HC_2$, respectively.

In one embodiment, when the obtained HC parameter corresponding to the Ro parameter of the shale sample of the target area is less than $HC_1$ calculated from a bottom line, during implementation, an initial HC parameter $HC_0$ corresponding to HC may be calculated with the following improved formula (i.e., a second improved HC recovery model) using $HC_1$ and $HC_2$ calculated from two upper lines corresponding to the Ro parameter:

$$HC_O = HC_{OR2} - \frac{(HC_2 - HC) \times (HC_{OR1} - HC_{OR2})}{HC_1 - HC_2}$$

wherein $HC_O$ specifically may represent an initial HC parameter of the shale sample, $HC_1$ and $HC_2$ specifically may represent two parameters anteroposterior-adjacent to the HC parameter before recovery, respectively, HC specifically may represent the HC parameter before recovery, and $HC_{OR1}$ and $HC_{OR2}$ specifically may represent initial HC parameters corresponding to $HC_1$ and $HC_2$, respectively.

In one embodiment, during implementation, the TOC parameter model may be firstly built with the following formula:

$$TOC = \begin{cases} a_{91} \times Ro^2 + a_{92} \times Ro + a_{93} & Ro \leq 0.9\% \\ a_{94} \times Ro^{a_{95}} & 0.9\% < Ro \leq 1.6\% \\ a_{96} \times Ro^3 + a_{97} \times Ro^2 + a_{98} \times Ro + a_{99} & Ro > 1.6\% \end{cases}$$

wherein TOC specifically may represent a TOC parameter of the shale sample, Ro specifically may represent a Ro parameter of the shale sample, $a_{91}$ specifically may represent a first-class constant with a reference number of 91, $a_{92}$ specifically may represent a first-class constant with a reference number of 92, $a_{93}$ specifically may represent a first-class constant with a reference number of 93, $a_{94}$ specifically may represent a first-class constant with a reference number of 94, $a_{95}$ specifically may represent a first-class constant with a reference number of 95, $a_{96}$ specifically may represent a first-class constant with a reference number of 96, $a_{97}$ specifically may represent a first-class constant with a reference number of 97, $a_{98}$ specifically may represent a first-class constant with a reference number of 98, and $a_{99}$ specifically may represent a first-class constant with a reference number of 99; wherein the specific values of the above first-class constants with the reference numbers of 91 to 99 may be determined based on the geological background data of the target area and the field observation data. Specifically, the specific values of the above first-class constants with the reference numbers of 91 to 99 may be determined by referring to the Value Table of First-Class Constants with Reference Numbers of 91 to 99 as shown in Table 2.

In one embodiment, it is considered that since different types of kerogens are used for different types of target areas, and different kerogens have different hydrocarbon production processes during the third thermal simulation experiment, the TOC parameter model needs to be corrected to obtain a more accurate TOC parameter model. During implementation, a corrected TOC model may be built with the following formula in conjunction with the above TOC parameter model $$TOC = TOC_m \times \frac{(HC_{OR} - HC_{Ro}) \times HN_{ORN}}{(HC_{ORN} - HC_{RoN}) \times HC_{OR}}$$

wherein $TOC_m$ specifically may represent a shale TOC measured value (i.e., a TOC parameter before recovery) corresponding to the Ro parameter of the target area, TOC specifically may represent a corrected TOC parameter, $HC_{OR}$ specifically may represent an initial HC parameter of the shale of the target area, $HC_{Ro}$ specifically may represent an HC measured value (i.e., an HC parameter before recovery) corresponding to the Ro parameter of the target area, and $HC_{ORN}$ specifically may represent an initial HC parameter of the shale obtained based on the TOC parameter model. In this embodiment, the specific value of $HC_{ORN}$ may be set to 1.5326.

In one embodiment, during implementation, two TOC parameters, i.e., $TOC_1$ and $TOC_2$, which are anteroposterior-adjacent to the TOC parameter of the target area before recovery and corresponding to the Ro parameter of the target area, may be calculated with the corrected TOC model; next, an initial TOC parameter of the shale sample is determined with the following formula, i.e., the TOC recovery model according to positional relationships between the TOC parameter before recovery and $TOC_1$ and $TOC_2$, as well as initial TOC parameters $TOC_{OR1}$ and $TOC_{OR2}$ corresponding to $TOC_1$ and $TOC_2$:

$$TOC_O = TOC_{OR2} + \frac{TOC_{OR1} \times (TOC - TOC_2) + TOC_{OR2} \times (TOC_1 - TOC)}{TOC_1 + TOC_2}$$

wherein $TOC_O$ specifically may represent an initial TOC parameter of a shale sample, $TOC_1$ and $TOC_2$ specifically may represent two parameters anteroposterior-adjacent to the TOC parameter before recovery, respectively, TOC specifically may represent the TOC parameter before recovery,

TABLE 2

| Value Table of First-Class Constants with Reference Numbers of 91 to 99 | | | | | | | | | |
|---|---|---|---|---|---|---|---|---|---|
| $TOC_{OR}$ | $a_{91}$ | $a_{92}$ | $a_{93}$ | $a_{94}$ | $a_{95}$ | $a_{96}$ | $a_{97}$ | $a_{98}$ | $a_{99}$ |
| 0.512 | 0.43855 | −0.95987 | 0.86558 | 0.35756 | −0.17481 | −0.00048 | 0.00451 | −0.01433 | 0.34018 |
| 2.034 | −0.06030 | −0.98051 | 2.50603 | 1.50817 | −0.48146 | −0.01231 | 0.11344 | −0.35053 | 1.50846 |
| 3.495 | −1.18195 | −0.15482 | 3.82409 | 2.55494 | −0.65907 | −0.02800 | 0.25990 | −0.80944 | 2.58860 |
| 5.027 | −2.54968 | 1.24278 | 5.00040 | 3.78145 | −0.67392 | −0.05260 | 0.47806 | −1.45386 | 4.03539 |
| 6.436 | −4.60952 | 3.45111 | 5.82592 | 4.80780 | −0.71298 | −0.06357 | 0.58765 | −1.82381 | 5.05989 |
| 8.509 | −7.63624 | 6.86870 | 6.96110 | 6.40221 | −0.73233 | −0.09438 | 0.86833 | −2.67621 | 6.91878 |
| 13.341 | 11.81356 | 10.70850 | 10.90502 | 10.06789 | −0.75869 | −0.14685 | 1.34121 | −4.11784 | 10.69317 |
| 20.674 | −22.56708 | 21.94670 | 15.32376 | 15.18610 | −0.88752 | −0.28999 | 2.62220 | −7.94331 | 17.01427 |
| 25.988 | −29.93021 | 30.20183 | 18.38031 | 19.27137 | −0.86333 | −0.34609 | 3.16814 | −9.72239 | 21.48023 | and $TOC_{OR1}$ and $TOC_{OR2}$ specifically may represent initial TOC parameters corresponding to $TOC_1$ and $TOC_2$, respectively.

In one embodiment, when the obtained TOC corresponding to the Ro parameter of the target area is greater than $TOC_1$ calculated from a top line, during implementation, an initial TOC parameter $TOC_O$ of the shale sample may be calculated with the following improved formula (i.e., a first improved TOC recovery model) using $TOC_1$ and $TOC_2$ calculated from two lower lines corresponding to the Ro parameter:

$$TOC_O = TOC_{OR1} + \frac{(TOC - TOC_1) \times (TOC_{OR1} - TOC_{OR2})}{TOC_1 - TOC_2}$$

wherein $TOC_0$ specifically may represent an initial TOC parameter of a shale sample, $TOC_1$ and $TOC_2$ specifically may represent two parameters anteroposterior-adjacent to the TOC parameter before recovery, respectively, TOC specifically may represent the TOC parameter before recovery, and $TOC_{OR1}$ and $TOC_{OR2}$ specifically may represent initial TOC parameters corresponding to $TOC_1$ and $TOC_2$, respectively.

In one embodiment, when the obtained TOC corresponding to the Ro parameter of the target area is less than $TOC_1$ calculated from a bottom line, during implementation, an initial TOC parameter $TOC_O$ of the shale sample may be calculated with the following improved formula (i.e., a second improved TOC recovery model) using $TOC_1$ and $TOC_2$ calculated from two upper lines corresponding to the Ro parameter:

$$TOC_O = TOC_{OR2} - \frac{(TOC_2 - TOC) \times (TOC_{OR1} - TOC_{OR2})}{TOC_1 - TOC_2}$$

wherein $TOC_0$ specifically may represent an initial TOC parameter of a shale sample, $TOC_1$ and $TOC_2$ specifically may represent two parameters anteroposterior-adjacent to the TOC parameter before recovery, respectively, TOC specifically may represent the TOC parameter before recovery, and $TOC_{OR1}$ and $TOC_{OR2}$ specifically may represent initial TOC parameters corresponding to $TOC_1$ and $TOC_2$, respectively.

This embodiment may be not limited to the type of the shale sample by adopting the TOC recovery model and the HC recovery model provided by the embodiments of the present disclosure. That is to say, even if the shale sample of the target area is not an immature shale sample, the method for determining the oil output quantity and the gas output quantity of the shale oil in-situ conversion provided by the embodiments of the present disclosure may also be promoted and applied to determine the oil output quantity and the gas output quantity of the target area, thereby determining the oil and gas development potentials of the target area. Specifically, the Ro parameter of the target area, as well as the TOC parameter and the HC parameter of the target area before recovery corresponding to the Ro parameter may be collected firstly; next, the initial TOC parameter and the initial HC parameter may be obtained by the TOC recovery processing and the HC recovery processing using the TOC recovery model and the HC recovery model, or using the improved TOC recovery model and the improved HC recovery model, according to the collected Ro parameter of the target area as well as the TOC parameter and the HC parameter of the target area before recovery corresponding to the Ro parameter; then, the oil output quantity and the gas output quantity of the target area are determined using the initial TOC parameter and the initial HC parameter, according to the method for determining the oil output quantity and the gas output quantity of the shale oil in-situ conversion provided by the embodiments of the present disclosure; and finally, the oil and gas development potentials of the target area are evaluated according to the oil output quantity and the gas output quantity.

As can be seen from the above description, the method for determining the oil output quantity and the gas output quantity of the shale oil in-situ conversion provided by the embodiments of the present disclosure introduces and uses multiple parameters such as the retained oil quantity, the retained gas quantity, the oil output quantity and the gas output quantity to build accurate oil output quantity model and gas output quantity model, thereby solving the technical problem in the existing methods that the predicted development potential has a large error and a low accuracy, and achieving the technical effect of comprehensively considering the mutual influences between multiple factors, and accurately predicting the development potential of the target area through multiple parameters such as the oil output quantity and the gas output quantity. The above method further introduces the TOC recovery processing and the HC recovery processing, to achieve the technical effect of quickly and simply determining the oil output quantities and the gas output quantities of the shale oil in-situ conversions in various types of areas having different Ro parameters. The above method also performs the second thermal simulation experiment employing the simulation pressure as the in-situ conversion pressure, so as to simulate the specific in-situ conversion process, and accurately determine multiple parameters such as the oil output quantity, the gas output quantity, the oil generation quantity, the gas generation quantity, the retained oil quantity and the retained gas quantity under the in-situ conversion conditions, thereby accurately predicting the in-situ conversion-based development potential of the target area.

Figure 2:
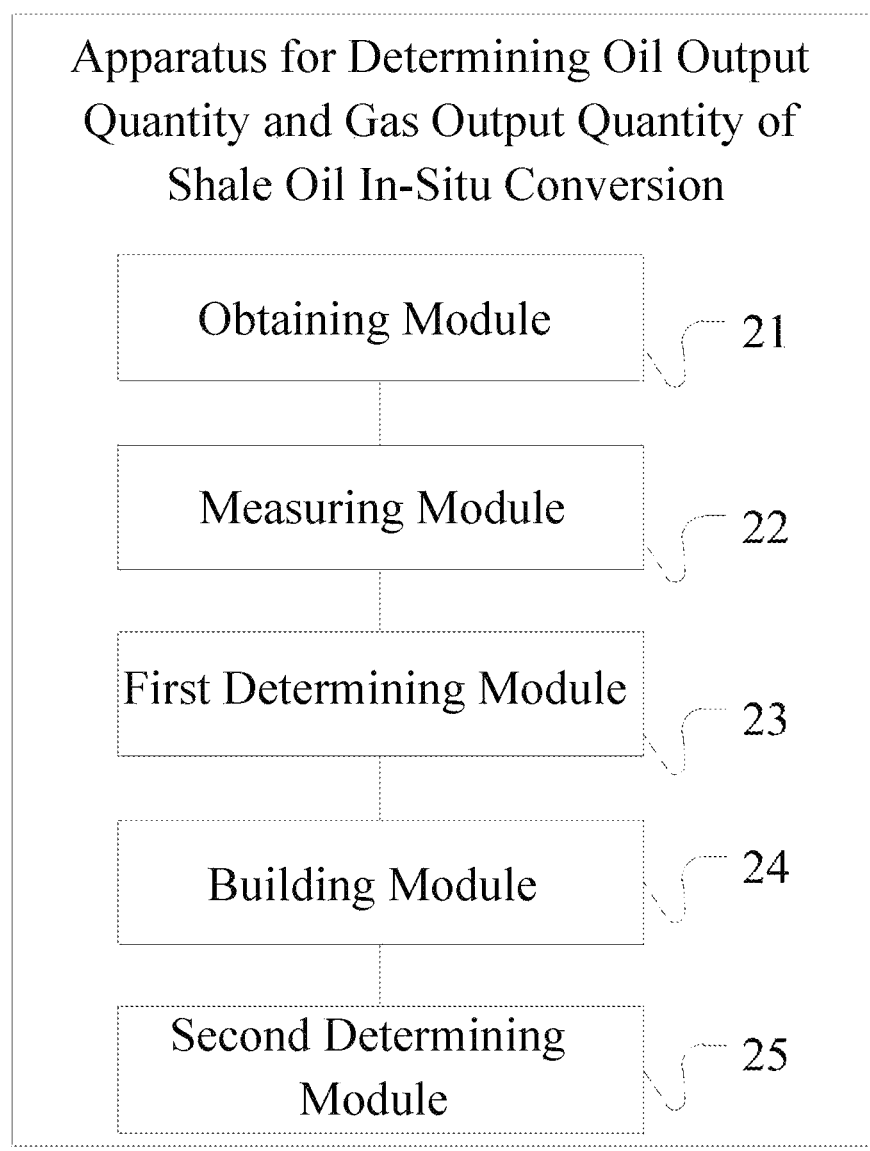
FIG. 2 is a composition structure diagram of an apparatus for determining an oil output quantity and a gas output quantity of a shale oil in-situ conversion provided by an embodiment of the present disclosure.

Based on the same inventive concept, the embodiments of the present disclosure further provide an apparatus for determining an oil output quantity and a gas output quantity of a shale oil in-situ conversion, as described in the following embodiments. As the above apparatus solves the problem in a principle similar to that adopted by corresponding method for determining an oil output quantity and a gas output quantity of a shale oil in-situ conversion, the implementations of the apparatus may refer to the implementations of the corresponding method, and the repeated contents will be omitted. The term "unit" or "module" as used hereinafter may be a combination of software and/or hardware that can realize a predetermined function. Although the apparatus described in the following embodiments is preferably implemented by software, hardware or a combination of software and hardware is also possible and conceivable. Please refer to FIG. 2, which illustrates a composition structure diagram of an apparatus for determining an oil output quantity and a gas output quantity of a shale oil in-situ conversion provided by an embodiment of the present disclosure. The apparatus specifically may comprise: an obtaining module 21, a measuring module 22, a first determining module 23, a building module 24, and a second determining module 25. The structure will be specifically described below.

The obtaining module 21 specifically may be configured to obtain a plurality of groups of shale samples of a target stratum of a target area, wherein the shale samples are immature shale samples.

The measuring module 22 specifically may be configured to measure the plurality of groups of shale samples to obtain an initial TOC parameter, an initial Ro parameter, and an initial HC parameter of each group of shale samples in the plurality of groups of shale samples.

The first determining module 23 specifically may be configured to determine, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature.

The building module 24 specifically may be configured to build an oil output quantity model and a gas output quantity model according to the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature.

The second determining module 25 specifically may be configured to determine an oil output quantity of the target stratum of the target area according to the oil output quantity model, and determine a gas output quantity of the target stratum of the target area according to the gas output quantity model.

In one embodiment, in order to determine, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature, the first determining module 23 specifically may comprise:

a first determining unit which specifically may be configured to perform a first thermal simulation experiment on each group of shale samples in the plurality of groups of shale samples to determine the first retained oil quantity, the first retained gas quantity, and the Ro parameter of each group of shale samples in the plurality of groups of shale samples under each preset temperature, wherein a simulation pressure of the first thermal simulation experiment is a stratum pressure, and the first thermal simulation experiment includes semi-open thermal simulation experiments under a plurality of preset temperatures;

a second determining unit which specifically may be configured to perform a second thermal simulation experiment on each group of shale samples in the plurality of groups of shale samples to determine the oil output quantity, the gas output quantity, the second retained oil quantity and the second retained gas quantity of each group of shale samples in the plurality of groups of shale samples under each preset temperature, wherein a simulation pressure of the second thermal simulation experiment is an in-situ conversion pressure, the second thermal simulation experiment includes semi-open thermal simulation experiments under a plurality of preset temperatures, and the plurality of preset temperatures included by the second thermal simulation experiment are the same as those included by the first thermal simulation experiment.

In one embodiment, in order to build an oil output quantity model and a gas output quantity model according to the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature, the building module 24 specifically may comprise:

a third determining unit which specifically may be configured to determine an oil generation quantity of each group of shale samples in the plurality of groups of shale samples under each preset temperature according to the oil output quantity and the second retained oil quantity of each group of shale samples in the plurality of groups of shale samples under each preset temperature; and determine a gas generation quantity of each group of shale samples in the plurality of groups of shale samples under each preset temperature according to the gas output quantity and the second retained gas quantity of each group of shale samples in the plurality of groups of shale samples under each preset temperature;

a first building unit which specifically may be configured to build a Ro parameter model, according to the Ro parameter of each group of shale samples in the plurality of groups of shale samples under each preset temperature and an initial Ro parameter of each group of shale samples in the plurality of groups of shale samples;

a second building unit which specifically may be configured to build an oil generation potential model and a gas generation potential model, according to the initial TOC parameter, the initial Ro parameter and the initial HC parameter of each group of shale samples in the plurality of groups of shale samples, the Ro parameter model, and the oil generation quantity and the gas generation quantity of each group of shale samples in the plurality of groups of shale samples under each preset temperature;

a third building unit which specifically may be configured to build a retained oil proportion model and a retained gas proportion model, according to the initial TOC parameter, the initial Ro parameter and the initial HC parameter of each group of shale samples in the plurality of groups of shale samples, the oil generation quantity and the gas generation quantity of each group of shale samples in the plurality of groups of shale samples under each preset temperature, the first retained oil quantity and the first retained gas quantity of each group of shale samples in the plurality of groups of shale samples under each preset temperature, the oil generation potential model, and the gas generation potential model;

a fourth building unit which specifically may be configured to build an oil output quantity proportion model and a gas output quantity proportion model, according to the retained oil proportion model, the retained gas proportion model, as well as the initial TOC parameter, the initial Ro parameter and the initial HC parameter of each group of shale samples in the plurality of groups of shale samples;

a fifth building unit which specifically may be configured to build an oil output quantity model according to the oil output quantity proportion model, and build a gas output quantity model according to the gas output quantity proportion model.

In one embodiment, during implementation, the second building unit may build the oil generation potential model with the following formula:

$$Q_{op} = 0.01 \times (a_{11} \times e^{b_{11} \times Ro} \times Ro^2)$$

wherein $Q_{op}$ specifically may represent an oil generation potential, Ro specifically may represent a Ro parameter, $a_{11}$ specifically may represent a first-class constant with a reference number of 11, and $b_{11}$ specifically may represent a second-class constant with a reference number of 11.

In one embodiment, during implementation, the second building unit may build the gas generation potential model with the following formula:

$$Q_{gp} = 0.01 \times \begin{cases} (a_{21} \times Ro + b_{21}) \times Ro^{0.5} & \text{(when } Ro \leq 1.6\%) \\ a_{22} Ro^{b_{22}} \times Ro^{0.5} & \text{(when } Ro > 1.6\%) \end{cases}$$

wherein $Q_{gp}$ specifically may represent a gas generation potential, Ro specifically may represent a Ro parameter, $a_{21}$ specifically may represent a first-class constant with a reference number of 21, $a_{22}$ specifically may represent a first-class constant with a reference number of 22, $b_{21}$ specifically may represent a second-class constant with a reference number of 21, and $b_{22}$ specifically may represent a second-class constant with a reference number of 22.

In one embodiment, during implementation, the third building unit may build the retained oil quantity proportion model with the following formula:

$$Q_{osp} = f(TOC_0)_o \times B_{or} \times \frac{HC_t}{HC_s} \times \begin{cases} a_{31} \times Ro + b_{31} & \text{(when } Ro \leq 1.2\%) \\ a_{32} \times Ro^{b_{32}} & \text{(when } Ro > 1.2\%) \end{cases}$$

wherein $Q_{osp}$ specifically may represent a retained oil quantity proportion, $f(TOC_0)_o$ specifically may represent a shale retained oil quantity correction coefficient, $TOC_0$ specifically may represent an initial TOC parameter of a shale sample, $B_{or}$ specifically may represent a ratio of a crude oil volume factor under a stratum pressure of the target area to a crude oil volume factor under a thermal simulation pressure, Ro specifically may represent a Ro parameter, $HC_t$ specifically may represent an initial HC parameter of a shale sample of a target stratum of a target area to be determined, $HC_s$ specifically may represent an initial HC parameter of a shale sample, $a_{31}$ specifically may represent a first-class constant with a reference number of 31, $a_{32}$ specifically may represent a first-class constant with a reference number of 32, $b_{31}$ specifically may represent a second-class constant with a reference number of 31, and $b_{32}$ specifically may represent a second-class constant with a reference number of 32.

In one embodiment, during implementation, the third building unit may build the retained gas quantity proportion model with the following formula:

$$Q_{gsp} = f(TOC_0)_g \times f(B_{gi}) \times \frac{HC_t}{HC_s} \times \begin{cases} a_{41} \times Ro + b_{41} & \text{(when } Ro \leq 0.8\%) \\ a_{42} \times Ro^{b_{42}} & \text{(when } 0.8\% < Ro \leq 1.6\%) \\ a_{43} \times Ro^{b_{43}} & \text{(when } Ro > 1.6\%) \end{cases}$$

wherein $Q_{gsp}$ specifically may represent a retained gas quantity proportion, $f(TOC_0)_g$ specifically may represent a shale retained gas quantity correction coefficient, $TOC_0$ specifically may represent an initial TOC parameter of a shale sample, $f(B_{gi})$ specifically may represent a simulation pressure-based natural gas volume factor correction parameter, $B_{gi}$ represents a ratio of a natural gas volume factor under a stratum pressure of the target area to a natural gas volume factor under an experimental thermal simulation pressure, Ro specifically may represent a Ro parameter, $HC_t$ specifically may represent an initial HC parameter of a shale sample of a target stratum of a target area to be determined, $HC_s$ specifically may represent an initial HC parameter of a shale sample, $a_{41}$ specifically may represent a first-class constant with a reference number of 41, $a_{42}$ specifically may represent a first-class constant with a reference number of 42, $a_{43}$ specifically may represent a first-class constant with a reference number of 43, $b_{41}$ specifically may represent a second-class constant with a reference number of 41, $b_{42}$ specifically may represent a second-class constant with a reference number of 42, and $b_{43}$ specifically may represent a second-class constant with a reference number of 43.

In one embodiment, during implementation, the fourth building unit may build the oil output quantity proportion model with the following formula:

$$Q_{pop} = \begin{cases} a_{51} \times \ln(TOC_0 \times HC_0) + b_{51} & \text{(when } TOC_0 \times HC_0 < 6\%) \\ a_{52} \times \ln(TOC_0 \times HC_0) + b_{52} & \text{(when } 6\% \leq TOC_0 \times HC_0 < 14\%) \\ a_{53} \times \ln(TOC_0 \times HC_0) + b_{53} & \text{(when } TOC_0 \times HC_0 \geq 14\%) \end{cases}$$

wherein $Q_{pop}$ specifically may represent an oil output quantity proportion, $TOC_0$ specifically may represent an initial TOC parameter of a shale sample, $HC_0$ specifically may represent an initial HC parameter of the shale sample, $a_{51}$ specifically may represent a first-class constant with a reference number of 51, $a_{52}$ specifically may represent a first-class constant with a reference number of 52, $a_{53}$ specifically may represent a first-class constant with a reference number of 53, $b_{51}$ specifically may represent a second-class constant with a reference number of 51, $b_{52}$ specifically may represent a second-class constant with a reference number of 52, and $b_{53}$ specifically may represent a second-class constant with a reference number of 53.

In one embodiment, during implementation, the fourth building unit may build the gas output quantity proportion model with the following formula:

$$Q_{pgp} = \begin{cases} a_{61} \times \ln(TOC_0 \times HC_0) + b_{61} & \text{(when } TOC_0 \times HC_0 < 14\%) \\ a_{62} \times \ln(TOC_0 \times HC_0) + b_{62} & \text{(when } TOC_0 \times HC_0 \geq 14\%) \end{cases}$$

wherein $Q_{pgp}$ specifically may represent a gas output quantity proportion, $TOC_0$ specifically may represent an initial TOC parameter of a shale sample, $HC_0$ specifically may represent an initial HC parameter of the shale sample, $a_{61}$ specifically may represent a first-class constant with a reference number of 61, $a_{62}$ specifically may represent a first-class constant with a reference number of 62, $b_{61}$ specifically may represent a second-class constant with a reference number of 61, and $b_{62}$ specifically may represent a second-class constant with a reference number of 62.

In one embodiment, the apparatus may further comprise a recovering module, wherein during implementation, the recovering module may perform TOC recovery processing and HC recovery processing on the shale sample having a Ro parameter greater than or equal to 0.5% to obtain the initial TOC parameter and the initial HC parameter, so as to promote and apply the built oil output quantity model and gas output quantity model to various types of areas having different Ro parameters, thereby quickly and simply determining the oil output quantities and the gas output quantities of the various types of areas having different Ro parameters, and performing corresponding development potential evaluations.

In one embodiment, the apparatus may further comprise a construction module which specifically may be configured to predict a development potential of the in-situ conversion in the target area according to the oil output quantity and/or the gas output quantity; and guide an oil and gas development of the target area according to the development potential.

The embodiments herein are all described in a progressive manner, and the same or similar portions of the embodiments can refer to each other. Each embodiment lays an emphasis on its distinctions from other embodiments. In particular, the system embodiment is simply described since it is substantially similar to the method embodiment, and please refer to the description of the method embodiment for the relevant portion.

It should be noted that any system, apparatus, module or unit set forth in the embodiments specifically may be implemented by a computer chip or an entity, or by a product having a certain function. For the convenience of description, herein the apparatus is described by being divided into various units based on its functions and described respectively. Of course, the functions of the various unit may be realized in the same one or more software and/or hardware when the present disclosure is implemented.

In addition, herein the adjectives such as "first" and "second" can only be used to distinguish one element or action from another element or action, without necessarily requiring or implying any actual such relationship or order. Where the context permits, the reference element or component or step (or the like) should not be construed as being limited to only one of the elements, components, or steps, but may be one or more of the elements, components, or steps.

As can be seen from the above description, the apparatus for determining the oil output quantity and the gas output quantity of the shale oil in-situ conversion provided by the embodiments of the present disclosure introduces and uses, by the first determining module and the building module, multiple parameters such as the retained oil quantity, the retained gas quantity, the oil output quantity and the gas output quantity to build accurate oil output quantity model and gas output quantity model, thereby solving the technical problem in the existing methods that the predicted development potential has a large error and a low accuracy, and achieving the technical effect of comprehensively considering the mutual influences between multiple factors, and accurately predicting the development potential of the target area through multiple parameters such as the oil output quantity and the gas output quantity. The above apparatus further introduces, by the recovering module, the TOC recovery processing and the HC recovery processing, to achieve the technical effect of quickly and simply determining the oil output quantities and the gas output quantities of the shale oil in-situ conversions in various types of areas having different Ro parameters. The above apparatus also performs, by the first determining module, the second thermal simulation experiment employing the simulation pressure as the in-situ conversion pressure, so as to simulate the specific in-situ conversion process, and accurately determine multiple parameters such as the oil output quantity, the gas output quantity, the oil generation quantity, the gas generation quantity, the retained oil quantity and the retained gas quantity under the in-situ conversion conditions, thereby accurately predicting the in-situ conversion-based development potential of the target area.

It should be noted that during implementation, based on the specific conditions and the construction requirements, the apparatus for determining the oil output quantity of the shale oil in-situ conversion and the apparatus for determining the gas output quantity of the shale oil in-situ conversion may be combined in the above way, and the oil output quantity model and the gas output quantity model may be built at the same time by the apparatus for determining the oil output quantity and the gas output quantity of the shale oil in-situ conversion, thereby determining the oil output quantity and the gas output quantity of the shale oil in-situ conversion in the target area. Of course, based on the specific conditions and the construction requirements, the apparatus for determining the oil output quantity and the gas output quantity of the shale oil in-situ conversion may also be adopted as the apparatus for determining the oil output quantity of the shale oil in-situ conversion, to build the oil output quantity model separately, thereby determining the oil output quantity of the shale oil in-situ conversion in the target area separately; and the apparatus for determining the gas output quantity and the gas output quantity of the shale oil in-situ conversion may also be adopted as the apparatus for determining the gas output quantity of the shale oil in-situ conversion, to build the gas output quantity model separately, thereby determining the gas output quantity of the shale oil in-situ conversion in the target area separately, which are not limited herein.

Figure 3:
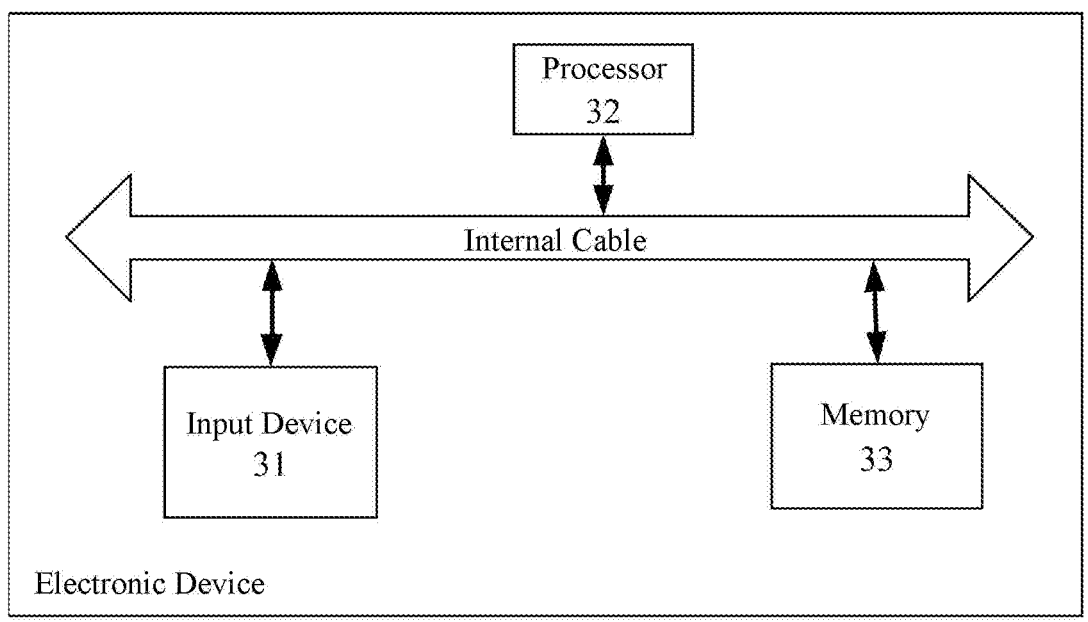
FIG. 3 is a composition structure diagram of an electronic device based on a method for determining an oil output quantity and a gas output quantity of a shale oil in-situ conversion provided by an embodiment of the present disclosure.

The embodiments of the present disclosure further provide an electronic device, please refer to FIG. 3, which illustrates a composition structure diagram of an electronic device based on a method for determining an oil output quantity and a gas output quantity of a shale oil in-situ conversion provided by an embodiment of the present disclosure. The electronic device specifically may comprise an input device 31, a processor 32 and a memory 33, wherein the input device 31 specifically may be configured to input a plurality of groups of shale samples of a target stratum of a target area, wherein the shale samples are immature shale samples. The processor 32 specifically may be configured to measure the plurality of groups of shale samples to obtain an initial TOC parameter, an initial Ro parameter, and an initial HC parameter of each group of shale samples in the plurality of groups of shale samples; determine, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature; build an oil output quantity model and a gas output quantity model according to the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature; determine an oil output quantity of the target stratum of the target area according to the oil output quantity model, and determine a gas output quantity of the target stratum of the target area according to the gas output quantity model. The memory 33 specifically may be configured to store the shale samples inputted by the input device 31, intermediate data generated in the process of determining the oil output quantity and the gas output quantity of the shale oil in-situ conversion of the target stratum of the target area, such as the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature, and the built models such as the gas output quantity model and the oil output quantity model.

In this embodiment, the input device specifically may be one of the main devices for information exchange between the user and the computer system. The input device may include a keyboard, a mouse, a camera, a scanner, a light pen, a handwriting input board, a voice input device, and the like; the input device is configured to input original data and a program for processing the same into a computer. The input device may also obtain and receive data transmitted from other modules, units, and devices. The processor may be implemented in any suitable manner. For example, the processor may take a form such as a microprocessor or a processor, a computer readable medium storing computer readable program codes (e.g. software or firmware) executable by the (micro)processor, a logic gate, a switch, an Application Specific Integrated Circuit (ASIC), a programmable logic controller, or an embedded microcontroller. The memory specifically may be a memory device for storing information in the modern information technology. The memory may include multiple levels: in a digital system, any means capable of saving the binary data may be a memory; in an integrated circuit, a circuit having a storage function but without a physical form is also called as a memory, such as RAM, FIFO, etc.; and in a system, a storage device with a physical form is also called as a memory, such as a memory bank, a TF card, etc.

In this embodiment, the functions and effects specifically achieved by the electronic device can be explained with reference to other embodiments, and they are omitted herein.

The embodiments of the present disclosure further provide a computer storage medium based on the method for determining the oil output quantity and the gas output quantity of the shale oil in-situ conversion. The computer storage medium stores computer program instructions which, when executed, obtain a plurality of groups of shale samples of a target stratum of a target area, wherein the shale samples are immature shale samples; measure the plurality of groups of shale samples to obtain an initial TOC parameter, an initial Ro parameter, and an initial HC parameter of each group of shale samples in the plurality of groups of shale samples; determine, according to the plurality of groups of shale samples, a first retained oil quantity, a first retained gas quantity, a Ro parameter, an oil output quantity, a gas output quantity, a second retained oil quantity, and a second retained gas quantity of each group of shale samples in the plurality of groups of shale samples under each preset temperature; build an oil output quantity model and a gas output quantity model according to the first retained oil quantity, the first retained gas quantity, the Ro parameter, the oil output quantity, the gas output quantity, the second retained oil quantity and the second retained gas quantity of each group of shale samples in the plurality of groups of shale samples under each preset temperature; determine an oil output quantity of the target stratum of the target area according to the oil output quantity model; and determine a gas output quantity of the target stratum of the target area according to the gas output quantity model.

In this embodiment, the storage medium includes, but not limited to, a random-access memory (RAM), a read-only memory (ROM), a cache, a hard disk drive (HDD) or a memory card. The memory may be configured to store the computer program instructions. The network communication unit may be an interface for performing network connection and communication disposed according to a standard stipulated by a communication protocol.

In this embodiment, the functions and effects specifically achieved by the program instructions stored in the computer storage medium can be explained with reference to other embodiments, and they are omitted herein.

Figure 4:
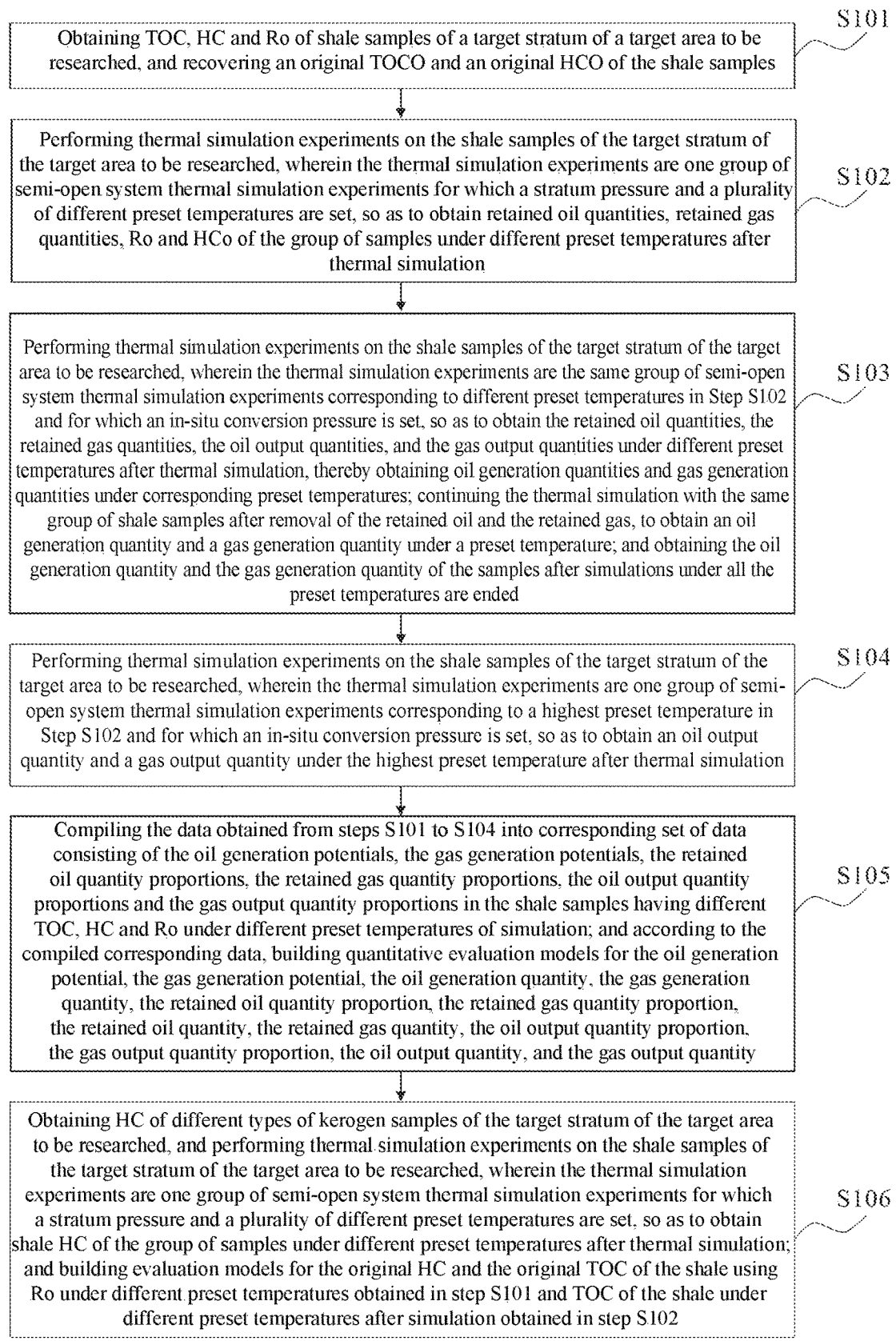
FIG. 4 is a flow diagram of an evaluation of a development potential of a target area by applying, in a scenario example, a method for determining an oil output quantity and a gas output quantity of a shale oil in-situ conversion provided by an embodiment of the present disclosure.

In one specific implementation scenario example, the method and apparatus for determining the oil output quantity and the gas output quantity of the shale oil in-situ conversion provided by the embodiments of the present disclosure are applied to predict and evaluate the development potential of the following target area to be researched. The specific implementation process may refer to FIG. 4, which illustrates a flow diagram of an evaluation of a development potential of a target area by applying, in a scenario example, a method for determining an oil output quantity and a gas output quantity of a shale oil in-situ conversion provided by an embodiment of the present disclosure, and may be performed with reference to the following content:

Step S101: obtaining TOC, HC and Ro of shale samples of a target stratum of a target area to be researched, and recovering an original $TOC_O$ (i.e., an initial TOC parameter) and an original $HC_O$ (i.e., an initial HC parameter) of the shale samples.

In this embodiment, during implementation, the samples (i.e., the shale samples) of the target stratum of the target area to be researched specifically may be 9 outcrop-section shale of a Yanchang Formation of XXX Basin. Specifically, it is possible to dig 8 meters or more below the ground to obtain corresponding shale samples and ensure that those samples are not weathered. 50 kg samples are collected at each sampling point, pulverized into a size of 60 meshes respectively, and mixed uniformly, while each group of samples are divided into 24 parts (i.e., subsamples). In which, one sample is taken from each group of samples to measure TOC, HC and Ro of the shale sample. For the detail, please refer to the Table of Characteristic Parameters of Shale Samples of Target Area to be Researched, as shown in Table 3. It should be added that in the table, the TOC parameter specifically may be measured according to a national standard "Determination of Total Organic Carbon in Sedimentary Rock" GB/T 19145-2003; the HC parameter specifically may be measured according to an industrial standard "Geochemical Evaluation Method for Terrestrial Hydrocarbon Source Rocks" SYT 5735-1995; and the Ro parameter specifically may be measured according to an industrial standard "Determination Method for Vitrinite Reflectance in Sedimentary Rocks" SY/T 5124-2012. For the non-immature shale sample, its original $TOC_O$ and original $HC_O$ may be obtained by recovery processing according to the subsequent methods of TOC recovery processing and HC recovery processing.

TABLE 3

Table of Characteristic Parameters of Shale
Samples of Target Area to be Researched

| | Sample No. | | | | | | | | |
|---|---|---|---|---|---|---|---|---|---|
| | No. 1 | No. 2 | No. 3 | No. 4 | No. 5 | No. 6 | No. 7 | No. 8 | No. 9 |
| TOC(%) | 0.512 | 2.034 | 3.495 | 5.027 | 6.436 | 8.509 | 13.341 | 20.674 | 25.988 |
| HC | 1.563 | 1.488 | 1.547 | 1.518 | 1.524 | 1.507 | 1.512 | 1.577 | 1.557 |
| Ro(%) | 0.431 | 0.458 | 0.474 | 0.469 | 0.473 | 0.467 | 0.481 | 0.468 | 0.482 |

Step S102: performing thermal simulation experiments (i.e., first thermal simulation experiments) on the shale samples of the target stratum of the target area to be researched, wherein the thermal simulation experiments are one group of semi-open system thermal simulation experiments for which a stratum pressure and a plurality of different preset temperatures are set, so as to obtain retained oil quantities (i.e., first retained oil quantities), retained gas quantities (i.e., first retained gas quantities), Ro, TOC and HC of the group of samples under different preset temperatures after thermal simulation.

In this embodiment, during implementation, firstly the conventional rapid semi-open thermal simulation experiments may be adopted to obtain the rough temperature ranges of 11 points as the preset temperatures, wherein the 11 points are corresponding to an oil generation starting stage, an oil generation quantity rapidly increasing stage I, an oil generation quantity rapidly increasing stage II, an oil generation peak stage I, an oil generation peak stage II, an oil generation peak stage III, an oil generation quantity decreasing stage I, an oil generation quantity decreasing stage II, an oil generation quantity basically ending stage, a gas generation quantity basically ending stage and a gas generation quantity ending stage, respectively; next, the preset temperatures are adopted to preset the test endpoint temperature of each semi-open system thermal simulation experimental group. Specifically, the selected temperatures may be 250° C., 300° C., 320° C., 335° C., 350° C., 360° C., 390° C., 440° C., 500° C., 540° C. and 580° C., respectively.

In this embodiment, when a thermal simulation experiment is specifically performed, a reaction kettle pressure (i.e., a simulation pressure) may be preset as a hydrostatic pressure when the stratum pressure coefficient of the target stratum of the target area to be researched is 1.3; correspondingly, a hydrocarbon expulsion threshold pressure may be preset as a hydrostatic pressure when the stratum pressure coefficient is 1.1; and 11 reaction kettle preset temperature points may be 250° C., 300° C., 320° C., 335° C., 350° C., 360° C., 390° C., 440° C., 500° C., 540° C. and 580° C., respectively.

In this embodiment, during implementation, in 11 semi-open system thermal simulation experiments, the temperature programming may be adopted, the temperature increasing rate specifically may be set to 2° C. per day, and when the temperature is increased to the preset temperature, the hydrocarbon expulsion threshold pressure is decreased to a pressure when the stratum pressure coefficient of the target stratum of the target area to be researched is 1.3, and then the temperature is maintained for 50 days.

In this embodiment, the adopted samples are shale samples which are uniformly mixed, and then compacted under twice the simulation pressure for 2 days.

In this embodiment, after the respective simulation experiments are finished, the oil quantity and the gas quantity of the samples in the reaction kettle specifically may be corresponding to the retained oil quantity and the retained gas quantity of the shale at the preset temperature point. In which, the retained oil quantity may be obtained by an organic solvent extraction method; the retained gas quantity may be measured according to a standard "Shale Gas Content Determination Method" SY/T 6940-2103; the shale vitrinite reflectance Ro after each thermal simulation experiment may be measured according to an industrial standard "Determination Method for Vitrinite Reflectance in Sedimentary Rocks" SY/T 5124-2012; the shale HC after each thermal simulation experiment may be measured according to an industrial standard "Geochemical Evaluation Method for Terrestrial Hydrocarbon Source Rocks" SYT 5735-1995; and the shale TOC after each thermal simulation experiment may be measured according to a national standard "Determination of Total Organic Carbon In Sedimentary Rock" GB/T 19145-2003.

In this embodiment, during implementation, the thermal simulation experiments may be performed on the collected 9 groups of shale samples having different TOC, respectively, to obtain the retained oil quantities, the retained gas quantities, HC and Ro of the shale samples having different TOC under different preset temperatures. For the detail, please refer to the thermal simulation experiment results of shale samples of the target stratum of the target area to be researched under different preset temperatures, as shown in Table 4.

TABLE 4

Thermal Simulation Experiment Results of Shale Samples of Target Stratum
of Target Area to Be Researched Under Different Preset Temperatures

| | | | Sample No. | | | | | | | | |
|---|---|---|---|---|---|---|---|---|---|---|---|
| Parameter | Temperature (° C.) | Ro(%) | No. 1 | No. 2 | No. 3 | No. 4 | No. 5 | No. 6 | No. 7 | No. 8 | No. 9 |
| $Q_{og}$ | 250 | 0.575 | 2.7205 | 10.4036 | 18.2785 | 26.1739 | 33.1837 | 42.8581 | 67.4247 | 110.0879 | 135.5494 |
| | 300 | 0.750 | 2.5651 | 9.7128 | 17.3383 | 24.7811 | 32.1131 | 40.9409 | 66.1071 | 104.9531 | 130.4045 |
| | 320 | 0.830 | 2.0817 | 7.7876 | 14.3112 | 20.1294 | 25.6990 | 33.6622 | 51.9039 | 85.0025 | 104.3467 |
| | 335 | 0.928 | 1.5412 | 5.9424 | 10.4492 | 14.9201 | 19.1045 | 25.0999 | 39.8415 | 64.3997 | 79.1449 |
| | 350 | 0.990 | 1.2836 | 4.8164 | 8.7978 | 12.1535 | 15.7035 | 20.5491 | 32.1332 | 53.1982 | 64.5346 |

TABLE 4-continued

Thermal Simulation Experiment Results of Shale Samples of Target Stratum of Target Area to Be Researched Under Different Preset Temperatures

| Parameter | Temperature (° C.) | Ro(%) | Sample No. No. 1 | No. 2 | No. 3 | No. 4 | No. 5 | No. 6 | No. 7 | No. 8 | No. 9 |
|---|---|---|---|---|---|---|---|---|---|---|---|
| | 360 | 1.058 | 1.0225 | 3.8444 | 6.9321 | 9.6911 | 12.5724 | 16.3199 | 25.5968 | 42.2959 | 51.5634 |
| | 390 | 1.260 | 0.5108 | 1.9015 | 3.4493 | 4.9097 | 6.3244 | 8.2269 | 12.9551 | 20.9199 | 25.7870 |
| | 440 | 1.675 | 0.1023 | 0.3843 | 0.6832 | 0.9618 | 1.2678 | 1.6558 | 2.6099 | 4.1854 | 5.1590 |
| | 500 | 2.364 | 0.0055 | 0.0211 | 0.0371 | 0.0531 | 0.0678 | 0.0902 | 0.1383 | 0.2260 | 0.2844 |
| | 540 | 2.974 | 0.0004 | 0.0014 | 0.0024 | 0.0034 | 0.0044 | 0.0058 | 0.0090 | 0.0145 | 0.0180 |
| | 580 | 3.624 | 0.0000 | 0.0001 | 0.0001 | 0.0002 | 0.0002 | 0.0003 | 0.0004 | 0.0007 | 0.0009 |
| $Q_{gg}$ | 250 | 0.575 | 0.8165 | 3.0947 | 5.3931 | 7.7086 | 9.8010 | 12.8124 | 20.2789 | 32.7123 | 40.6043 |
| | 300 | 0.750 | 0.7844 | 2.9463 | 5.3232 | 7.6070 | 9.6254 | 12.6207 | 19.8942 | 31.8365 | 40.2725 |
| | 320 | 0.830 | 0.7596 | 2.8535 | 5.1602 | 7.1933 | 9.2199 | 11.9923 | 18.8092 | 31.1718 | 38.3866 |
| | 335 | 0.928 | 0.7049 | 2.6904 | 4.7788 | 6.7819 | 8.7102 | 11.3978 | 17.6819 | 28.3793 | 35.7970 |
| | 350 | 0.990 | 0.6621 | 2.5373 | 4.4751 | 6.4151 | 8.1736 | 10.5672 | 16.7759 | 26.9800 | 33.6242 |
| | 360 | 1.058 | 0.6153 | 2.3205 | 4.2473 | 5.9028 | 7.5506 | 10.0698 | 15.6536 | 25.0743 | 31.8152 |
| | 390 | 1.260 | 0.4512 | 1.7482 | 3.0469 | 4.3114 | 5.6266 | 7.2166 | 11.4795 | 18.7038 | 23.1009 |
| | 440 | 1.675 | 0.0825 | 0.3138 | 0.5624 | 0.7942 | 1.0099 | 1.3295 | 2.0623 | 3.3975 | 4.1920 |
| | 500 | 2.364 | 0.0102 | 0.0384 | 0.0686 | 0.0988 | 0.1237 | 0.1654 | 0.2570 | 0.4151 | 0.5183 |
| | 540 | 2.974 | 0.0025 | 0.0094 | 0.0170 | 0.0240 | 0.0313 | 0.0410 | 0.0641 | 0.1015 | 0.1281 |
| | 580 | 3.624 | 0.0008 | 0.0029 | 0.0051 | 0.0073 | 0.0094 | 0.0122 | 0.0192 | 0.0314 | 0.0381 |
| $Q_{os}$ | 250 | 0.575 | 0.3037 | 0.7267 | 1.0414 | 1.2236 | 1.3207 | 1.4057 | 2.1713 | 3.1572 | 3.3436 |
| | 300 | 0.750 | 1.3122 | 3.1532 | 4.6238 | 5.2983 | 5.9696 | 6.1414 | 9.5719 | 13.8769 | 14.4618 |
| | 320 | 0.830 | 1.4480 | 3.4241 | 5.0359 | 5.8404 | 6.4573 | 6.7090 | 10.5403 | 14.7703 | 15.9426 |
| | 335 | 0.928 | 1.4502 | 3.4463 | 5.0740 | 5.6873 | 6.3899 | 6.6323 | 10.4097 | 14.7941 | 15.6648 |
| | 350 | 0.990 | 1.3790 | 3.2543 | 4.7482 | 5.4518 | 6.0821 | 6.3575 | 9.6923 | 14.2793 | 15.2278 |
| | 360 | 1.058 | 1.2671 | 2.9636 | 4.3807 | 4.9594 | 5.5998 | 5.7543 | 9.0144 | 12.8231 | 14.0062 |
| | 390 | 1.260 | 0.6990 | 1.6595 | 2.4431 | 2.7826 | 3.0890 | 3.2810 | 4.9971 | 7.2383 | 7.8508 |
| | 440 | 1.675 | 0.0787 | 0.1901 | 0.2765 | 0.3153 | 0.3511 | 0.3658 | 0.5765 | 0.8136 | 0.8764 |
| | 500 | 2.364 | 0.0022 | 0.0051 | 0.0076 | 0.0085 | 0.0095 | 0.0101 | 0.0155 | 0.0218 | 0.0235 |
| | 540 | 2.974 | 0.0001 | 0.0002 | 0.0003 | 0.0004 | 0.0004 | 0.0004 | 0.0006 | 0.0009 | 0.0010 |
| | 580 | 3.624 | 0.0000 | 0.0000 | 0.0000 | 0.0000 | 0.0000 | 0.0000 | 0.0000 | 0.0000 | 0.0000 |
| $Q_{gs}$ | 250 | 0.575 | 0.0000 | 0.0000 | 0.0000 | 0.0000 | 0.0000 | 0.0000 | 0.0000 | 0.0000 | 0.0000 |
| | 300 | 0.750 | 0.0000 | 0.0000 | 0.0000 | 0.0000 | 0.0000 | 0.0000 | 0.0000 | 0.0000 | 0.0000 |
| | 320 | 0.830 | 0.1011 | 0.2459 | 0.3387 | 0.3900 | 0.4201 | 0.4652 | 0.6810 | 0.9817 | 1.2004 |
| | 335 | 0.928 | 0.2022 | 0.4815 | 0.6733 | 0.7660 | 0.8433 | 0.9404 | 1.3657 | 1.9748 | 2.4488 |
| | 350 | 0.990 | 0.2934 | 0.7138 | 0.9979 | 1.1525 | 1.2315 | 1.3745 | 2.0223 | 2.8894 | 3.6477 |
| | 360 | 1.058 | 0.4347 | 1.0520 | 1.4575 | 1.6516 | 1.7969 | 2.0035 | 2.9389 | 4.2073 | 5.2276 |
| | 390 | 1.260 | 1.0700 | 2.5616 | 3.5598 | 4.0462 | 4.4103 | 4.8591 | 7.1636 | 10.1937 | 11.5705 |
| | 440 | 1.675 | 1.7470 | 4.2626 | 5.9177 | 6.9098 | 7.2513 | 8.2661 | 11.8840 | 17.3936 | 19.4869 |
| | 500 | 2.364 | 1.5214 | 3.6785 | 5.1378 | 5.9044 | 6.3656 | 7.2120 | 10.4013 | 14.8606 | 16.7322 |
| | 540 | 2.974 | 1.3733 | 3.3879 | 4.6283 | 5.3888 | 5.7983 | 6.3878 | 9.5123 | 13.6591 | 15.4412 |
| | 580 | 3.624 | 1.2936 | 3.1246 | 4.2904 | 4.9996 | 5.2361 | 5.9213 | 8.6859 | 12.3846 | 14.0291 |
| $Q_{po}$ | 250 | 0.575 | 0.0451 | 3.6966 | 8.9856 | 13.9259 | 19.7794 | 27.0708 | 45.5984 | 78.3642 | 96.9255 |
| | 300 | 0.750 | 0.0450 | 3.6016 | 8.9520 | 13.7618 | 19.3713 | 26.8334 | 44.5779 | 77.4601 | 95.8303 |
| | 320 | 0.830 | 0.0401 | 3.1581 | 7.6789 | 11.8168 | 16.4342 | 22.5122 | 37.0420 | 64.4031 | 81.1379 |
| | 335 | 0.928 | 0.0349 | 2.6247 | 6.1719 | 9.6552 | 13.1013 | 17.8031 | 29.7410 | 51.1580 | 63.8954 |
| | 350 | 0.990 | 0.0307 | 2.2726 | 5.3745 | 8.3275 | 11.1730 | 15.0797 | 24.8832 | 42.5444 | 52.5992 |
| | 360 | 1.058 | 0.0259 | 1.9192 | 4.5737 | 6.9293 | 9.3585 | 12.4429 | 20.6263 | 35.8406 | 43.8954 |
| | 390 | 1.260 | 0.0139 | 0.9970 | 2.3667 | 3.5561 | 4.8832 | 6.3659 | 10.4954 | 18.2393 | 22.0179 |
| | 440 | 1.675 | 0.0021 | 0.1578 | 0.3897 | 0.6074 | 0.8355 | 1.1336 | 1.8776 | 3.2233 | 4.0763 |
| | 500 | 2.364 | 0.0001 | 0.0072 | 0.0177 | 0.0285 | 0.0394 | 0.0566 | 0.0907 | 0.1610 | 0.2009 |
| | 540 | 2.974 | 0.0000 | 0.0004 | 0.0011 | 0.0017 | 0.0025 | 0.0035 | 0.0057 | 0.0101 | 0.0126 |
| | 580 | 3.624 | 0.0000 | 0.0000 | 0.0000 | 0.0001 | 0.0001 | 0.0002 | 0.0003 | 0.0005 | 0.0006 |
| $Q_{ps}$ | 250 | 0.575 | 0.0939 | 1.2363 | 2.9490 | 4.7727 | 6.5586 | 9.4333 | 15.1888 | 26.6884 | 33.3579 |
| | 300 | 0.750 | 0.0914 | 1.2044 | 2.9160 | 4.5715 | 6.4857 | 9.1622 | 14.7084 | 25.6640 | 32.5942 |
| | 320 | 0.830 | 0.1003 | 1.2389 | 2.9660 | 4.6638 | 6.5235 | 9.0597 | 14.5351 | 25.7732 | 32.5043 |
| | 335 | 0.928 | 0.1072 | 1.2642 | 2.9597 | 4.5110 | 6.3897 | 8.8164 | 14.1775 | 24.9104 | 31.2917 |
| | 350 | 0.990 | 0.1107 | 1.3262 | 3.0055 | 4.6310 | 6.3027 | 8.6943 | 14.1542 | 24.5249 | 30.5940 |
| | 360 | 1.058 | 0.1221 | 1.3950 | 3.0257 | 4.7017 | 6.2891 | 8.7275 | 13.9588 | 23.4721 | 29.5429 |
| | 390 | 1.260 | 0.1743 | 1.7441 | 3.5960 | 5.1575 | 6.5442 | 8.7710 | 13.7195 | 22.8861 | 28.5489 |
| | 440 | 1.675 | 0.2130 | 1.8791 | 3.5289 | 4.6392 | 5.5123 | 6.7762 | 10.4541 | 16.4878 | 19.5004 |
| | 500 | 2.364 | 0.1781 | 1.5208 | 2.8693 | 3.6648 | 4.3607 | 5.2506 | 7.9112 | 12.3740 | 14.1662 |
| | 540 | 2.974 | 0.1611 | 1.3585 | 2.5807 | 3.2429 | 3.9006 | 4.6576 | 7.1153 | 10.9504 | 12.5243 |
| | 580 | 3.624 | 0.1506 | 1.2606 | 2.3603 | 2.9639 | 3.5704 | 4.3422 | 6.4746 | 9.9981 | 11.6609 |
| Ro | 250 | 0.575 | 0.5739 | 0.5512 | 0.5910 | 0.5569 | 0.5853 | 0.5910 | 0.5796 | 0.5739 | 0.5967 |
| | 300 | 0.750 | 0.7845 | 0.7241 | 0.7619 | 0.7769 | 0.7166 | 0.7845 | 0.7543 | 0.7920 | 0.7468 |
| | 320 | 0.830 | 0.8026 | 0.8786 | 0.8110 | 0.8364 | 0.8617 | 0.8364 | 0.8533 | 0.8364 | 0.8195 |
| | 335 | 0.928 | 0.9473 | 0.9289 | 0.8829 | 0.8829 | 0.9197 | 0.9013 | 0.9105 | 0.9289 | 0.8921 |
| | 350 | 0.990 | 0.9813 | 1.0013 | 1.0313 | 0.9913 | 0.9613 | 0.9713 | 1.0113 | 0.9913 | 1.0213 |
| | 360 | 1.058 | 1.0915 | 1.1021 | 1.0915 | 1.0279 | 1.1021 | 1.0279 | 1.1011 | 1.0597 | 1.0491 |
| | 390 | 1.260 | 1.2560 | 1.2308 | 1.2057 | 1.2183 | 1.2811 | 1.2936 | 1.2434 | 1.2308 | 1.2183 |
| | 440 | 1.675 | 1.6839 | 1.7006 | 1.6672 | 1.6339 | 1.6505 | 1.7006 | 1.6839 | 1.6839 | 1.6672 |
| | 500 | 2.364 | 2.4124 | 2.4124 | 2.4124 | 2.4124 | 2.3655 | 2.3421 | 2.2953 | 2.2719 | 2.2953 |
| | 540 | 2.974 | 2.8790 | 2.9965 | 2.9378 | 2.8790 | 2.9378 | 2.9672 | 2.9378 | 2.9378 | 2.8790 |
| | 580 | 3.624 | 3.7586 | 3.7586 | 3.7218 | 3.7586 | 3.7586 | 3.6849 | 3.7586 | 3.6112 | 3.6481 |

TABLE 4-continued

Thermal Simulation Experiment Results of Shale Samples of Target Stratum of Target Area to Be Researched Under Different Preset Temperatures

| Parameter | Temperature (° C.) | Ro(%) | Sample No. No. 1 | No. 2 | No. 3 | No. 4 | No. 5 | No. 6 | No. 7 | No. 8 | No. 9 |
|---|---|---|---|---|---|---|---|---|---|---|---|
| HC | 250 | 0.575 | 1.3326 | 1.4029 | 1.4120 | 1.3666 | 1.3787 | 1.3361 | 1.3781 | 1.4094 | 1.4280 |
|  | 300 | 0.750 | 1.1381 | 1.1519 | 1.1439 | 1.1704 | 1.1462 | 1.1612 | 1.1462 | 1.1612 | 1.1531 |
|  | 320 | 0.830 | 1.0845 | 1.0900 | 1.0736 | 1.0889 | 1.0867 | 1.1063 | 1.0998 | 1.0736 | 1.0780 |
|  | 335 | 0.928 | 1.0387 | 1.0356 | 1.0090 | 1.0121 | 1.0346 | 1.0264 | 1.0325 | 1.0090 | 1.0172 |
|  | 350 | 0.990 | 0.9915 | 0.9807 | 0.9817 | 0.9718 | 0.9895 | 0.9777 | 0.9846 | 0.9757 | 0.9876 |
|  | 360 | 1.058 | 0.9405 | 0.9462 | 0.9510 | 0.9405 | 0.9567 | 0.9576 | 0.9529 | 0.9377 | 0.9614 |
|  | 390 | 1.260 | 0.8593 | 0.8542 | 0.8430 | 0.8430 | 0.8619 | 0.8644 | 0.8661 | 0.8653 | 0.8687 |
|  | 440 | 1.675 | 0.6747 | 0.6653 | 0.6720 | 0.6760 | 0.6747 | 0.6686 | 0.6753 | 0.6753 | 0.6706 |
|  | 500 | 2.364 | 0.5071 | 0.5011 | 0.4981 | 0.5061 | 0.4931 | 0.4941 | 0.4946 | 0.4976 | 0.4986 |
|  | 540 | 2.974 | 0.4121 | 0.4125 | 0.4129 | 0.4166 | 0.4051 | 0.4162 | 0.4129 | 0.4080 | 0.4088 |
|  | 580 | 3.624 | 0.3483 | 0.3487 | 0.3494 | 0.3445 | 0.3469 | 0.3456 | 0.3445 | 0.3466 | 0.3497 |
| TOC | 250 | 0.575 | 0.4821 | 1.9633 | 3.3883 | 4.9061 | 6.3030 | 8.3693 | 13.1258 | 20.3642 | 25.6510 |
|  | 300 | 0.750 | 0.3773 | 1.7145 | 3.0209 | 4.4913 | 5.8369 | 7.8798 | 12.3657 | 19.2716 | 24.4668 |
|  | 320 | 0.830 | 0.3648 | 1.6339 | 2.8610 | 4.2451 | 5.4728 | 7.3315 | 11.5845 | 17.8718 | 22.6772 |
|  | 335 | 0.928 | 0.3607 | 1.5607 | 2.6811 | 3.9776 | 5.0782 | 6.7798 | 10.6861 | 16.2690 | 20.6351 |
|  | 350 | 0.990 | 0.3582 | 1.5204 | 2.5798 | 3.8310 | 4.8622 | 6.4788 | 10.1925 | 15.4094 | 19.5583 |
|  | 360 | 1.058 | 0.3563 | 1.4762 | 2.4818 | 3.6590 | 4.6407 | 6.1695 | 9.6760 | 14.4997 | 18.3468 |
|  | 390 | 1.260 | 0.3428 | 1.3337 | 2.1579 | 3.1715 | 4.0034 | 5.2951 | 8.2847 | 12.1018 | 15.4965 |
|  | 440 | 1.675 | 0.3266 | 1.1817 | 1.8304 | 2.6942 | 3.3550 | 4.4288 | 6.8686 | 9.7033 | 12.4574 |
|  | 500 | 2.364 | 0.3251 | 1.1511 | 1.7576 | 2.5752 | 3.1926 | 4.1980 | 6.5139 | 9.0593 | 11.6293 |
|  | 540 | 2.974 | 0.3248 | 1.1455 | 1.7435 | 2.5563 | 3.1613 | 4.1572 | 6.4466 | 8.9554 | 11.4834 |
|  | 580 | 3.624 | 0.3245 | 1.1420 | 1.7358 | 2.5416 | 3.1425 | 4.1322 | 6.3955 | 8.8638 | 11.3822 |

In this embodiment, it should be added that in Table 4, $Q_{og}$ represents an oil generation quantity, in a unit of 10-3t/t' rock; $Q_{gg}$ represents a gas generation quantity, in a unit of m3/t' rock (20° C., 1 standard atmospheric pressure); $Q_{os}$ represents a retained oil quantity, in a unit of 10-3t/t' rock; $Q_{gs}$ represents a retained gas quantity, in a unit of m3/t' rock (20° C., 1 standard atmospheric pressure); $Q_{po}$ represents an oil output quantity, in a unit of 10-3t/t' rock; $Q_{pg}$ represents a gas output quantity, in a unit of m3/t' rock; Ro represents a vitrinite reflectance, in a unit of %; HC represents a shale hydrocarbon ratio of atomic number, dimensionless; and TOC represents an organic carbon content, in a unit of %.

Figure 5:
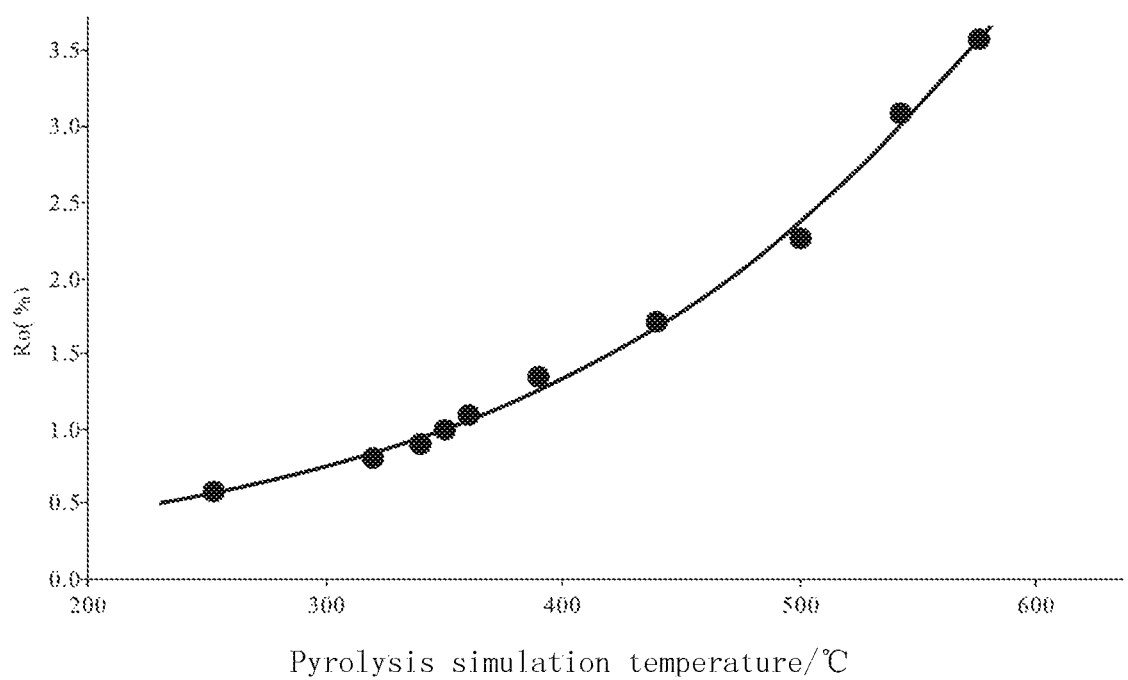
FIG. 5 is a schematic diagram of a relationship between a Ro parameter and a shale thermal simulation temperature obtained by applying, in a scenario example, a method and an apparatus for determining an oil output quantity and a gas output quantity of a shale oil in-situ conversion provided by embodiments of the present disclosure.

In this embodiment, during implementation, a relationship between an average Ro of 9 samples and the preset temperature may be built according to the thermal simulation experiments of the shale samples of the target stratum of the target area to be researched under different preset temperatures, in conjunction with the content of Table 4. For the detail, please refer to FIG. 5, which illustrates a schematic diagram of a relationship between a Ro parameter and a shale thermal simulation temperature obtained by applying, in a scenario example, a method and an apparatus for determining an oil output quantity and a gas output quantity of a shale oil in-situ conversion provided by embodiments of the present disclosure.

Step S103: performing thermal simulation experiments (i.e., second thermal simulation experiments) on the shale samples of the target stratum of the target area to be researched, wherein the thermal simulation experiments are the same group of semi-open system thermal simulation experiments corresponding to different preset temperatures in Step S102 and for which an in-situ conversion pressure is set, so as to obtain the retained oil quantities (i.e., the second retained oil quantities), the retained gas quantities (i.e., the second retained gas quantities), the oil output quantities, and the gas output quantities under different preset temperatures after thermal simulation, thereby obtaining oil generation quantities and gas generation quantities under corresponding preset temperatures.

In this embodiment, during implementation, the thermal simulation may be continued with the same group of shale samples after removal of the retained oil and the retained gas, to obtain an oil generation quantity and a gas generation quantity under a preset temperature. It is also possible to obtain the oil generation quantity and the gas generation quantity of the samples after the thermal simulation experiments under all the preset temperatures are ended. It is still possible to perform the thermal simulation experiments on the collected 9 groups of shale samples having different TOC, respectively, to obtain the oil generation quantities and the gas generation quantities of the shale samples having different TOC under different preset temperatures.

In this embodiment, the preset reaction kettle pressure (i.e., the simulation pressure) may be the in-situ conversion pressure of 5 MPa, and the preset hydrocarbon expulsion threshold pressure may be 5 MPa, wherein the preset temperature and the temperature increasing rate of the thermal simulation experiment are the same as those in Step S102.

In this embodiment, during implementation, the oil generation quantity and the gas generation quantity after simulation under the first preset temperature may be obtained according to the oil output quantity, the gas output quantity, the retained oil quantity and the retained gas quantity obtained after simulation under the first preset temperature; next, the shale samples of the retained oil and the retained gas are removed to perform a simulation under a second preset temperature, so as to obtain an oil output quantity, a gas output quantity, a retained oil quantity and a retained gas quantity of the shale under the second preset temperature, and then obtain an oil generation quantity and a gas generation quantity under the second preset temperature. The rest can be done in the same manner, and a sum of the oil generation quantities obtained under all the preset temperatures may be taken as a total oil quantity to the samples, and a sum of the gas generation quantities obtained under all the preset temperatures may be taken as a total gas quantity.

In this embodiment, during implementation, the natural gas deviation factors under different preset temperatures can be obtained by calculating according to "Natural Gas-Calculation of Compression Factor, Part 1: Introduction and Guidelines" GB/T 17747.1-1999, or "Natural Gas-Calculation of Compression Factor, Part 2: Calculation Using Molar Composition Analysis" GB/T 17747.2-1999, or "Natural Gas-Calculation of Compression Factor, Part 3: Calculation Using Physical Properties" GB/T 17747.3-1999. In addition, the average values of the 9 samples may be obtained. For the detail, please refer to the Table of Retained Gas Deviation Factors of Thermal Simulation Shale Samples, as shown in Table 5.

TABLE 5

Table of Retained Gas Deviation Factors of Thermal Simulation Shale Samples

| | Temp (° C.) | | | | | | | | | | |
|---|---|---|---|---|---|---|---|---|---|---|---|
| | 250 | 300 | 320 | 335 | 350 | 360 | 390 | 440 | 500 | 540 | 580 |
| Ro(%) | 0.575 | 0.750 | 0.830 | 0.928 | 0.990 | 1.058 | 1.260 | 1.675 | 2.364 | 2.974 | 3.624 |
| Z | / | / | 1.9231 | 1.8358 | 1.7190 | 1.6824 | 1.5207 | 1.3521 | 1.0327 | 0.9962 | 0.9541 |

In this embodiment, during implementation, the thermal simulation experiments may be performed on the collected 9 groups of shale samples having different TOC, respectively, to obtain the oil generation quantities and the gas generation quantities of the shale samples having different TOC under different preset temperatures. For the detail, please refer to the related content in Table 4.

In this embodiment, during implementation, the samples for the thermal simulation experiments specifically may be the shale samples which are uniformly mixed and then compacted under twice the simulation pressure for 2 days.

Step S104: performing thermal simulation experiments on the shale samples of the target stratum of the target area to be researched, wherein the thermal simulation experiments are one group of semi-open system thermal simulation experiments corresponding to a highest preset temperature in Step S102 and for which an in-situ conversion pressure is set, so as to obtain an oil output quantity and a gas output quantity under the highest preset temperature after thermal simulation; the thermal simulation experiments are performed on the collected 9 groups of shale samples having different TOC, respectively, to obtain the oil output quantities and the gas output quantities of the shale having different TOC.

In this embodiment, the preset reaction kettle pressure may be the in-situ conversion pressure of 5 MPa, and the preset hydrocarbon expulsion threshold pressure may be 5 MPa, wherein the preset temperature is the highest preset temperature in Step S102, and the temperature increasing rate is the same as that in Step S102. Through the above thermal simulation experiments, the oil output quantities and the gas output quantities under different preset temperatures after simulation can be obtained.

In this embodiment, by performing the thermal simulation experiments on the collected 9 groups of shale samples having different TOC, respectively, the oil output quantities and the gas output quantities of the shale samples having different TOC under different preset temperatures are obtained. For the detail, please refer to the related content in Table 4.

In this embodiment, during implementation, the samples for the thermal simulation experiments specifically may be the shale samples which are uniformly mixed and then compacted under twice the simulation pressure for 2 days.

Step S105: compiling the data obtained from steps S101 to S104 into corresponding set of data consisting of the oil generation potentials, the gas generation potentials, the retained oil quantity proportions, the retained gas quantity proportions, the oil output quantity proportions and the gas output quantity proportions in the shale samples having different TOC, HC and Ro under different preset temperatures of simulation; and according to the compiled corresponding data, building quantitative evaluation models for the oil generation potential (i.e., the oil generation potential model), the gas generation potential (i.e., the gas generation potential model), the oil generation quantity (i.e., the oil generation quantity model), the gas generation quantity (i.e., the gas generation quantity model), the retained oil quantity proportion (i.e., the retained oil quantity proportion model), the retained gas quantity proportion (i.e., the retained gas quantity proportion model), the retained oil quantity (i.e., the retained oil quantity model), the retained gas quantity (i.e., the retained gas quantity model), the oil output quantity proportion (i.e., the oil output quantity proportion model), the gas output quantity proportion (i.e., the gas output quantity proportion model), the oil output quantity (i.e., the oil output quantity model), and the gas output quantity (i.e., the gas output quantity model). The specific implementation process may comprise:

S1: measuring corresponding Ro parameter using the samples subjected to a thermal simulation under a preset temperature, and building a relationship between the pyrolysis simulation temperature and the vitrinite reflectance Ro. For the detail, please refer to FIG. 5, which illustrates a schematic diagram of a relationship between a Ro parameter and a shale thermal simulation temperature obtained by applying, in a scenario example, a method and an apparatus for determining an oil output quantity and a gas output quantity of a shale oil in-situ conversion provided by embodiments of the present disclosure.

In which, the relationship between the vitrinite reflectance (Ro) and the thermal simulation temperature specifically may be represented as follows:

$$Ro=0.13787e^{0.005665T}$$

wherein Ro specifically may represent a vitrinite reflectance (i.e., a Ro parameter), in a unit of %; T specifically may represent a pyrolysis simulation temperature, in a unit of ° C.

S2: establishing methods and models for evaluating the oil generation potential, the oil generation quantity, the gas generation potential and gas generation quantity of the shale, using TOC, HC and Ro of the original shale samples and corresponding Ro, oil generation quantity and gas generation quantity under a preset discrete experiment temperature.

Figure 6:
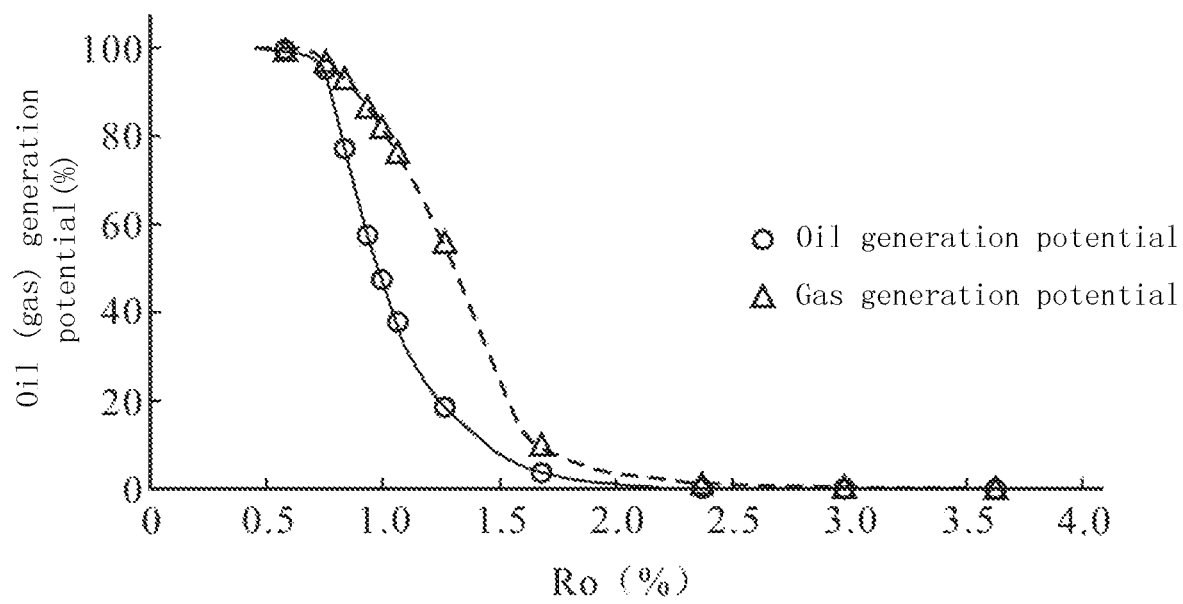
FIG. 6 is a schematic diagram of a relationship between a Ro parameter and shale oil and gas generation potentials obtained by applying, in a scenario example, a method and an apparatus for determining an oil output quantity and a gas output quantity of a shale oil in-situ conversion provided by embodiments of the present disclosure.

S2-1: building an oil generation potential model of the shale. For the detail, please refer to FIG. 6, which illustrates a schematic diagram of a relationship between a Ro parameter and shale oil and gas generation potentials obtained by applying, in a scenario example, a method and an apparatus for determining an oil output quantity and a gas output quantity of a shale oil in-situ conversion provided by embodiments of the present disclosure.

In this embodiment, it should be noted that the oil generation potential specifically may refer to a ratio of an oil generation quantity to an original oil generation quantity of a shale, when a vitrinite reflectance of the shale is Ro. The original oil generation quantity of the shale is a total oil generation quantity throughout the oil generation, i.e., an original oil generation quantity. The oil generation quantity is the one when the vitrinite reflectance of the shale is Ro. Correspondingly, an evaluation model of the oil generation potential of the shale may be represented as follows:

$$Q_{op} = 0.01 \times (a_{11} \times e^{b_{11} \times Ro} \times Ro^2) \quad (1)$$

wherein $Q_{op}$ specifically may represent an oil generation potential when a vitrinite reflectance of a shale is Ro, in a value range from 0 to 1; Ro specifically may represent a vitrinite reflectance, in a unit of %; $a_{11}$ and $b_{11}$ specifically may be empirical coefficients (i.e., a first-class constant and a second-class constant) which are specifically valued as 8602.3 and −5.232, respectively.

In this embodiment, it should be added that if the above model is specifically used, it may be set that $Q_{op}=1$ when $Q_{op}>1$, and $Q_{op}=0$ when $Q_{op}<0$.

S2-2: building an oil generation quantity model of the shale.

In this embodiment, the oil generation quantity specifically may represent an oil generation quantity of a shale when a vitrinite reflectance of the shale is Ro, i.e., a remained oil generation quantity. The oil generation quantity model specifically may be represented as follows:

$$Q_{og} = Q_{ogs} \times Q_{op} \times \frac{TOC_t}{TOC_s} \times \frac{HC_t}{HC_s} \quad (2)$$

wherein $Q_{og}$ specifically may represent an oil generation quantity when a vitrinite reflectance of a shale is Ro, in a unit of t/t' rock; $Q_{ogs}$ specifically may represent an original oil generation quantity of the shale, in a unit of t/t' rock; $TOC_s$ specifically may represent a recovered original total organic carbon content of the shale with the known oil generation quantity, in a unit of %; HC specifically may represent a recovered original hydrocarbon ratio of atomic number of the shale with the known oil generation quantity, dimensionless; $TOC_t$ specifically may represent a recovered original total organic carbon content of the shale of the target stratum of the target area to be researched, in a unit of %; and $HC_t$ specifically may represent a recovered original hydrocarbon ratio of atomic number of the shale of the target stratum of the target area to be researched, dimensionless.

S3-3: building a gas generation potential model of the shale. For the detail, please refer to related content in FIG. 6.

In this embodiment, the gas generation potential specifically may refer to a ratio of a gas generation quantity to an original gas generation quantity of a shale when a vitrinite reflectance of the shale is Ro. The original gas generation quantity of the shale is a total gas generation quantity throughout the gas generation, i.e., an original gas generation quantity. The gas generation quantity is the one when the vitrinite reflectance of the shale is Ro. Correspondingly, an evaluation model of the gas generation potential of the shale specifically may be represented as follows:

$$Q_{gp} = 0.01 \times \begin{cases} (a_{21} \times Ro + b_{21}) \times Ro^{0.5} & Ro \leq 1.6\% \\ a_{22} \times Ro^{b_{22}} \times Ro^{0.5} & Ro > 1.6\% \end{cases} \quad (3)$$

wherein $Q_{gp}$ specifically may represent a gas generation potential when a vitrinite reflectance of a shale is Ro, in a value range from 0 to 1; Ro specifically may represent a vitrinite reflectance, in a unit of %; $a_{21}$, $b_{21}$, $a_{22}$ and $b_{22}$ specifically may be empirical coefficients which specifically may be valued as −121.57, 203.33, 236.23 and −6.582, respectively.

S2-4: building a gas generation quantity model of the shale.

In this embodiment, the gas generation quantity specifically may refer to the one when the vitrinite reflectance of the shale is Ro, i.e., a remained gas generation quantity. The gas generation quantity model specifically may be represented as follows:

$$Q_{gg} = Q_{ggs} \times Q_{gp} \times \frac{TOC_t}{TOC_s} \times \frac{HC_t}{HC_s} \quad (4)$$

wherein $Q_{gg}$ specifically may represent a gas generation quantity when a vitrinite reflectance of a shale is Ro, in a unit of m3/t' rock (20° C., 1 standard atmospheric pressure); $Q_{ggs}$ specifically may represent an original gas generation quantity of the shale, in a unit of m3/t' rock (20° C., 1 standard atmospheric pressure); $TOC_s$ specifically may represent a recovered original total organic carbon content of the shale with the known gas generation quantity, in a unit of %; $HC_s$ specifically may represent a recovered original hydrocarbon ratio of atomic number of the shale with the known gas generation quantity, dimensionless; $TOC_t$ specifically may represent a recovered original total organic carbon content of the shale of the target stratum of the target area to be researched, in a unit of %; $HC_t$ specifically may represent a recovered original hydrocarbon ratio of atomic number of the shale of the target stratum of the target area to be researched, dimensionless.

S3: establishing methods and models for evaluating the retained oil quantity proportion, the retained gas quantity proportion, the retained oil quantity and the retained gas quantity of the shale using TOC, HC and Ro of the original shale samples, the crude oil volume factor, the natural gas deviation factor, as well as Ro, the oil generation quantity, the gas generation quantity, the retained oil quantity and the retained gas quantity corresponding to the preset discrete experiment temperature.

Figure 7:
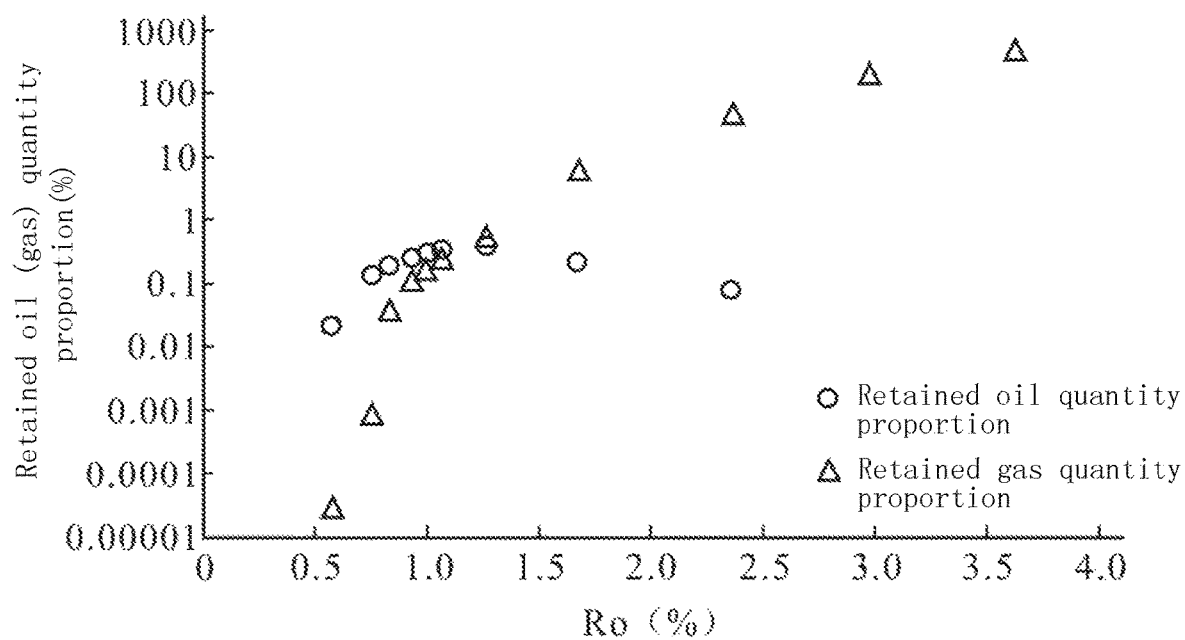
FIG. 7 is a schematic diagram of a relationship between a Ro parameter and proportions of retained oil and gas quantities in a shale obtained by applying, in a scenario example, a method and an apparatus for determining an oil output quantity and a gas output quantity of a shale oil in-situ conversion provided by embodiments of the present disclosure.

In this embodiment, the shale oil in-situ conversion potential specifically may include the oil and gas generated in the heating process of the shale organic matters and the oil and gas retained in the shale before heating. Thus, the retained oil and gas quantities in the shale are specifically evaluated with the following method:

S3-1: building a retained oil quantity proportion model of the shale. For the detail, please refer to FIG. 7, which illustrates a schematic diagram of a relationship between a Ro parameter and proportions of retained oil and gas quantities in a shale obtained by applying, in a scenario example, a method and an apparatus for determining an oil output quantity and a gas output quantity of a shale oil in-situ conversion provided by embodiments of the present disclosure.

In this embodiment, since the retained oil quantity in the shale is generally related to Ro, $TOC_O$, $HC_O$ and the crude oil volume factor, the retained oil quantity proportion in the shale may be determined through the following model:

$$Q_{osp} = f(TOC)_o \times B_{or} \times \frac{HC_t}{HC_s} \times \begin{cases} a_{31} \times Ro + b_{31} & Ro \leq 1.2\% \\ a_{32} \times Ro^{b_{32}} & Ro > 1.2\% \end{cases} \quad (5)$$

wherein $Q_{osp}$ specifically may represent a retained oil quantity proportion and an oil generation quantity proportion in a shale when a vitrinite reflectance of the shale is Ro, and an original total organic carbon content is $TOC_O$; $f(TOC)_o$ specifically may represent a shale retained oil quantity correction coefficient, and it is a dimensionless parameter related to $TOC_O$; $a_{31}$, $b_{31}$, $a_{32}$ and $b_{32}$ specifically may be empirical coefficients, which may be valued as 0.67014, −0.3530, 0.6464 and −2.0292, respectively; $B_{or}$ specifically may be a ratio of a crude oil volume factor, under an actual stratum pressure of a target stratum of a target area to be researched, to a crude oil volume factor under a simulation pressure, and it is a dimensionless parameter; specifically, those crude oil volume factors may be obtained through experiments according to "Analysis Method for Oil and Gas Reservoir Fluid Property" SY/T 5542-2009.

Figure 8:
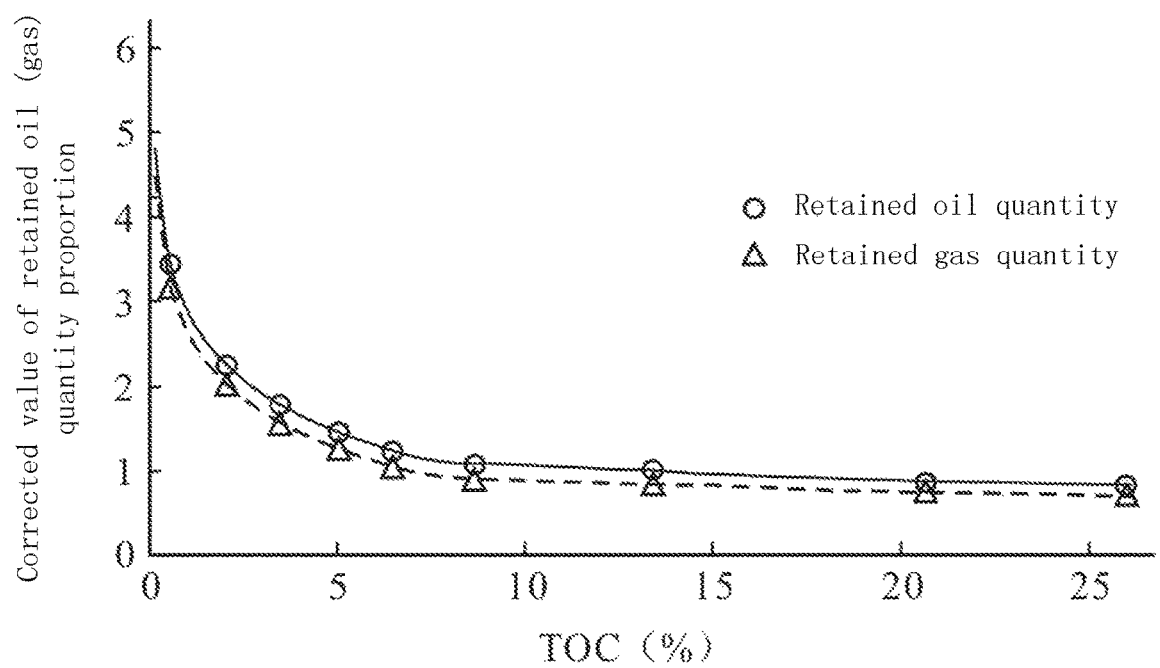
FIG. 8 is a schematic diagram of a relationship between a TOC parameter and corrected values of proportions of retained oil and gas quantities in a shale obtained by applying, in a scenario example, a method and an apparatus for determining an oil output quantity and a gas output quantity of a shale oil in-situ conversion provided by embodiments of the present disclosure.

In which, the shale retained oil quantity correction coefficient specifically may be determined with the following formula:

$$f(TOC)_o = \begin{cases} c_{11} \times \ln(TOC) + c_{12} & TOC \leq 9.0\% \\ c_{13} \times TOC + c_{14} & TOC > 9.0\% \end{cases} \quad (6)$$

wherein $c_{11} c_{12}$, $c_{13}$, $c_{14}$ specifically may be empirical coefficients, which may be valued as −0.8541, 2.8581, −0.02057 and 1.2837, respectively. For the detail, please refer to FIG. 8, which illustrates a schematic diagram of a relationship between a Ro parameter and corrected values of proportions of retained oil and gas quantities in a shale obtained by applying, in a scenario example, a method and an apparatus for determining an oil output quantity and a gas output quantity of a shale oil in-situ conversion provided by embodiments of the present disclosure.

S3-2: building a retained oil quantity model of the shale.

In this embodiment, the retained oil quantity model of the shale specifically may be represented as follows:

$$Q_{os} = Q_{osp} \times Q_{og} \quad (7)$$

wherein $Q_{os}$ specifically may represent a retained oil quantity (in a unit of t/t' rock) in a shale when a vitrinite reflectance of the shale is Ro, and an original total organic carbon content is $TOC_O$.

In this embodiment, if the above model is specifically used, it may be set that $Q_{gs}$ is equal to a sum of an oil generation quantity and an oil output quantity of the shale corresponding to Ro, when $Q_{os}$ is greater than the sum of the oil generation quantity and the oil output quantity of the shale corresponding to Ro.

S3-3: building a retained gas quantity proportion model of the shale. For the detail, please refer to related content in FIG. 7.

In this embodiment, since the retained gas quantity in the shale is related to Ro, $TOC_O$, $HC_O$ and the natural gas deviation factor, during implementation the retained gas quantity proportion in the shale may be determined through the following model:

$$Q_{gsp} = \qquad (8)$$

$$f(TOC)_g \times f(B_{gi}) \times \frac{HC_t}{HC_s} \times \begin{cases} a_{41} \times Ro + b_{41} & Ro \leq 0.8\% \\ a_{42} \times Ro^{b_{42}} & 0.8\% < Ro \leq 1.6\% \\ a_{43} \times Ro^{b_{43}} & Ro > 1.6\% \end{cases}$$

wherein, $Q_{gsp}$ specifically may represent a retained gas quantity proportion and a gas generation quantity proportion in a shale when a vitrinite reflectance of the shale is Ro, and an original total organic carbon content is $TOC_O$; $f(TOC)_g$ specifically may represent a shale retained gas quantity correction coefficient, and it is a dimensionless parameter related to $TOC_O$; $a_{41}$, $b_{41}$, $a_{42}$, $b_{42}$, $a_{43}$ and $b_{43}$ specifically may be empirical coefficients, which may be valued as 0.8700, −0.6858, 0.1493, 6.8525, 0.3615 and 5.6626, respectively.

Figure 9:
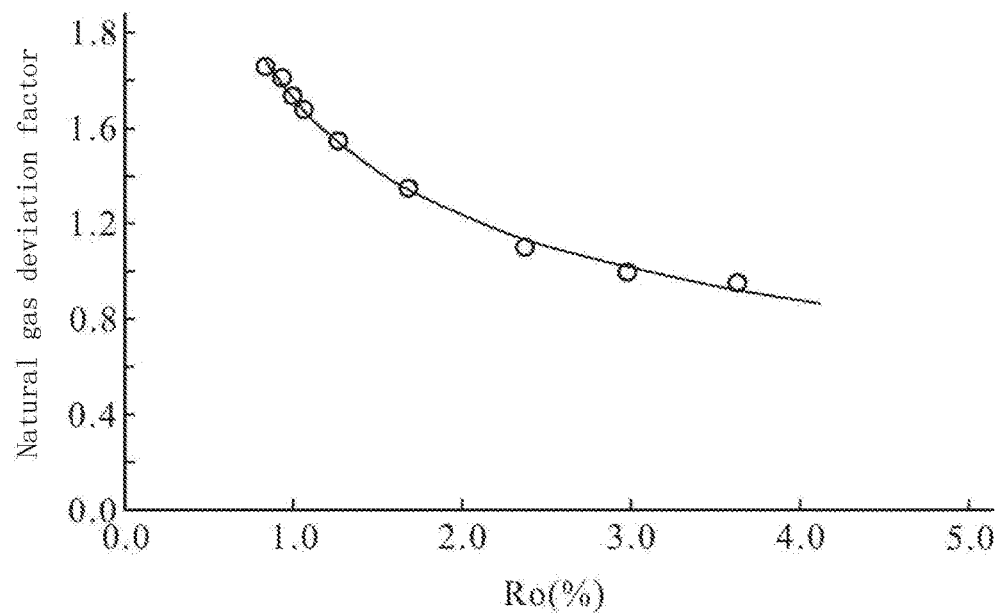
FIG. 9 is a schematic diagram of a relationship between a Ro parameter and a natural gas deviation factor obtained by applying, in a scenario example, a method and an apparatus for determining an oil output quantity and a gas output quantity of a shale oil in-situ conversion provided by embodiments of the present disclosure.

In which, the shale retained gas quantity correction coefficient specifically may be determined with the following formula:

$$f(TOC)_g = \begin{cases} c_{21} \times \ln(TOC) + c_{22} & TOC \leq 8\% \\ c_{23} \times TOC + c_{24} & TOC > 8\% \end{cases} \quad (9)$$

wherein $c_{21}$, $c_{22}$, $c_{23}$ and $c_{24}$ specifically may be empirical coefficients, which may be valued as −0.8259, 2.6047, −0.01297 and 1.0250, respectively. For the detail, please refer to FIG. 9, which illustrates a schematic diagram of a relationship between a Ro parameter and a natural gas deviation factor obtained by applying, in a scenario example, a method and an apparatus for determining an oil output quantity and a gas output quantity of a shale oil in-situ conversion provided by embodiments of the present disclosure.

in which, the parameters concerned in the above model may be determined with the following formula:

$$f(B_{gi}) = \frac{P_f \times T_f \times Z_s}{P_s \times T_s \times Z_f} \quad (10)$$

wherein $P_f$ specifically may represent an actual stratum pressure, in a unit of MPa; $P_s$ specifically may represent a simulation pressure, in a unit of MPa, and during implementation it may be calculated using a stratum pressure coefficient of 1.3 and a depth of a target stratum of a target area to be researched; $T_f$ specifically may represent an actual stratum temperature, in a unit of K; $T_s$ specifically may represent a stratum temperature corresponding to a geothermal gradient of 3° C./100 m, in a unit of K, and specifically it may be calculated using a surface temperature of 15° C., a geothermal gradient of 3° C./100 m and a buried depth; $Z_s$ specifically may represent a retained natural gas deviation factor for simulation, and it is a dimensionless parameter; $Z_f$ specifically may represent a natural gas deviation factor of an actual stratum, and it is a dimensionless parameter, which specifically may be calculated according to "Natural Gas- Calculation of Compression Factor, Part 1: Introduction and Guidelines" GB/T 17747.1-1999, or "Natural Gas-Calculation of Compression Factor, Part 2: Calculation Using Molar Composition Analysis" GB/T 17747.2-1999, or "Natural Gas-Calculation of Compression Factor, Part 3: Calculation Using Physical Properties" GB/T 17747.3-1999, and also may be obtained through the experiments.

In which, Z, concerned in the above model specifically may be calculated with the following formula through the vitrinite reflectance Ro:

$$Z_s = c_{31} \times Ro^{C32} \qquad (11)$$

wherein $c_{31}$ and $c_{32}$ specifically may be empirical coefficients, which are valued as 1.7255 and −0.4846, respectively.

S3-4: building a retained gas quantity model of the shale.

In this embodiment, the retained gas quantity model of the shale specifically may be represented as follows:

$$Q_{gs} = Q_{gsp} \times Q_{gg} \qquad (12)$$

wherein $Q_{gs}$ specifically may represent a retained gas quantity (in a unit of m³/t' rock (20° C., 1 standard atmospheric pressure)) in a shale when a vitrinite reflectance of the shale is Ro, and an original total organic carbon content is $TOC_O$.

In this embodiment, if the above model is specifically used, it may be set that $Q_{gs}(Q_{os})$ is equal to a sum of a gas generation quantity and a gas output quantity of the shale corresponding to Ro, when $Q_{gs}$ is greater than the sum of the gas generation quantity and the gas output quantity of the shale corresponding to Ro.

S4: establishing methods and models for evaluating the total oil quantity and the total gas quantity of the shale using the obtained oil generation quantity, gas generation quantity, retained oil quantity and retained gas quantity of the shale samples.

In this embodiment, during implementation, the shale oil in-situ conversion potential when the vitrinite reflectance of the shale is Ro may be represented by the total oil quantity and the total gas quantity, wherein the total oil quantity specifically may include a sum of the oil generation quantity and the retained oil quantity when the vitrinite reflectance of the shale is Ro, and the total gas quantity specifically may include a sum of the gas generation quantity and the retained gas quantity when the vitrinite reflectance of the shale is Ro.

During implementation, the total oil quantity may be calculated with the following formula:

$$Q_o = Q_{og} + Q_{os} \qquad (13)$$

During implementation, the total gas quantity may be calculated with the following formula:

$$Q_g = Q_{gg} + Q_{gs} \qquad (14)$$

wherein $Q_o$ specifically may represent a total oil quantity when the vitrinite reflectance of the shale is Ro, in a unit of t/t' rock; and $Q_g$ specifically may represent a total gas quantity when the vitrinite reflectance of the shale is Ro, in a unit of m³/t' rock (20° C., 1 standard atmospheric pressure).

S5: establishing methods and models for evaluating the oil output quantity proportion, the gas output quantity proportion, the gas output quantity and the oil output quantity of the shale using the recovered values of TOC and HC of the original shale sample as well as the obtained total oil quantity, total gas quantity, oil generation potential, gas generation potential, oil output quantity and gas output quantity.

Figure 10:
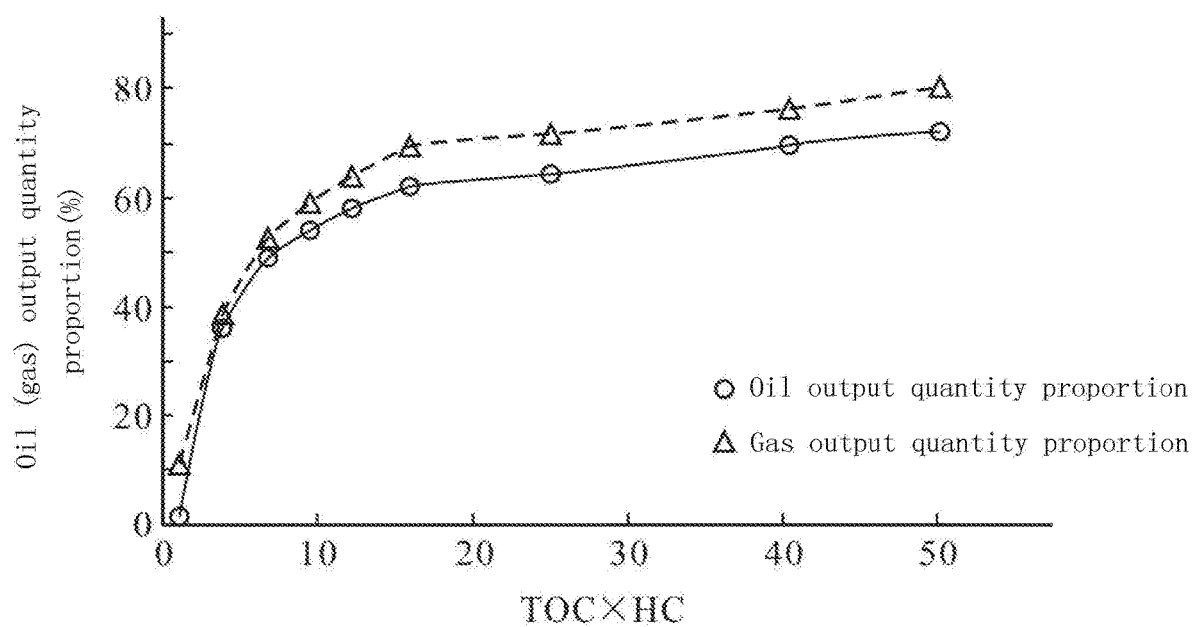
FIG. 10 is a schematic diagram of a relationship between TOC×HC and proportions of oil and gas output quantities obtained by applying, in a scenario example, a method and an apparatus for determining an oil output quantity and a gas output quantity of a shale oil in-situ conversion provided by embodiments of the present disclosure.

S5-1: building an oil output quantity proportion model of the shale. For the detail, please refer to FIG. 10, which illustrates a schematic diagram of a relationship between TOC×HC and proportions of oil and gas output quantities obtained by applying, in a scenario example, a method and an apparatus for determining an oil output quantity and a gas output quantity of a shale oil in-situ conversion provided by embodiments of the present disclosure.

In this embodiment, during implementation, the models (formulas 17 and 18) for calculating the oil output quantity proportion and the gas output quantity proportion of the sample may be built using the obtained recovered values of TOC and HC of the sample, as well as the oil generation quantity, the gas generation quantity, the oil output quantity and the gas output quantity.

Specifically, the oil output quantity proportion model and the oil generation quantity proportion model may be built with the following formula:

$$Q_{pop} = \begin{cases} a_{51} \times \ln(TOC \times HC) + b_{51} & TOC \times HC < 6\% \\ a_{52} \times \ln(TOC \times HC) + b_{52} & 6\% \le TOC \times HC < 14\% \\ a_{53} \times (TOC \times HC) + b_{53} & TOC \times HC \ge 14\% \end{cases} \qquad (17)$$

wherein $Q_{pop}$ specifically may represent an oil output quantity proportion and an oil generation quantity proportion when a vitrinite reflectance of a shale is Ro, HC specifically may represent an original hydrocarbon ratio of atomic number of a shale of a target stratum of a target area to be researched, and it is a dimensionless parameter; TOC specifically may represent an original total organic carbon content of the shale of the target stratum of the target area to be researched, in a unit of %; $a_{51}$, $b_{51}$, $a_{52}$, $b_{52}$, $a_{53}$ and $b_{53}$ specifically may be empirical coefficients, which may be valued as 0.2376, 0.0538, 0.1530, 0.2156, 0.00322 and 0.5719, respectively.

S5-2: building a gas output quantity proportion model of the shale. For the detail, please refer to related content in FIG. 10.

Specifically, the gas output quantity proportion model and the gas generation quantity proportion model may be built with the following formula:

$$Q_{pgp} = \begin{cases} a_{61} \times \ln(TOC \times HC) + b_{61} & TOC \times HC < 14\% \\ a_{62} \times (TOC \times HC) + b_{62} & TOC \times HC \ge 14\% \end{cases} \qquad (18)$$

wherein $Q_{pgp}$ specifically may represent a gas output quantity proportion and a gas generation quantity proportion when a vitrinite reflectance of a shale is Ro; HC specifically may represent an original hydrocarbon ratio of atomic number of a shale of a target stratum of a target area to be researched, dimensionless; TOC specifically may represent an original total organic carbon content of the shale of the target stratum of the target area to be researched, in a unit of %; and $a_{61}$, $b_{61}$, $a_{62}$ and $b_{62}$ specifically may be empirical coefficients, which may be valued as 0.2117, 0.3169, 0.00388 and 0.6310, respectively.

S5-3: building an oil output quantity model and a gas output quantity model of the shale.

In this embodiment, during implementation, the models for calculating the oil output quantity and the gas output quantity of the shale oil in-situ conversion under corresponding TOC, Ro and HC conditions using the obtained oil output quantity proportion and gas output quantity proportion, as well as the calculation formulas of the total oil quantity and the total gas quantity.

In this embodiment, during implementation, after TOC, Ro and HC of a shale of a target stratum of a target area to be researched are obtained and recovered to the original TOC and the original HC, the oil output quantity and the gas output quantity may be obtained with formulas 19 and 20, using the total oil quantity and the total gas quantity obtained with formulas 1 to 15.

In which, the calculation formula of the oil output quantity specifically may be represented as:

$$Q_{po} = Q_{pop} \times Q_o \quad (19)$$

The calculation formula of the gas output quantity specifically may be represented as:

$$Q_{pg} = Q_{pgp} \times Q_g \quad (20)$$

wherein $Q_{po}$ specifically may represent an oil output quantity, in a unit of t/t' rock; and $Q_{pg}$ specifically may represent a gas output quantity, in a unit of m³/t' rock.

In this embodiment, during implementation, the core data of the target stratum of the target area to be researched may be collected to obtain TOC, Ro, HC and the sample quality of the shale, and after the original TOC and the original HC are recovered, the oil output quantity and the gas output quantity of the in-situ conversion of the shale oil of the target stratum of the target area to be researched may be obtained with formulas 1 to 20.

Step S106: obtaining HC of different types of kerogen samples of the target stratum of the target area to be researched, and performing thermal simulation experiments on the shale samples of the target stratum of the target area to be researched, wherein the thermal simulation experiments are one group of semi-open system thermal simulation experiments for which a stratum pressure and a plurality of different preset temperatures are set, so as to obtain shale HC under different preset temperatures after thermal simulation; establishing methods and models for evaluating the original HC ($HC_O$) and the original TOC ($TOC_O$) of the shale using Ro under different preset temperatures obtained in step S101 and TOC of the shale under different preset temperatures after simulation obtained in step S102.

In this embodiment, during implementation, when the target stratum of the target area to be researched lacks immature shale samples, and only TOC and HC of a shale having a certain Ro are known, it is usually impossible to accurately evaluate the oil and gas generation potentials, the oil and gas generation quantities, the retained oil and gas quantities or the oil and gas output quantities of the shale. In order to accurately evaluate the oil and gas generation potentials, the oil and gas generation quantities, the retained oil and gas quantities or the oil and gas output quantities of the shale, it is necessary to recover the original TOC and the original HC of the shale having the certain Ro, and this step is provided for this purpose.

In this embodiment, during implementation, TOC and HC of the shale of the target stratum of the target area to be researched may be recovered to the values corresponding to Ro of 0.45%, as the original TCO and the original HC, i.e., $HC_O$ and $TOC_O$.

In this embodiment, the samples of the target stratum of the target area to be researched are outcrop-section shale of Yanchang Formation, outcrop-section shale of YY Formation, outcrop-section shale of ZZ Formation, outcrop-section shale of TTT Formation of XXX Basin, and shale of the third member of Shahejie Formation of RRR Basin. The above five shale samples represent the kerogen of types I to II, respectively. The outcrop samples are those obtained by digging 8 meters or more below the ground to ensure that those samples are not weathered. 2 kg samples are collected at each sampling point, pulverized into a size of 60 meshes respectively, and mixed uniformly, while each group of samples are divided into 12 parts which are respectively used to measure the original HC and Ro, wherein HC is measured according to an industrial standard "Geochemical Evaluation Method for Terrestrial Hydrocarbon Source Rocks" SYT 5735-1995, and Ro is measured according to an industrial standard "Determination Method for Vitrinite Reflectance in Sedimentary Rocks" SY/T 5124-2012.

In this embodiment, during implementation, thermal simulation experiments may be performed on the shale samples of the target stratum of the target area to be researched, wherein the thermal simulation experiments are one group of semi-open system thermal simulation experiments for which a stratum pressure and a plurality of different preset temperatures are set (the set stratum pressure and preset temperatures, the temperature increasing step and the sample processing method are the same as those in step S102), so as to obtain the shale HC of the group of samples under different preset temperatures after thermal simulation; the thermal simulation experiments are performed on the collected 5 groups of shale samples having different HC, respectively, to obtain HC and Ro of the shale samples having different HC under different preset temperatures.

Figure 11:
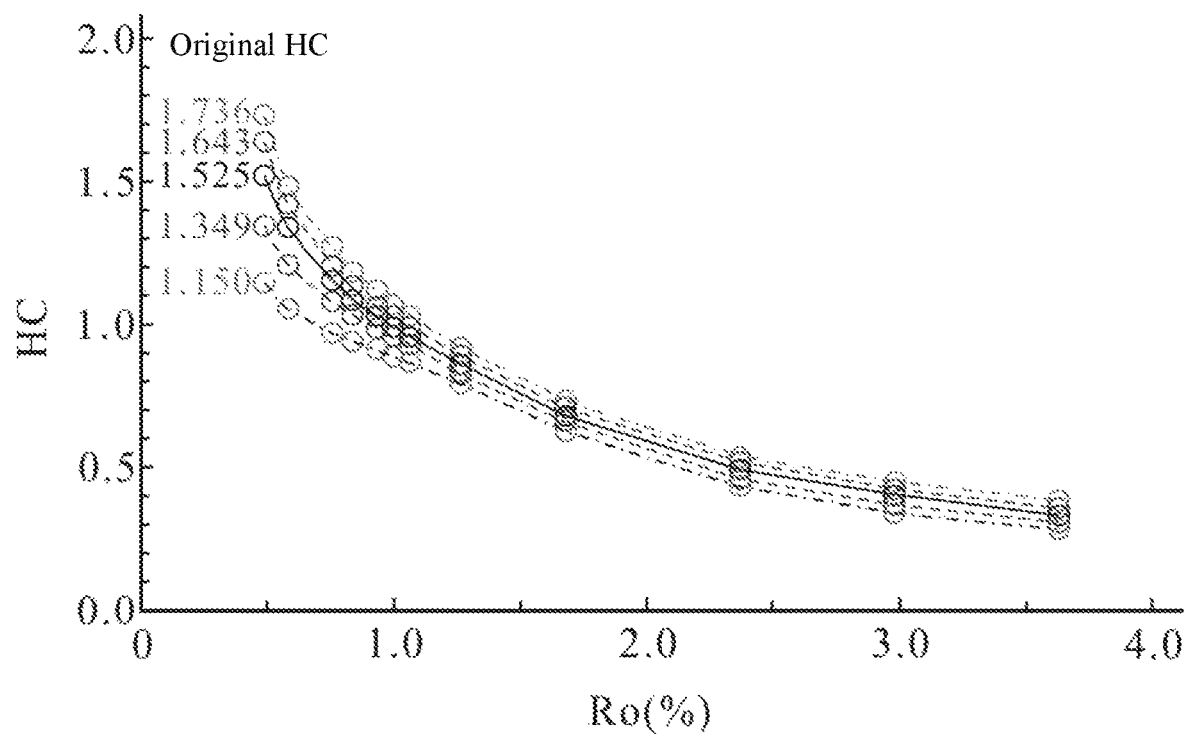
FIG. 11 is a schematic diagram of a relationship between a Ro parameter and an HC parameter obtained by applying, in a scenario example, a method and an apparatus for determining an oil output quantity and a gas output quantity of a shale oil in-situ conversion provided by embodiments of the present disclosure.

S1: building a shale HC evaluation model using an original HC of a shale sample, and Ro and HC corresponding to a preset discrete experiment temperature. For the detail, please refer to FIG. 11, which illustrates a schematic diagram of a relationship between a Ro parameter and an HC parameter obtained by applying, in a scenario example, a method and an apparatus for determining an oil output quantity and a gas output quantity of a shale oil in-situ conversion provided by embodiments of the present disclosure.

In this embodiment, when the target stratum of the target area to be researched lacks immature shale samples, the original HC of the shale specifically may be determined as follows:

$$HC = a_{81} \times Ro^{b_{81}} \quad (22)$$

wherein $a_{81}$ and $b_{81}$ specifically may be empirical coefficients, and their specific values may refer to related content as shown in Table 1.

In this embodiment, during implementation, HC and Ro of the target stratum of the target area to be researched may be obtained to calculate corresponding Ro and obtain two calculated values $HC_1$ and $HC_2$ above-below-adjacent to HC with formula 22, and then calculate an original $HC_O$ corresponding to HC with formula 23 according to the positional relationships between HC and $HC_1$, $HC_2$, and the original $HC_{OR1}$, $HC_{OR2}$ corresponding to $HC_1$, $HC_2$:

$$HC_O = HC_{OR2} + \frac{HC_{OR1} \times (HC - HC_2) + HC_{OR2} \times (HC_1 - HC)}{HC_1 + HC_2} \quad (23)$$

In this embodiment, during implementation, when the obtained HC corresponding to Ro of the target stratum of the target area to be researched is greater than $HC_1$ calculated from a top line, an original $HC_O$ corresponding to HC may be calculated with formula 24 using $HC_1$ and $HC_2$ calculated from two lower lines corresponding to Ro:

$$HC_O = HC_{OR1} + \frac{(HC - HC_1) \times (HC_{OR1} - HC_{OR2})}{HC_1 - HC_2} \quad (24)$$

In this embodiment, during implementation, when the obtained HC corresponding to Ro of the target stratum of the target area to be researched is less than $HC_1$ calculated from a bottom line, an original $HC_O$ corresponding to HC may be calculated with formula 25 using $HC_1$ and $HC_2$ calculated from two upper lines corresponding to Ro:

$$HC_O = HC_{OR2} - \frac{(HC_2 - HC) \times (HC_{OR1} - HC_{OR2})}{HC_1 - HC_2}. \quad (25)$$

Figure 12:
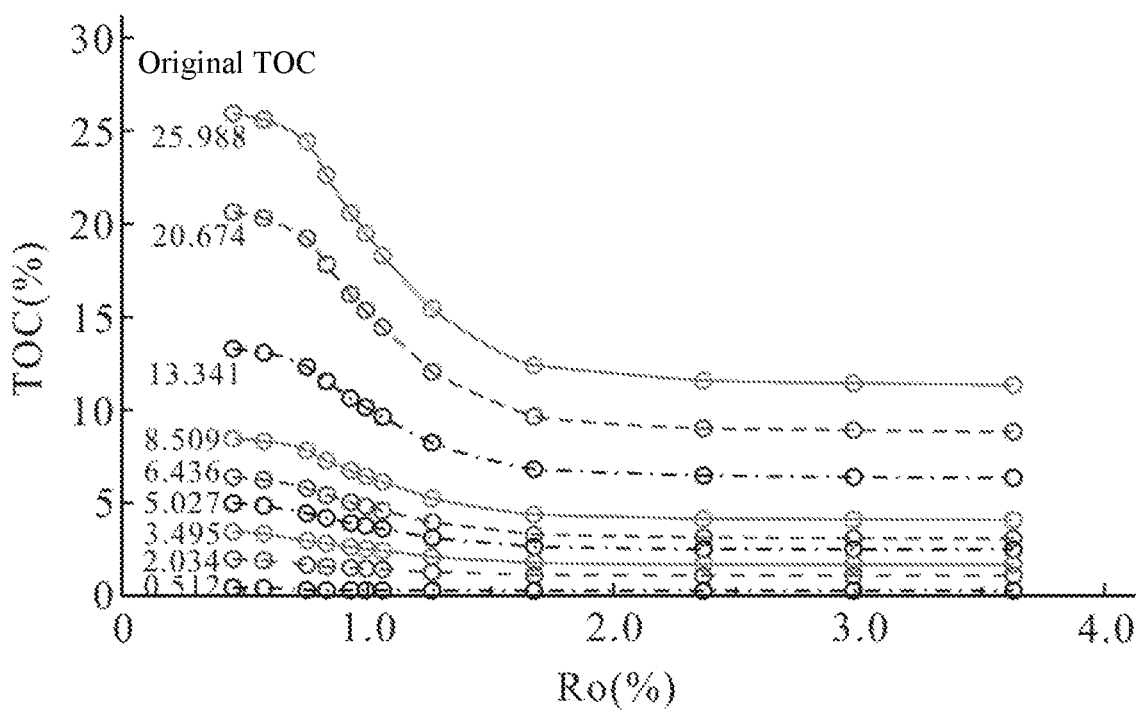
FIG. 12 is a schematic diagram of a relationship between a Ro parameter and a TOC parameter obtained by applying, in a scenario example, a method and an apparatus for determining an oil output quantity and a gas output quantity of a shale oil in-situ conversion provided by embodiments of the present disclosure.

S2: establishing methods and models for evaluating TOC of the shale, using an original TOC of a shale sample, Ro, TOC and HC corresponding to a preset discrete experiment temperature, and the obtained HC. For the detail, please refer to FIG. 12, which illustrates a schematic diagram of a relationship between a Ro parameter and a TOC parameter obtained by applying, in a scenario example, a method and an apparatus for determining an oil output quantity and a gas output quantity of a shale oil in-situ conversion provided by embodiments of the present disclosure.

In this embodiment, when the target stratum of the target area to be researched lacks immature shale samples, the original TOC of the shale specifically may be determined as follows:

$$TOC = \begin{cases} a_{91} \times Ro^2 + a_{92} \times Ro + a_{93} & Ro \leq 0.9\% \\ a_{94} \times Ro^{a_{95}} & 0.9\% < Ro \leq 1.6\% \\ a_{96} \times Ro^3 + a_{97} \times Ro^2 + a_{98} \times Ro + a_{99} & Ro > 1.6\% \end{cases} \quad (26)$$

wherein $a_{91}$, $a_{92}$, $a_{93}$, $a_{94}$, $a_{95}$, $a_{96}$, $a_{97}$, $a_{98}$, and $a_{99}$ specifically may be empirical coefficients, and their specific values may be determined according to the content as shown in Table 2.

In which, the model of formula 26 is obtained under the condition that the shale of the target stratum of the target area to be researched is of types $I+II_1$. During the thermal evolution, the shales with different types of kerogen are different in terms of the hydrocarbon production, and a correction is required to accurately predict the original TOC of the target stratum of the target area to be researched. $TOC_m$, Ro and $HC_O$ of the target stratum of the target area to be researched are obtained, so as to obtain the normalized TOC corresponding to Ro of different types of kerogens after correction, i.e., $$TOC = TOC_m \times \frac{(HC_{OR} - HC_{Ro}) \times HC_{ORN}}{(HC_{ORN} - HC_{RoN}) \times HC_{OR}} \quad (27)$$

wherein $TOC_m$ specifically may represent a measured value of a shale TOC corresponding to Ro of a target stratum of a target area to be researched, in a unit of %; TOC specifically may represent a TOC normalized by correcting the measured value of the shale TOC corresponding to Ro of the target stratum of the target area to be researched, in a unit of %; $HC_{OR}$ specifically may represent an original HC of the shale of the target stratum of the target area to be researched, dimensionless; $HC_{Ro}$ specifically may represent a measured value of HC corresponding to Ro of the shale of the target stratum of the target area to be researched, dimensionless; $HC_{ORN}$ specifically may represent an original HC of the shale in the model of formula 26, and valued as 1.5326, dimensionless.

In this embodiment, during implementation, TOC of the shale of the target stratum of the target area to be researched may be obtained with formula 27, to calculate corresponding Ro and obtain two calculated values $TOC_1$ and $TOC_2$ above-below-adjacent to TOC with formula 26, and then calculate an original $TOC_O$ corresponding to TOC with formula 28 according to the positional relationships between TOC and $TOC_1$, $TOC_2$, and the original $TOC_{OR1}$, $TOC_{OR2}$ corresponding to $TOC_1$, $TOC_2$, i.e., $$TOC_O = \quad (28)$$
$$TOC_{OR2} + \frac{TOC_{OR1} \times (TOC - TOC_2) + TOC_{OR2} \times (TOC_1 - TOC)}{TOC_1 + TOC_2}$$

In this embodiment, during implementation, when the obtained TOC corresponding to Ro of the target stratum of the target area to be researched is greater than $TOC_1$ calculated from a top line, an original $TOC_O$ corresponding to TOC may be calculated with formula 29 using $TOC_1$ and $TOC_2$ calculated from two lower lines corresponding to Ro:

$$TOC_O = TOC_{OR1} + \frac{(TOC - TOC_1) \times (TOC_{OR1} - TOC_{OR2})}{TOC_1 - TOC_2} \quad (29)$$

In this embodiment, during implementation, when the obtained TOC corresponding to Ro of the target stratum of the target area to be researched is less than $TOC_1$ calculated from a bottom line, an original $TOC_O$ corresponding to TOC may be calculated with formula 30 using $TOC_1$ and $TOC_2$ calculated from two upper lines corresponding to Ro:

$$TOC_O = TOC_{OR2} - \frac{(TOC_2 - TOC) \times (TOC_{OR1} - TOC_{OR2})}{TOC_1 - TOC_2}. \quad (30)$$

Thus, based on the above formulas, it is possible to obtain the oil and gas generation potentials, the oil and gas generation quantities, the retained oil and gas quantities, and the oil and gas output quantities of the shale under the condition of any Ro, TOC and HC, so as to achieve the quantitative evaluation of the development potential of the target area.

Through the above scenario examples, it is verified that by introducing and using multiple parameters such as the retained oil quantity, the retained gas quantity, the oil output quantity and the gas output quantity to build accurate oil output quantity model and gas output quantity model, the method and apparatus for determining the oil output quantity and the gas output quantity of the shale oil in-situ conversion provided by the embodiments of the present disclosure actually solve the technical problem in the existing methods that the predicted development potential has a large error and a low accuracy, and achieve the technical effect of comprehensively considering the mutual influences between multiple factors, and accurately predicting the development potential of the target area through multiple parameters such as the oil output quantity and the gas output quantity.

Although the present disclosure mentions different specific embodiments, the present disclosure is not limited to the industrial standards or the situations as described in the embodiments. Some industrial standards, or an implementation scheme which is self-defined or slightly amended based on the implementations described in the embodiments can also achieve the same, equivalent or similar, or modification expectable implementation effects as compared with the above embodiments. The embodiments obtained by applying these amended or modified modes for data acquisition, processing, output, judgment, etc., should still fall within the scope of the optional implementation schemes of the present disclosure.

Although the present disclosure provides the method operation steps as described in the embodiments or flowcharts, more or less operation steps may be included based on the conventional or inventive-less means. Any step execution order listed in the embodiments is only one of the various step execution orders, rather than representing the unique step execution order. Regarding a practical device or client-end product, the steps may be executed orderly or in parallel according to the method illustrated in the embodiments or the drawing (e.g., by the parallel processors, or under a multi-thread processing environment or even a distributed data processing environment). The term "comprise", "include" or any other variant intends to cover the non-exclusive inclusions, so that a process, a method, a product or a device comprising a series of elements comprise not only those elements, but also other elements not explicitly listed, or further comprise inherent elements of such process, method, product or device. In a case where there is no further limitation, it does not exclude any other identical or equivalent element existing in the process, method, product or device comprising the elements.

The device or module, etc. elaborated in the above embodiments specifically may be implemented by a computer chip or an entity, or a product having a certain function. In order to facilitate the descriptions, the device is described based on the functions with various functional modules, respectively. Of course, during implementation of the present disclosure, the functions of the modules may be realized in the same or a plurality of software and/or hardware, or a module that realizes a function may be implemented by a combination of a plurality of submodules or subunits, and the like. The device embodiments described above are merely illustrative, e.g., the module partitioning is only a logical function partitioning, and other partitioning modes are possible during the actual implementation. For example, a plurality of modules or components may be combined or integrated into another system, or some features may be omitted or not executed.

As known to those skilled in the art, in addition to implementing the controller by merely using computer readable program codes, the controller is completely enabled to realize the same function in the form of a logic gate, a switch, an ASIC, a programmable logic controller, an embedded microcontroller, etc., by logically programming the methodical steps. Thus, such a controller may be deemed as a hardware component, while means included therein for realizing various functions may also be deemed as structures in the hardware component. Alternatively, those means for realizing various functions may even be deemed as not only software modules for implementing a method, but also the structures in the hardware component.

The present disclosure may be described in the general context of computer executable instructions executed by the computer, e.g., the program module. In general, the program module includes routine, program, object, component, data structure, etc. executing a particular task or realizing a particular abstract data type. The present disclosure may also be put into practice in the distributed computing environments where tasks are executed by remote processing devices connected through a communication network. In the distributed computing environments, the program modules may be located in the local and remote computer storage medium including the storage device.

As can be seen from the descriptions of the above embodiments, those skilled in the art can clearly understand that the present disclosure can be implemented by means of software plus a necessary universal hardware platform. Based on this understanding, the essence of the technical solution of the present disclosure or the part making a contribution to the prior art can be embodied in the form of a computer software product, which may be stored in a storage medium, such as a ROM/RAM, a magnetic disk, an optical disk, etc., and include several instructions to enable a computer device (a personal computer, a server, a network device, etc.) to carry out the embodiments of the present disclosure, or methods described in some parts of the embodiments.

Each embodiment in the Specification is described in a progressive manner. Each embodiment lays an emphasis on its difference from other embodiments, and the same or similar parts of the embodiments can refer to each other. The present disclosure is applicable to a lot of general or dedicated computer system environments or configurations, such as a personal computer, a server computer, a handheld or portable device, a tablet device, a multiprocessor system, a microprocessor-based system, a set-top box, a programmable consumer electronic device, a network PC, a mini-computer, a mainframe computer, a distributed computing environment including any of the above systems or devices, etc.

Although the present disclosure has been described through the embodiments, those skilled in the art knows that there are many modifications and changes to the present disclosure without departing from the spirit of the present disclosure, and it is intended that the appended claims include those modifications and changes without departing from the spirit of the present disclosure.

The invention claimed is:

1. A method for determining an oil output quantity of a shale oil in-situ conversion, comprising:
   obtaining a plurality of groups of shale samples of a target stratum of a target area, wherein the shale samples are immature shale samples;
   measuring the plurality of groups of shale samples to obtain an initial TOC parameter, an initial Ro parameter, and an initial HC parameter of each group of shale samples in the plurality of groups of shale samples;
   determining, according to the plurality of groups of shale samples, a first retained oil quantity, a Ro parameter, an oil output quantity and a second retained oil quantity of each group of shale samples in the plurality of groups of shale samples under each preset temperature;
   building an oil output quantity model according to the first retained oil quantity, the Ro parameter, the oil output quantity and the second retained oil quantity of each group of shale samples in the plurality of groups of shale samples under each preset temperature;
   determining an oil output quantity of the target stratum of the target area according to the oil output quantity model.

2. The method according to claim 1, wherein determining, according to the plurality of groups of shale samples, a first retained oil quantity, a Ro parameter, an oil output quantity and a second retained oil quantity of each group of shale samples in the plurality of groups of shale samples under each preset temperature comprises:

performing a first thermal simulation experiment on each group of shale samples in the plurality of groups of shale samples to determine the first retained oil quantity and the Ro parameter of each group of shale samples in the plurality of groups of shale samples under each preset temperature, wherein a simulation pressure of the first thermal simulation experiment is a stratum pressure, and the first thermal simulation experiment includes semi-open thermal simulation experiments under a plurality of preset temperatures;

performing a second thermal simulation experiment on each group of shale samples in the plurality of groups of shale samples to determine the oil output quantity and the second retained oil quantity of each group of shale samples in the plurality of groups of shale samples under each preset temperature, wherein a simulation pressure of the second thermal simulation experiment is an in-situ conversion pressure, the second thermal simulation experiment includes semi-open thermal simulation experiments under a plurality of preset temperatures, and the plurality of preset temperatures included by the second thermal simulation experiment are the same as those included by the first thermal simulation experiment.

3. The method according to claim 1, wherein building an oil output quantity model according to the first retained oil quantity, the Ro parameter, the oil output quantity and the second retained oil quantity of each group of shale samples in the plurality of groups of shale samples under each preset temperature comprises:

determining an oil generation quantity of each group of shale samples in the plurality of groups of shale samples under each preset temperature according to the oil output quantity and the second retained oil quantity of each group of shale samples in the plurality of groups of shale samples under each preset temperature;

building a Ro parameter model according to the Ro parameter of each group of shale samples in the plurality of groups of shale samples under each preset temperature and an initial Ro parameter of each group of shale samples in the plurality of groups of shale samples;

building an oil generation potential model according to the initial TOC parameter, the initial Ro parameter and the initial HC parameter of each group of shale samples in the plurality of groups of shale samples, the Ro parameter model, and the oil generation quantity of each group of shale samples in the plurality of groups of shale samples under each preset temperature;

building a retained oil proportion model according to the initial TOC parameter, the initial Ro parameter and the initial HC parameter of each group of shale samples in the plurality of groups of shale samples, the oil generation quantity of each group of shale samples in the plurality of groups of shale samples under each preset temperature, the first retained oil quantity of each group of shale samples in the plurality of groups of shale samples under each preset temperature, and the oil generation potential model;

building an oil output quantity proportion model according to the retained oil proportion model, and the initial TOC parameter, the initial Ro parameter and the initial HC parameter of each group of shale samples in the plurality of groups of shale samples;

building an oil output quantity model according to the oil output quantity proportion model.

4. The method according to claim 3, wherein the oil generation potential model is built with the following formula:

$$Q_{op} = 0.01 \times (a_{11} \times e^{b_{11} \times Ro} \times Ro^2)$$

wherein $Q_{op}$ represents an oil generation potential, Ro represents a Ro parameter, $a_{11}$ represents a first-class constant with a reference number of 11, and $b_{11}$ represents a second-class constant with a reference number of 11.

5. The method according to claim 3, wherein the retained oil quantity proportion model is built with the following formula:

$$Q_{osp} = f(TOC_0)_o \times B_{or} \times \frac{HC_t}{HC_s} \times \begin{cases} a_{31} \times Ro + b_{31} \text{(when } Ro \le 1.2\%) \\ a_{32} \times Ro^{b_{32}} \text{(when } Ro > 1.2\%) \end{cases}$$

wherein $Q_{osp}$ represents a retained oil quantity proportion, $f(TOC_0)_o$ represents a shale retained oil quantity correction coefficient, $TOC_0$ represents an initial TOC parameter of a shale sample, $B_{or}$ represents a ratio of a crude oil volume factor under a stratum pressure of the target area to a crude oil volume factor under a thermal simulation pressure, Ro represents a Ro parameter, $HC_i$ represents an initial HC parameter of a shale sample of a target stratum of a target area to be determined, $HC_s$ represents an initial HC parameter of a shale sample, $a_{31}$ represents a first-class constant with a reference number of 31, $a_{32}$ represents a first-class constant with a reference number of 32, $b_{31}$ represents a second-class constant with a reference number of 31, and $b_{32}$ represents a second-class constant with a reference number of 32.

6. The method according to claim 3, wherein the oil output quantity proportion model is built with the following formula:

$$Q_{pop} = \begin{cases} a_{51} \times \ln(TOC_0 \times HC_0) + b_{51} \text{(when } TOC_0 \times HC_0 < 6\%) \\ a_{52} \times \ln(TOC_0 \times HC_0) + b_{52} \text{(when } 6\% \le TOC_0 \times HC_0 < 14\%) \\ a_{53} \times \ln(TOC_0 \times HC_0) + b_{53} \text{(when } TOC_0 \times HC_0 \ge 14\%) \end{cases}$$

wherein $Q_{pop}$ represents an oil output quantity proportion, $TOC_0$ represents an initial TOC parameter of a shale sample, $HC_0$ represents an initial HC parameter of the shale sample, $a_{51}$ represents a first-class constant with a reference number of 51, $a_{52}$ represents a first-class constant with a reference number of 52, $a_{53}$ represents a first-class constant with a reference number of 53, $b_{51}$ represents a second-class constant with a reference number of 51, $b_{52}$ represents a second-class constant with a reference number of 52, and $b_{53}$ represents a second-class constant with a reference number of 53.

7. The method according to claim 1, wherein when the target area lacks immature shale samples, the method further comprises: obtaining a plurality of groups of shale samples of the target area, and performing TOC recovery processing and HC recovery processing on the plurality of groups of shale samples, respectively, to obtain an initial TOC parameter and an initial HC parameter of the target area.

8. A method for determining a gas output quantity of a shale oil in-situ conversion, comprising:

obtaining a plurality of groups of shale samples of a target stratum of a target area, wherein the shale samples are immature shale samples;

measuring the plurality of groups of shale samples to obtain an initial TOC parameter, an initial Ro parameter, and an initial HC parameter of each group of shale samples in the plurality of groups of shale samples;

determining, according to the plurality of groups of shale samples, a first retained gas quantity, a Ro parameter, a gas output quantity and a second retained gas quantity of each group of shale samples in the plurality of groups of shale samples under each preset temperature;

building a gas output quantity model according to the first retained gas quantity, the Ro parameter, the gas output quantity and the second retained gas quantity of each group of shale samples in the plurality of groups of shale samples under each preset temperature;

determining a gas output quantity of the target stratum of the target area according to the gas output quantity model.

9. The method according to claim 8, wherein determining, according to the plurality of groups of shale samples, a first retained gas quantity, a Ro parameter, a gas output quantity and a second retained gas quantity of each group of shale samples in the plurality of groups of shale samples under each preset temperature comprises:

performing a first thermal simulation experiment on each group of shale samples in the plurality of groups of shale samples to determine the first retained gas quantity and the Ro parameter of each group of shale samples in the plurality of groups of shale samples under each preset temperature, wherein a simulation pressure of the first thermal simulation experiment is a stratum pressure, and the first thermal simulation experiment includes semi-open thermal simulation experiments under a plurality of preset temperatures;

performing a second thermal simulation experiment on each group of shale samples in the plurality of groups of shale samples to determine the gas output quantity and the second retained gas quantity of each group of shale samples in the plurality of groups of shale samples under each preset temperature, wherein a simulation pressure of the second thermal simulation experiment is an in-situ conversion pressure, the second thermal simulation experiment includes semi-open thermal simulation experiments under a plurality of preset temperatures, and the plurality of preset temperatures included by the second thermal simulation experiment are the same as those included by the first thermal simulation experiment.

10. The method according to claim 8, wherein building a gas output quantity model according to the first retained gas quantity, the Ro parameter, the gas output quantity and the second retained gas quantity of each group of shale samples in the plurality of groups of shale samples under each preset temperature comprises:

determining a gas generation quantity of each group of shale samples in the plurality of groups of shale samples under each preset temperature according to the gas output quantity and the second retained gas quantity of each group of shale samples in the plurality of groups of shale samples under each preset temperature;

building a Ro parameter model according to the Ro parameter of each group of shale samples in the plurality of groups of shale samples under each preset temperature and an initial Ro parameter of each group of shale samples in the plurality of groups of shale samples;

building a gas generation potential model according to the initial TOC parameter, the initial Ro parameter and the initial HC parameter of each group of shale samples in the plurality of groups of shale samples, the Ro parameter model, and the gas generation quantity of each group of shale samples in the plurality of groups of shale samples under each preset temperature;

building a retained gas proportion model according to the initial TOC parameter, the initial Ro parameter and the initial HC parameter of each group of shale samples in the plurality of groups of shale samples, the gas generation quantity of each group of shale samples in the plurality of groups of shale samples under each preset temperature, the first retained gas quantity of each group of shale samples in the plurality of groups of shale samples under each preset temperature, and the gas generation potential model;

building a gas output quantity proportion model according to the retained gas proportion model, and the initial TOC parameter, the initial Ro parameter and the initial HC parameter of each group of shale samples in the plurality of groups of shale samples;

building a gas output quantity model according to the gas output quantity proportion model.

11. The method according to claim 10, wherein the gas generation potential model is built with the following formula:

$$Q_{gp} = 0.01 \times \begin{cases} (a_{21} \times Ro + b_{21}) \times Ro^{0.5} \text{(when } Ro \leq 1.6\%) \\ a_{22} \times Ro^{b_{22}} \times Ro^{0.5} \text{(when } Ro > 1.6\%) \end{cases}$$

wherein $Q_{gp}$ represents a gas generation potential, Ro represents a Ro parameter, $a_{21}$ represents a first-class constant with a reference number of 21, $a_{22}$ represents a first-class constant with a reference number of 22, $b_{21}$ represents a second-class constant with a reference number of 21, and $b_{22}$ represents a second-class constant with a reference number of 22.

12. The method according to claim 10, wherein the retained gas quantity proportion model is built with the following formula:

$$Q_{gsp} = f(TOC_0)_g \times f(B_{gi}) \times \frac{HC_t}{HC_s} \times \begin{cases} a_{41} \times Ro + b_{41} \text{(when } Ro \leq 0.8\%) \\ a_{42} \times Ro^{b_{42}} \text{(when } 0.8\% < Ro \leq 1.6\%) \\ a_{43} \times Rob^{b_{43}} \text{(when } Ro > 1.6\%) \end{cases}$$

wherein $Q_{gsp}$ represents a retained gas quantity proportion, $f(TOC_0)_g$ represents a shale retained gas quantity correction coefficient, $TOC_0$ represents an initial TOC parameter of a shale sample, $f(B_{gi})$ represents an experimental simulation pressure-based natural gas volume factor correction parameter, $B_{gi}$ represents a ratio of a natural gas volume factor under a stratum pressure of the target area to a natural gas volume factor under an experimental thermal simulation pressure, Ro represents a Ro parameter, $HC_r$ represents an initial HC parameter of a shale sample of a target stratum of a target area to be determined, $HC_s$ represents an initial HC parameter of a shale sample, $a_{41}$ represents a first-class constant with a reference number of 41, $a_{42}$ represents a first-class constant with a reference number of 42, $a_{43}$ represents a first-class constant with a reference number of 43, $b_{41}$ represents a second-class constant with a reference number of 41, $b_{42}$ represents a second-class constant with a reference number of 42, and $b_{43}$ represents a second-class constant with a reference number of 43.

13. The method according to claim 10, wherein the gas output quantity proportion model is built with the following formula:

$$Q_{pgp} = \begin{cases} a_{61} \times \ln(TOC_0 \times HC_0) + b_{61} & \text{(when } TOC_0 \times HC_0 < 14\%) \\ a_{62} \times \ln(TOC_0 \times HC_0) + b_{62} & \text{(when } TOC_0 \times HC_0 \geq 14\%) \end{cases}$$

wherein $Q_{pgp}$ represents a gas output quantity proportion, $TOC_0$ represents an initial TOC parameter of a shale sample, $HC_0$ represents an initial HC parameter of the shale sample, $a_{61}$ represents a first-class constant with a reference number of 61, $a_{62}$ represents a first-class constant with a reference number of 62, $b_{61}$ represents a second-class constant with a reference number of 61, and $b_{62}$ represents a second-class constant with a reference number of 62.

14. The method according to claim 8, wherein when the target area lacks immature shale samples, the method further comprises: obtaining a plurality of groups of shale samples of the target area, and performing TOC recovery processing and HC recovery processing on the plurality of groups of shale samples, respectively, to obtain an initial TOC parameter and an initial HC parameter of the target area.

15. An apparatus for determining an oil output quantity of a shale oil in-situ conversion, comprising:
an obtaining module configured to obtain a plurality of groups of shale samples of a target stratum of a target area, wherein the shale samples are immature shale samples;
a measuring module configured to measure the plurality of groups of shale samples to obtain an initial TOC parameter, an initial Ro parameter, and an initial HC parameter of each group of shale samples in the plurality of groups of shale samples;
a first determining module configured to determine, according to the plurality of groups of shale samples, a first retained oil quantity, a Ro parameter, an oil output quantity and a second retained oil quantity of each group of shale samples in the plurality of groups of shale samples under each preset temperature;
a building module configured to build an oil output quantity model according to the first retained oil quantity, the Ro parameter, the oil output quantity and the second retained oil quantity of each group of shale samples in the plurality of groups of shale samples under each preset temperature;
a second determining module configured to determine an oil output quantity of the target stratum of the target area according to the oil output quantity model.

16. An apparatus for determining a gas output quantity of a shale oil in-situ conversion, comprising:
an obtaining module configured to obtain a plurality of groups of shale samples of a target stratum of a target area, wherein the shale samples are immature shale samples;
a measuring module configured to measure the plurality of groups of shale samples to obtain an initial TOC parameter, an initial Ro parameter, and an initial HC parameter of each group of shale samples in the plurality of groups of shale samples;
a first determining module configured to determine, according to the plurality of groups of shale samples, a first retained gas quantity, a Ro parameter, a gas output quantity and a second retained gas quantity of each group of shale samples in the plurality of groups of shale samples under each preset temperature;
a building module configured to build a gas output quantity model according to the first retained gas quantity, the Ro parameter, the gas output quantity and the second retained gas quantity of each group of shale samples in the plurality of groups of shale samples under each preset temperature;
a second determining module configured to determine a gas output quantity of the target stratum of the target area according to the gas output quantity model.

* * * * *